United States Patent
Zarnani et al.

(10) Patent No.: US 12,359,457 B2
(45) Date of Patent: *Jul. 15, 2025

(54) RESILIENT SLIP FRICTION JOINT

(71) Applicant: Auckland UniServices Limited, Aucklund (NZ)

(72) Inventors: Pouyan Zarnani, Auckland (NZ); Pierre Joseph Henri Quenneville, Auckland (NZ)

(73) Assignee: Auckland UniServices Limited, Aucklund (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,416

(22) Filed: Aug. 15, 2024

(65) Prior Publication Data

US 2024/0401362 A1    Dec. 5, 2024

Related U.S. Application Data

(63) Continuation of application No. 17/805,422, filed on Jun. 3, 2022, which is a continuation of application (Continued)

(30) Foreign Application Priority Data

May 20, 2015 (NZ) ........................................ 708334
Sep. 18, 2015 (NZ) ........................................ 712496
Mar. 31, 2016 (NZ) ........................................ 718585

(51) Int. Cl.
*E04H 9/02* (2006.01)
*E04B 1/36* (2006.01)
(Continued)

(52) U.S. Cl.
CPC ............... *E04H 9/021* (2013.01); *E04B 1/36* (2013.01); *E04B 1/388* (2023.08); *E04B 1/98* (2013.01);
(Continued)

(58) Field of Classification Search
None
See application file for complete search history.

(56) References Cited

U.S. PATENT DOCUMENTS 6,840,016 B1  1/2005  Mualla
7,419,145 B2  9/2008  Lee et al.
(Continued)

FOREIGN PATENT DOCUMENTS

JP    H02118001    9/1990
JP    2005248989    9/2005
(Continued)

OTHER PUBLICATIONS

International Search Report in International Application No. PCT/IB2016/052962, dated Aug. 31, 2016, 8 pages.
(Continued)

*Primary Examiner* — Phi D A
(74) *Attorney, Agent, or Firm* — Thomas J. Oppold; Larkin Hoffman Daly & Lindgren, Ltd.

(57) ABSTRACT

A slip connector to connect first and second members of a structure to allow relative but resisted movement, and to at least in part return any movement. In one embodiment, the connector includes a first and second components and a resilient fixing. The resilient fixing holds mutually slidable ramped surfaces of the first and second components contiguous so that the line(s) of action of the fixing(s) is/are oblique to the mutually slidable ramped surfaces held contiguous. In another embodiment the connector includes first, second and third components and a resilient fixing. The resilient fixing holds mutually slidable ramped surfaces of the first and third components contiguous and mutually slidable ramped surfaces of the second and third components (Continued)

contiguous so that the line(s) of action of the fixing(s) is/are oblique to the mutually slidable ramped surfaces held contiguous.

14 Claims, 36 Drawing Sheets

Related U.S. Application Data

No. 15/575,799, filed as application No. PCT/IB2016/052962 on May 20, 2016, now abandoned.

(51) Int. Cl.
| | |
|---|---|
| *E04B 1/38* | (2006.01) |
| *E04B 1/98* | (2006.01) |
| *F16B 5/00* | (2006.01) |
| *F16B 5/02* | (2006.01) |
| *F16B 7/04* | (2006.01) |

(52) U.S. Cl.
CPC ......... *E04H 9/0237* (2020.05); *F16B 5/0072* (2013.01); *F16B 5/0241* (2013.01); *F16B 7/0426* (2013.01); *E04B 2103/06* (2013.01)

(56) References Cited

U.S. PATENT DOCUMENTS

| | | | |
|---|---|---|---|
| 8,875,452 B2 | 11/2014 | Kawai et al. | |
| 9,175,468 B1 * | 11/2015 | Tsai | .................. E01D 19/04 |
| 9,745,741 B2 | 8/2017 | Hayes | |
| 9,879,415 B2 | 1/2018 | Hooker et al. | |
| 9,885,175 B1 | 2/2018 | Izumi et al. | |
| 2012/0124920 A1 | 5/2012 | Alsaif | |
| 2014/0026498 A1 | 1/2014 | Quaglini et al. | |
| 2014/0191104 A1 | 7/2014 | Meisel et al. | |
| 2014/0215936 A1 | 8/2014 | Sanderson et al. | |
| 2014/0259993 A1 | 9/2014 | Hayes | |
| 2017/0067249 A1 * | 3/2017 | Matteson | .................. E04C 3/32 |
| 2017/0204629 A1 | 7/2017 | Beard | |

FOREIGN PATENT DOCUMENTS

| | | | |
|---|---|---|---|
| JP | 2007120096 | 5/2007 | |
| JP | 2011202796 | 10/2011 | |
| JP | 2014098440 | 5/2014 | |
| JP | 2015215081 | 12/2015 | |
| WO | WO-2009075175 A1 * | 6/2009 | ............... E04H 9/02 |
| WO | WO-2014178158 A1 * | 11/2014 | ............... E01D 1/00 |
| WO | WO-2016038834 A1 * | 3/2016 | ........... E04B 1/1903 |
| WO | WO-2016185432 A1 * | 11/2016 | ............... E04B 1/36 |

OTHER PUBLICATIONS

International Preliminary Report in International Application No. PCT/IB2016/052962, dated Sep. 18, 2027, 8 pages.

Wolski et al., "Experimental Study of a Self-Centering Beam-Column Connection with Bottom Flange Friction Device," J Struct Eng., 2009, 135(5):497-488.

Khoo et al., "Experimental Study of Full-Scale Self-Centering Sliding Hinge Joint Connections with Friction Ring Springs," Journal of Earthquake Engineering, 2013, 17(7):972-997.

* cited by examiner

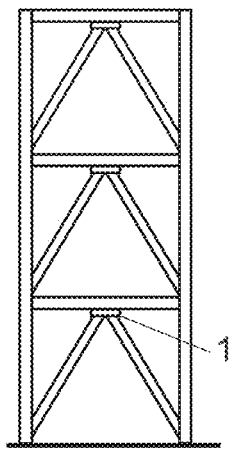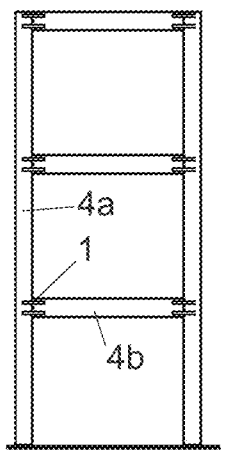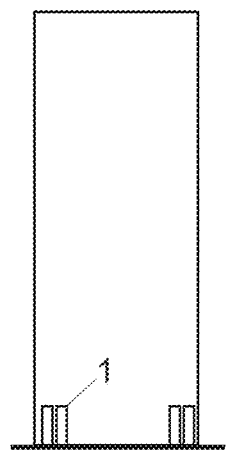
Fig. 1A  Fig. 1B  Fig. 1C
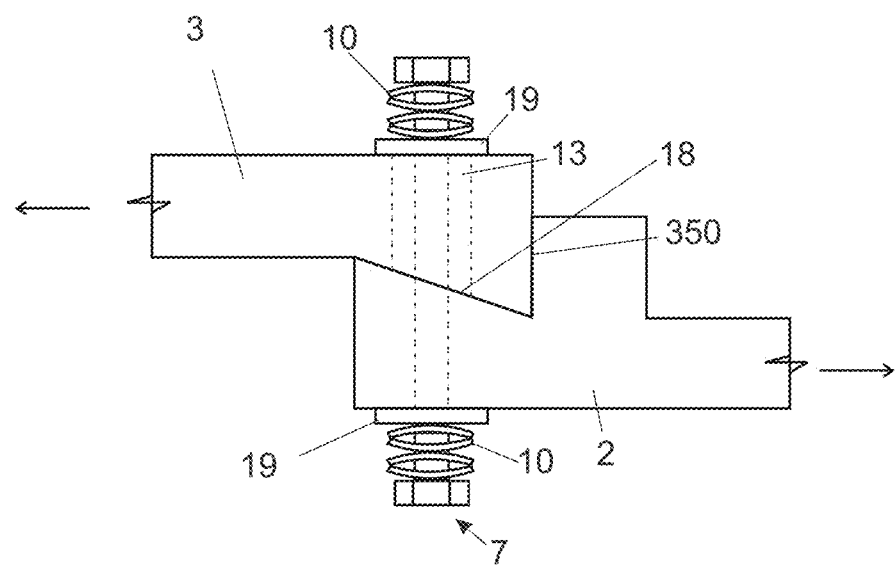
Fig. 2A

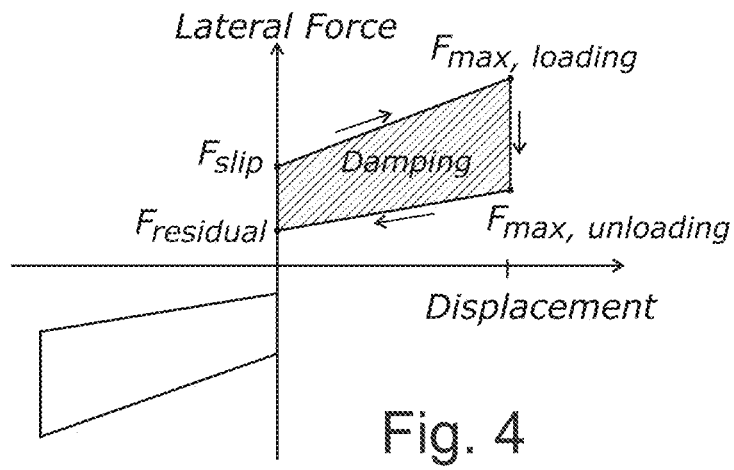
Fig. 4
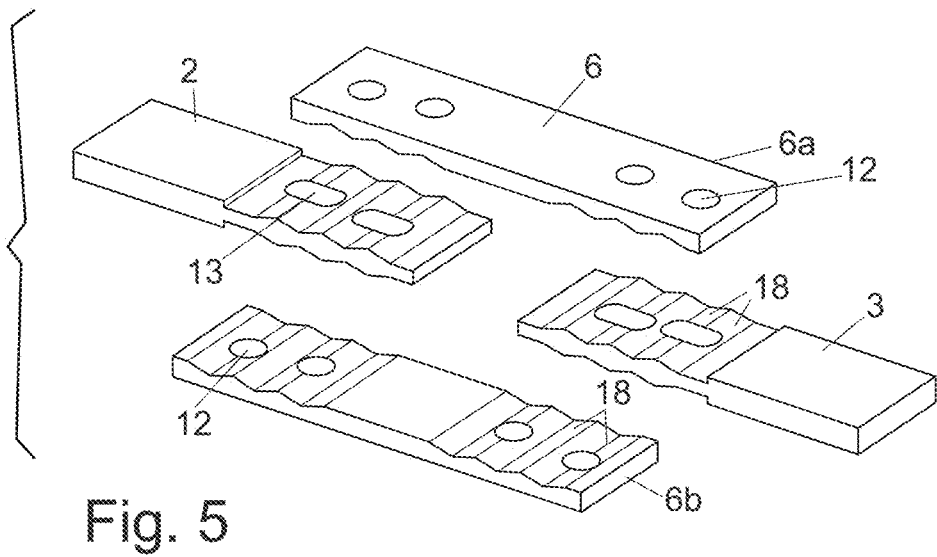
Fig. 5
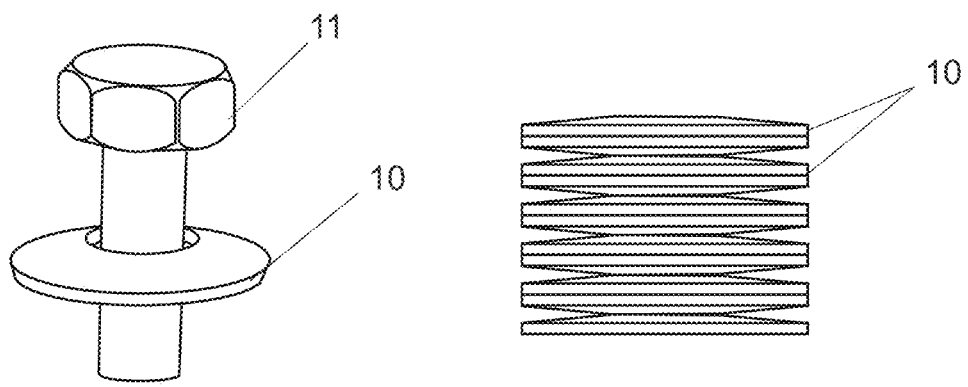
Fig. 6
Fig. 7

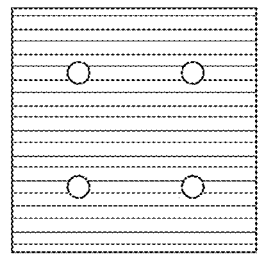
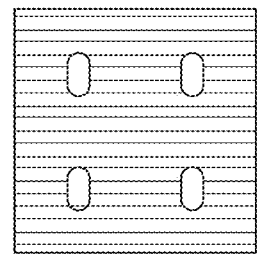
Fig. 11C　　　　　　Fig. 11D
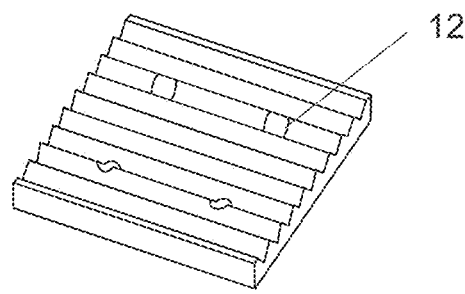
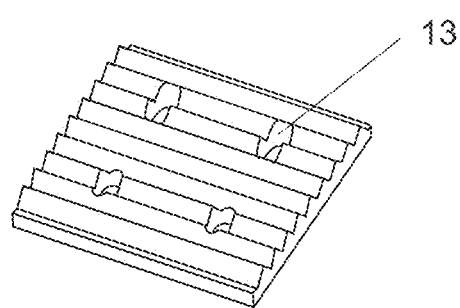
Fig. 11E　　　　　　Fig. 11F
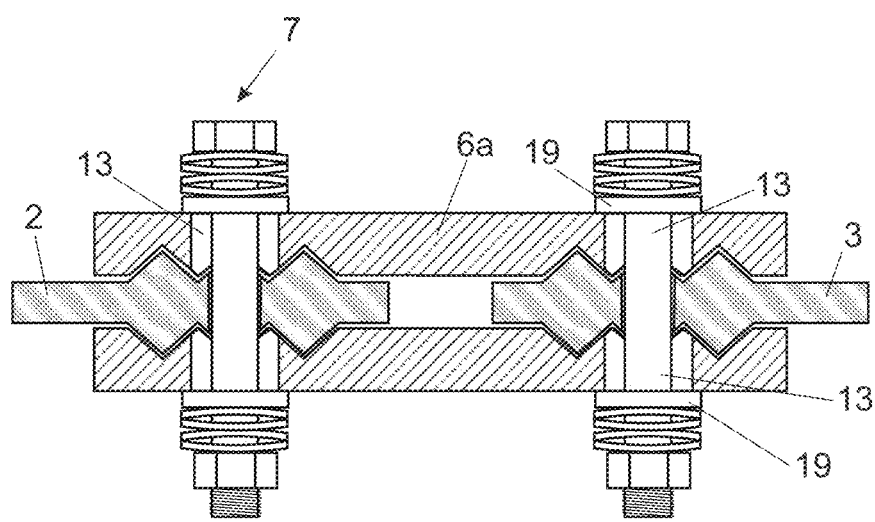
Fig. 11G

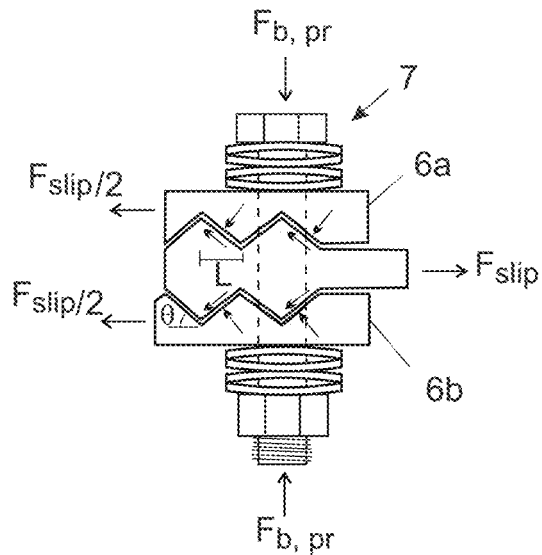
Fig. 13A
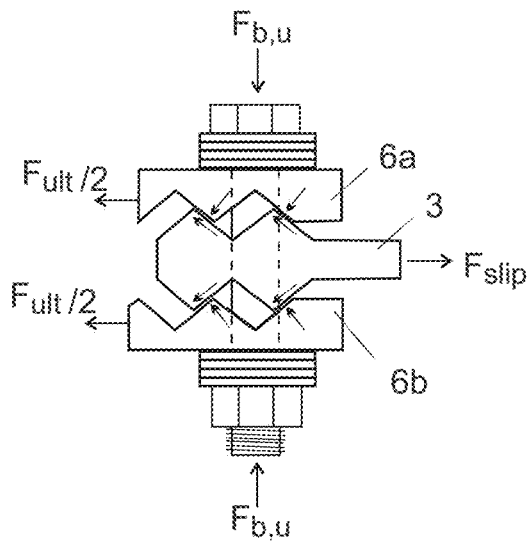
Fig. 13B
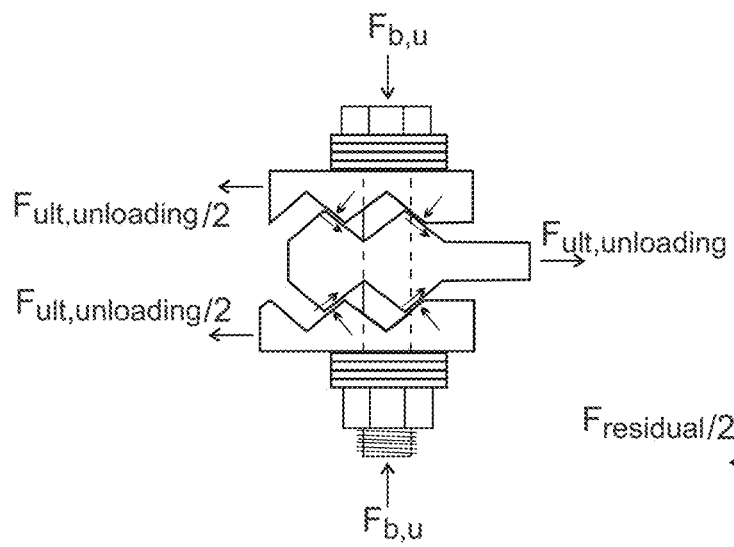
Fig. 13C
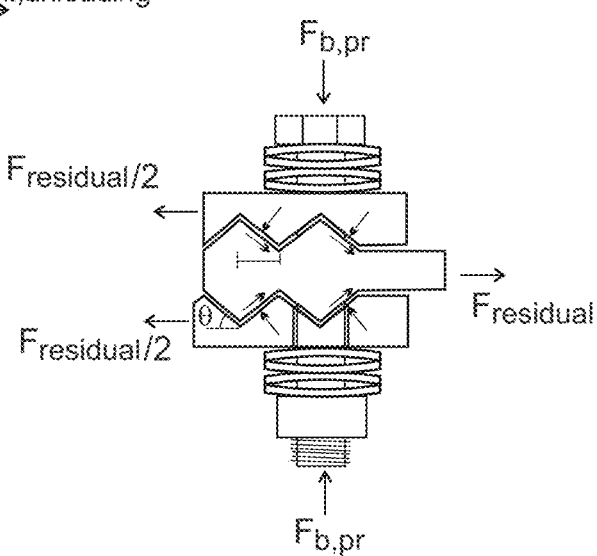

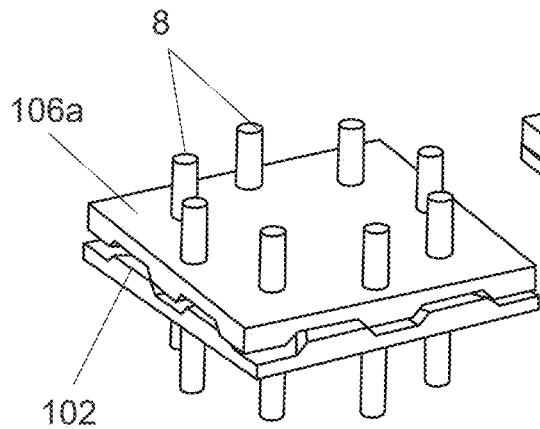
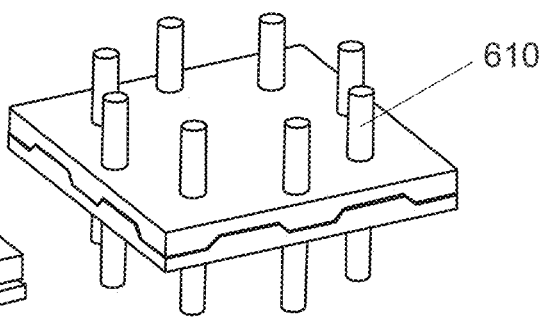
Fig. 22D
Fig. 22E
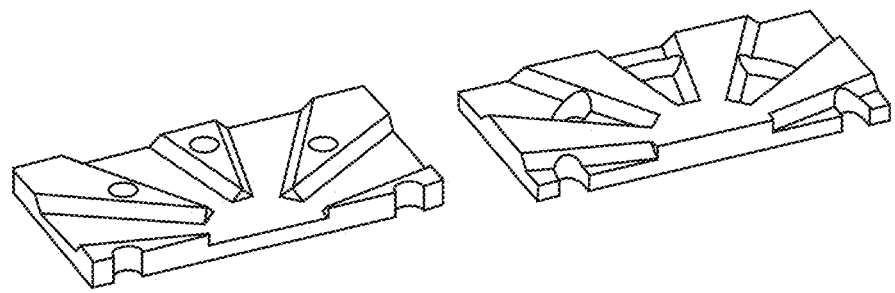
Fig. 22F
Fig. 22G

RESILIENT SLIP FRICTION JOINT

CROSS-REFERENCE TO RELATED APPLICATIONS

This application is a Continuation of U.S. patent application Ser. No. 17/805,422 filed Jun. 3, 2022, which is a Continuation of U.S. patent application Ser. No. 15/575,799 filed Nov. 20, 2017, which is a U.S. National Phase of International Application No. PCT/IB2016/052962 filed May 20, 2016, which claims priority to New Zealand Patent Application No. 718585 filed Mar. 31, 2016 and New Zealand Patent Application No. 712496 filed Sep. 18, 2015 and New Zealand Patent Application No. 708334 filed May 20, 2015, all of the disclosures of which are incorporated by reference herein.

FIELD OF THE INVENTION

The present invention relates to a resilient slip friction joint and in particular but not solely to a resilient slip friction joint being, or forming part of, a structural connection system of a structure, or structures that incorporate the resilient slip friction joint.

BACKGROUND

Modern building design in earthquake prone regions takes account of the prospect of seismic damage. Seismic damage reduction design of buildings involves ensuring that building structures have some capacity to yield when subject to an earthquake. Research has focused on constructions that allow movement of the building to occur whilst ensuring the building remains intact and to avoid permanent damage. Components that rely on friction to dissipate energy are known. In the building industry, available structural joint solutions for resisting and damping seismic forces are mainly based on yielding/failure of some components in the joint system to achieve the required ductility and energy dissipation. Slip-friction joints using simple flat steel plates sliding over each other have already proven to be an effective structural connection solution. The energy dissipation mechanism of sliding frictional plates is an efficient means amongst passive devices. An example is shown in the patent specification of JP 2014098440. After displacement of the plates has occurred during a seismic event, the plates will come to rest. This may not be in the original pre-event position. Friction between the plates may be large enough to resist any residual forces from inherent building elasticity and prevent movement of the building (or parts of it) back to its original position. Non elastic building deformation, as a result of the seismic event, may also contribute. As a result a building's displacement or drift, after the event, may remain undesirable. Existing slip friction joint solutions result in the structure not being usable after a sufficiently significant earthquake even though the immediate safety of occupants is satisfied. Examples can include jammed lifts caused by a curved lift shaft and components, doors jamming and windows not closing.

The lack of self-centering of existing slip friction joints in buildings requires the use of an additional system to bring back the structure to its initial position after an earthquake, which is quite costly. Examples are the use of post-tensioned cables (Wolski et al., 2009) or ring springs (Khoo et al., 2013) in combination with slip-friction joints.

In other situations in structural design where a connection is made between a floor plate (or horizontal beam) and a shear wall, the connection is rigid. Where a racking motion is induced by an earthquake the connection will induce bending moment and torsional loading to the components it is connected to, as can be seen in FIG. 28.

Bridges utilise flexible connections of a variety of complex natures to help vertical support to bridge decks from pontoons below, yet allow translational and rotational relative motion to be accommodated to some degree. This is necessary to damp the earthquake loads and accommodate the relevant deflections. Also for some degree of damping of vertical forces induced due to heavy traffic.

It is therefore an object of the present invention to provide a resilient slip friction joint for use in construction to dampen force transmission between construction elements caused by external loading and to bias the construction elements towards their original disposition prior to external loading being applied.

BRIEF DESCRIPTION OF THE INVENTION

Accordingly in a first aspect the present invention may broadly be said to be a slip connector to connect a first and second members so as to allow relative but resisted movement, and also at least in part return any movement, between the members; the connector comprising or including: a first component connectable to a said first member, a second component connectable to a said second member, each of the first component and second component comprising a mutually slidable ramped surface, and at least one resilient fixer to hold the components with mutually slidable ramped surfaces together such that relative movement of the ramped surfaces may be frictionally resisted, and wherein the ramped surfaces are oblique to the line or lines of action of the at least one resilient fixer such that the connector causes an at least partial return of relative sliding movement of the ramped surfaces of the first and second components.

Preferably the at least partial return of relative sliding movement of the ramped surfaces of the first and second components, the oblique angle of the ramped surfaces to the line or lines of action of the at least one resilient fixers is provided sufficient that, under the hold of the two components by the at least one resilient fixer, frictional resistance between the mutually slidable ramped surfaces may be overcome.

Preferably an at least partial return of the sliding movement of the ramped surfaces of the first and second components is caused at least in the absence of external forcing.

Preferably the return of the sliding movement of the ramped surfaces of the first and second components comprises a return towards an equilibrium position.

Preferably the return of the sliding movement of the ramped surfaces of the first and second components comprises a return to an equilibrium position.

Preferably the at least partial return of the sliding movement of the ramped surfaces of the first and second components comprises a complete return of said sliding movement.

Preferably the sliding movement of the first and second components comprises a movement of the connector away from a centred condition, and the return of the sliding movement comprises a return towards the centred condition.

Preferably to provide the at least partial return of relative sliding movement of the ramped surfaces of the first and second components under the hold of the two components by the at least one resilient fixer, the tangent of an angle being 90 degrees minus an acute angle between the ramped surfaces and the line or lines of action of the at least one resilient fixer is greater than the coefficient of static friction between the slidable ramped surfaces of the first component and second component.

Preferably the angle of 90 degrees minus an acute angle between the ramped surfaces and the line or lines of action of the at least one resilient fixer is an angle of between 25 and 30 degrees when the coefficient of static friction between the slidable ramped surfaces is between 0.36 and 0.39.

Preferably to provide the at least partial return of relative sliding movement of the ramped surfaces of the first and second components under the hold of the two components by the at least one resilient fixer, the sine of an angle being 90 degrees minus an acute angle between the ramped surfaces and the line or lines of action of the at least one resilient fixer, divided by the sum of one and the cosine of the angle of the ramped surfaces, is greater than the coefficient of static friction between the contiguous ramped surfaces.

Preferably the angle of 90 degrees minus an acute angle between the ramped surfaces and the line or lines of action of the at least one resilient fixer is an angle of between 25 and 45 degrees when the coefficient of static friction between the slidable ramped surfaces is between 0.36 and 0.39.

Preferably the angle of 90 degrees minus an acute angle between the ramped surfaces and the line or lines of action of the at least one resilient fixer is an angle of between 10 and 90 degrees.

Preferably the first component presents as an array a plurality of ramped surfaces in a wave form, and the second component presents as an array a plurality of complementary ramped surfaces in a wave form to engage with the array of the first component.

Preferably the first component presents as an array a plurality of upwardly inclined and downwardly inclined ramped surfaces, and the second component presents as an array a plurality of upwardly inclined and downwardly inclined ramped surfaces to engage with the array of the first component.

Preferably the ramped surfaces of the first and second components are caused to ride up on each other under a sliding movement of the ramped surfaces.

Preferably the rate of return of the relative sliding movement of the first component and second component is determined at least in part by the magnitude of the hold of the first and second components by the at least one resilient fixer.

Preferably an increase in the magnitude of the hold of the first component and second component together by the at least one resilient fixer is associated with an increase in the return speed of the sliding movement.

Preferably there are at least two second components and the two second components sandwich at least part of the first component.

Preferably the two second components sandwich at least part of the first component.

Preferably the resilient fixer passes through the first component.

Preferably the resilient fixer passes from said second component(s) through said first component.

Preferably the resilient fixer passes through said second component(s) and through said first component.

Preferably said resilient fixer each comprises a fastener, and at least one biasing member interposed the fastener and the assembly of first and second components, to apply a biasing force to cause the resilient hold of the associated resilient fixing(s).

Preferably the biasing member is at least one spring selected from one of more of a: Belleville washer, leaf spring, and a coil spring.

Preferably maximum displacement of first and second members, during movement is measured.

Preferably a displacement measuring device is provided to measure at least one of the maximum displacement between said first and second members, the displacement of the first component relative the second component, displacement of the first component relative the second component in a direction parallel to the line of action of the fixer, the displacement of the first component relative the second component in a direction perpendicular to the line of action of the fixer.

Preferably the displacement measuring device measures displacement of the first component relative the second component.

Preferably the displacement measuring device measures displacement of the first component relative the second component in a direction parallel to the line of action of the fixer.

Preferably the displacement measuring device measures displacement of the first component relative the second component in a direction perpendicular to the line of action of the fixer.

Preferably a plurality of mutually ramped surfaces are provided to define an array of ramped surfaces of a wave form such as a triangular wave form saw tooth wave form, sinusoidal wave form truncated triangular wave form.

Preferably the first member presents as an array a plurality of ramped surfaces in a wave form and said second member presents as an array a plurality of complimentary ramped surfaces in a wave form to engage with said first mentioned array.

Accordingly in another aspect the present invention may broadly be said to be a slip connector to connect first and second members so as to allow relative but resisted movement due to an external forcing, and also at least in part return any movement, between the members; the connector comprising or including: a) a first component connectable to a said first member, b) a second component, c) at least one third component over and/or under lapping at least part of at least one of the first component and the second component, at least one of the second component and the at least one third component connectable to a second member, d) at least one resilient fixing to hold the first and third components contiguous, and e) at least one resilient fixing to hold the second and third components contiguous; wherein the contiguous interrelationship of each of the first and third components and second and third components is of mutually ramped surfaces, the mutually ramped surfaces allowing for relative sliding in a first direction of the first and third components relative each other and the second and third components relative each other, under the external forcing, the relative sliding occurring oblique to the direction of resilient hold of the associated resilient fixings, such that upon a ceasing of the external force the components are caused to return in a direction opposite the first direction.

Preferably the return in the direction opposite the first direction is provided, under the hold of the two components by the at least one resilient fixer, where the tangent of an angle being 90 degrees minus an acute angle between the ramped surfaces and the line or lines of action of the at least one resilient fixer is greater than the coefficient of static friction between the mutually ramped surfaces of the first component and second component.

Preferably the angle of 90 degrees minus an acute angle between the ramped surfaces and the line or lines of action of the at least one resilient fixer is an angle of between 25 and 30 degrees when the coefficient of static friction between the slidable ramped surfaces is between 0.36 and 0.39.

Preferably two third components are provided, one overlapping part of at least one of the first component and the second component, and one underlapping a corresponding part of at the least one of the first component and second component, each overlapping or underlapping portion having a contiguous interrelationship of mutually ramped surfaces.

Preferably return in the direction opposite the first direction is provided, under the hold of the two components by the at least one resilient fixer, where the sine of an angle being 90 degrees minus an acute angle between the ramped surfaces and the line or lines of action of the at least one resilient fixer, divided by the sum of one and the cosine of the angle of the ramped surfaces, is greater than the coefficient of static friction between the mutually ramped surfaces.

Preferably the angle of 90 degrees minus an acute angle between the ramped surfaces and the line or lines of action of the at least one resilient fixer is an angle of between 25 and 45 degrees when the coefficient of static friction between the slidable ramped surfaces is between 0.36 and 0.39.

Preferably the second component is connectable to a second member.

Preferably the third component(s) is/are connectable to a second member.

Preferably the first and second members, when the first and third components are relatively sliding, are not caused to displace relative each other in the direction of resilient hold by the connector.

Preferably the first and second members, when the second and third components are relatively sliding, are not caused to displace relative each other in the direction of resilient hold by the connector.

Preferably the first and second members, when the second and third components are relatively sliding, are not caused to displace relative each other in the direction of resilient hold by the connector.

Preferably there are two third components at least one connectable to a second member.

Preferably there is a contiguous interrelationship of second and third components and that is of mutually ramped surfaces; and wherein such mutually ramped surfaces allow for relative sliding of second and third components obliquely to the direction of resilient hold of the associated resilient fixing(s).

Preferably there is no second component and the third component(s) are connected to at least one second member, and preferably to several second members.

Preferably at least one said third component is able to displace laterally relative the first and/or second component to which it is engaged.

Preferably the resilient fixings captures the first component with the at least one third component.

Preferably the resilient fixings each comprise of a single and preferably a double headed fastener and at least one biasing member interposed with the fastener and the assembly of first and third and preferably second components, between the one and preferably two heads, to apply a biasing force to cause the resilient hold of the at least one associated resilient fixing(s).

Preferably the single and preferably double headed fasteners are threaded.

Preferably the double headed threaded fastener comprises a bolt and nut.

Preferably the at least one biasing member is at least one spring selected from one of more of a leaf spring, a coils spring, a Belleville washer.

Preferably each resilient fixing has a dedicated biasing member.

Preferably each resilient fixing is reliant on one biasing member.

Preferably a plurality of biasing members are provided for each resilient fixing.

Preferably each biasing member acts between a head of the threaded fastener and an adjacent third component.

Preferably a biasing member is provided between each head and its adjacent third component.

Preferably the biasing member as aforementioned may be an assembly of a plurality of biasing members.

Preferably there are two of said third components, acting together as a resiliently expandable clamp with said resilient fixings to sandwich at least part of said first component.

Preferably there are two of said third components, acting together as a resiliently expandable clamp with said resilient fixings to sandwich at least part of said first component and said second component.

Preferably the first and third components are adapted and configured to move relative each other in a linear translational manner.

Preferably each third component is a linear elongate member extending in the direction of relative movement between the third components and said first component.

Preferably each third component is a linear elongate member extending in the direction of relative movement between the third components and said first component and said second component.

Preferably at least one and preferably both of (a) at least one and preferably both where provided of said third component and (b) said first component provide an array of upwardly inclined and downwardly inclined ramps for said sliding and cause expansion of said clamp.

Preferably the first component presents as an array a plurality of ramped surfaces in a wave form, and the second component presents as an array a plurality of complementary ramped surfaces in a wave form to engage with the array of the first component.

Preferably the first component presents as an array a plurality of upwardly inclined and downwardly inclined ramped surfaces, and the second component presents as an array a plurality of upwardly inclined and downwardly inclined ramped surfaces to engage with the array of the first component.

Preferably the ramped surfaces of the first and second components are caused to ride up on each other under a sliding movement of the ramped surfaces.

Preferably the arrays extends in a direction parallel to the direction of relative movement of the at least one third component to the first component.

Preferably the structure is a building structure.

Preferably the first member is selected from one of a beam, column, floor plate brace and foundation.

Preferably the ramped surfaces and resilient fixings are adapted and configured to allow riding up upon sliding of adjacent components upon the applications of a force to cause the third component to move relative the first component and against the bias of the resilient fixings yet bias the sliding components towards an equilibrium position.

Preferably at least one and preferably both of (a) at least one and preferably both where provided of said third component and (b) said first component and said second component provide an array of upwardly inclined and downwardly inclined ramps for said sliding and cause expansion of said clamp.

Preferably the arrays extend in a direction parallel to the direction of relative movement of the third components to the first and second components.

Preferably the first and second members are structural members of a structure.

Preferably the structure is a building structure.

Preferably the first member is selected from one of a beam, column, floor plate brace and foundation.

Preferably the second member is selected from one of a beam, column, floor plate brace and foundation.

Preferably the ramped surfaces and resilient fixings are adapted and configured to allow riding up upon sliding of adjacent components upon the applications of a force to cause the third component to move relative the first and second components and against the bias of the resilient fixings yet bias the sliding components towards an equilibrium position.

Preferably the first component and third component are adapted and configured to rotate relative each other about a rotational axis, each of said first component and third component including mutually engageable surfaces to allow a ramped sliding to occur there between, the surfaces extending substantially radially to the rotational axis.

Preferably the surfaces move, when ramping up and down over each other, in a manner purely rotational about the rotational axis.

Preferably when the surfaces are sliding in a ramped manner, the first and third components move relative each other in a direction parallel to the rotational axis, as well as rotate there about.

Preferably where two third components are provided, one third component may not move lateral to the first component upon relative rotation, by virtue of interfacing surfaces not being ramped but rather being planar, the rotational axis being normal to said plane.

Preferably the rotational form the ramped surface has a normal or normals that is/are not (a) parallel the axis of rotation and (b) perpendicular to the axis of rotation.

Preferably the rotational form the ramped surface has a normal or normals at any given radial distance from the rotational axis that is/are, when viewed in a direction parallel to the axis of rotation, tangential to a notional circle at that radial distance.

Preferably the first component and second component include mutually ramped surfaces that can cause a lateral movement between the first and third component when said first and third component are caused to displace in any two dimension translational manner.

Preferably the first and third components are adapted and configured to move relative each other in a linear translational manner.

Preferably the first and second members are structural members of a structure.

Preferably the structure is a building structure.

Preferably the first member is selected from one of a beam, column, floor plate brace and foundation.

Preferably the second member is selected from one of a beam, column, floor plate brace and foundation.

Accordingly in a further aspect the present invention may broadly be said to be a structural connector to provide damping and positional restorative functions between two structural members that may be subjected to an external force that causes relative movement of the two structural members, the connector comprising: a first frictional plate that is juxtaposed with a second frictional plate, held together under a bias force, interfacing frictional surfaces of the first and second frictional plates able to slide over and relative each other in a direction at an angle to the direction of the bias force, and the coefficient of static friction between the interfacing surfaces of the first and second frictional plates being such that, when an external force is applied to said first frictional plate and said second frictional plate by said two structural members when subjected to said motion, the biasing force encourages the interfacing surfaces of the first and second frictional plates to slide in a direction opposite said first mentioned direction with sufficient magnitude so as to overcome static frictional forces between the interfacing surfaces of the plates.

Preferably the interfacing surfaces of the first frictional plate and second frictional plate each comprise mutually slidable ramped surfaces, the angle of the sliding of the plates over and relative to each other being determined by a ramp angle of the ramped surfaces.

Preferably the mutually slidable ramped surfaces each comprise a plurality of upwardly inclined and downwardly inclined ramp surfaces.

Preferably the ramped surfaces are of a saw tooth wave profile.

Preferably the ramped surfaces are oblique to the line of action of the bias force.

Preferably the sliding in the direction opposite the first direction comprises a return towards an equilibrium position.

Preferably the sliding in the direction opposite the first direction comprises a return to an equilibrium position.

Preferably the sliding in the direction opposite the first direction comprises a complete return of said sliding movement in the first direction.

Preferably the first component is associated with a first structural member and the second component is associated with a second structural member.

Preferably the slip connector further comprises of at least one third frictional plate over and/or under lapping and held to, by a bias force, at least part of at least one of the first frictional plate and the second frictional plate, and wherein interfacing frictional surfaces are further provided between the at least one third frictional plate and the at least one of the first frictional plate and second frictional plate.

Preferably the first component is associated with a first structural member and the third component is associated with a second structural member.

Preferably the sliding in the direction opposite the first direction in the absence of the external force is provided, under the hold of the two components by the at least one resilient fixer, where the tangent of an angle being 90 degrees minus an acute angle between the ramped surfaces and the line or lines of action of the at least one resilient fixer is greater than the coefficient of static friction between the mutually ramped surfaces of the first component and second component.

Preferably the angle of 90 degrees minus an acute angle between the ramped surfaces and the line or lines of action of the at least one resilient fixer is an angle of between 25 and 30 degrees when the coefficient of static friction between the slidable ramped surfaces is between 0.36 and 0.39.

Preferably two third components are provided one overlapping and the other underlapping.

Preferably the connector returns in the direction opposite the first direction is provided, under the hold of the two components by the at least one resilient fixer, where the sine of an angle being 90 degrees minus an acute angle between the ramped surfaces and the line or lines of action of the at least one resilient fixer, divided by the sum of one and the cosine of the angle of the ramped surfaces, is greater than the coefficient of static friction between the mutually ramped surfaces.

Preferably the angle of 90 degrees minus an acute angle between the ramped surfaces and the line or lines of action of the at least one resilient fixer is an angle of between 25 and 45 degrees when the coefficient of static friction between the slidable ramped surfaces is between 0.36 and 0.39.

Preferably a limit is provided to limit the sliding of the interfacing surfaces of the first and second frictional plates, the limit preventing the sliding further than the length of an upwardly inclined or downwardly inclined ramp surface.

Preferably the bias force is provided by at least one resilient fixer, the at least one resilient fixer each comprising a fastener, and at least one biasing member interposed with the fastener and the assembly of frictional plates, and wherein the at least one resilient fixer provides the said limit.

Preferably the bias force is provided by at least one spring.

Preferably the bias force is provided by a spring or spring assembly.

Preferably the biasing force is sufficient to cause the interfacing surfaces of the first and second frictional plates to slide in a direction opposite said first mentioned direction when the external force applied by said two structural members ceases.

Preferably the frictional plates separate laterally and against the bias force, and displace longitudinally in a direction perpendicular to said bias force when said the interfacing surfaces of the first and second frictional plates slide relative each other in said first mentioned direction.

Preferably the frictional plates consolidate laterally and with the bias force, and displace longitudinally in a direction perpendicular to said bias force when said the interfacing surfaces of the first and second frictional plates slide relative each other in said direction opposite said first mentioned direction.

Preferably the frictional plates consolidate laterally and with the bias force, and displace longitudinally in a direction perpendicular to said bias force when said interfacing surfaces of the first and second frictional plates slide relative each other in said second mentioned direction.

Preferably the frictional plates move relative to each other in a linear translational manner.

Preferably the frictional plates can be caused to displace rotationally about an axis of rotation in one direction and separate in a direction parallel the direction of the bias force when said interfacing surfaces of the first and second frictional plates slide relative each other in said first mentioned direction.

Preferably the frictional plates displace rotationally about an axis of rotation in one direction and consolidate in a direction parallel the direction of the bias force when said interfacing surfaces of the first and second frictional plates slide relative each other in said direction opposite said first mentioned direction.

Preferably the frictional plates can be caused to slip relative each other in a planar omni directional manner and separate in a direction parallel normal of said plane against the direction of the bias force when said interfacing surfaces of the first and second frictional plates slide relative each other.

Preferably at least the maximum displacement between the two frictional plates is measured/recorded.

Preferably the displacement in a direction parallel the bias force between the two frictional plates is measured/recorded.

Preferably the displacement in a direction perpendicular the bias force between the two frictional plates is measured/recorded.

Preferably a displacement measuring device is engaged to said structural connector for the purposes of measuring/recording.

Accordingly in another aspect the present invention may broadly be said to be a structural connector to provide damping and positional restorative functions between two structural members that may be subjected to motion that causes relative movement of the two structural members, the connector comprising: as a first set, a first frictional plate that is juxtaposed a second frictional plate, held together under a bias force, interfacing frictional surfaces of the first and second frictional plates able to slide over and relative each other in a direction at an angle less than 90 degrees and greater than 10 degrees to the direction of the bias force when an external force is applied to said first frictional plate and said second frictional plate by said two structural members when subjected to said motion, the biasing force encouraging the interfacing surfaces of the first and second frictional plates to slide in a direction opposite said first mentioned direction, as a second set, a third frictional plate that is juxtaposed a fourth frictional plate, held together under a second bias force, interfacing frictional surfaces of the third and fourth frictional plates able to slide over and relative each other in a direction at an angle less than 90 degrees and greater than 10 degrees to the direction of the second biasing force when an external force is applied to said third frictional plate and said fourth frictional plate by said two structural members when subjected to said motion, the second biasing force encouraging the interfacing surfaces of the third and fourth frictional plates to slide in a direction opposite said first mentioned direction, wherein at least one of: (a) the slide direction angle of the first and second plates is different to the side direction angle of the third and fourth plates, (b) the first mentioned biasing force is not the same as the second biasing force, and (c) a threshold of relevant movement of said two structural members needs to be reached before said third and fourth frictional plates engage to slide over each other.

Accordingly in another aspect the present invention may broadly be said to be a connector that can connect a first building member and at least one other building member together in a manner to allow a resilient displacement of the first member relative said second member to occur during an externally induced oscillatory event, the connector comprising of an assembly comprising of first component to move with said first building member and a clamping assembly to at least in part sandwich said first component, said clamp assembly directly or indirectly connected to said at least one other building member and to move relative said first building member, the clamping assembly resiliently expandable in a direction lateral to the direction of relative movement between the first building member and at least one other building member, yet biased to hold the clamp assembly and first component with mutually slidable surfaces contiguous by a biasing means the line of action thereof being oblique to the slidable surfaces held contiguous.

Preferably the clamping assembly comprises at least one resilient bolt fixer to hold the two components with mutually slidable surfaces contiguous.

Preferably the biasing means is a spring.

Preferably the spring is a compression spring or tension spring.

Preferably the spring may comprise of at least one of a leaf spring, coil spring, Belleville washer.

Preferably the clamping assembly moves relative said second building member both in the lateral direction and direction of relative displacement between the first and second building members.

Preferably the displacement is a linear displacement.

Preferably the displacement is rotational displacement.

Preferably the displacement, save for the lateral expansion, is an in plane displacement.

Accordingly in another aspect the present invention may broadly be said to be a slip connector to provide a slip connection between structural members, the connector, whether inclusive or exclusive of any adaption to engage, or inclusive of or exclusive of any member to engage, a said structural member, having at least two components interfacing with surfaces adapted to slide relative to each other and held to that interfacing relationship by at least one fixer with resilience in its line (or lines) of action, and with such line(s) of action being oblique to the interfacing surfaces.

Preferably there is only the two components and each is adapted to connect directly or indirectly to a respective said structural member.

According to another aspect there are at least three components, being: a first component connectable to a said first member, a second component connectable to a said second member, at least a third component over and/or under lapping part of the first component and part of the second component, at least one resilient fixer to hold the first and at least third components in an interfacing surfaces relationship, and at least one resilient fixing to hold the second and at least third components in an interfacing surfaces relationship.

According to another aspect each surface to surface interrelationship is of mutually ramped surfaces; and wherein such mutually ramped surfaces allow for relative sliding obliquely to the direction of resilient hold of the associated fixer(s) of the associated components.

Preferably each surface to surface interrelationship is of plural surface regions each oblique to said line(s) of action.

Preferably each surface to surface interrelationship is of mutually ramped surfaces that are of a triangular wave profile.

Preferably each surface to surface interrelationship is of mutually ramped surfaces that are of a saw tooth wave profile.

Preferably each surface to surface interrelationship is of mutually ramped surfaces that are of a sinusoidal wave profile.

Preferably each fixer is or includes a bolt and nut.

Preferably each bolt and nut includes at least one resilient washer or spring.

Accordingly in another aspect the present invention may broadly be said to be a building structure, a slip connector between members of the structure to allow movement between the members commensurate to the slip of the connector, the slip connector being characterised in that at least two interfaced surfaces of components of the connector can slip relative to each other (one another) whilst being held together by a resilient fixer assembly with a line of action oblique to its associated interfaced surfaces.

Preferably the movement is linear.

Preferably the movement is planar.

Preferably the components of said connector to slip include a first array of interfaced surfaces and a second array of interfaced surfaces, the normal to the surface or surfaces of said first array of surfaces extending in a first plane and the normal to the surface or surfaces of said second array of surfaces extending in a second plane substantially perpendicular to said first plane.

Preferably the movement is rotational.

Preferably the two interfaced surfaces extend substantially radially from a notional axis of rotation about which said components of said connector to slip, can rotate relative each other.

Preferably the members of the structure between which the connector is operative are able to move relative each other in the direction of slip, such slip direction movement not resulting in any connector induced separation between the members of the structure.

Preferably the resilient fixer assembly is affixed to a first of said members of the structure and a first of said two interfaced surfaces of components is affixed to a second of said members of the structure.

Accordingly in another aspect the present invention may broadly be said to be a slip connector comprising a first component sandwiched between a resiliently expandable clamp assembly biased to hold sliding surfaces of said first component and clamp assembly in a contiguous relationship, yet can expand in a direction lateral to a direction of relative movement between the first component and clamp assembly caused by the application of force in opposing directions to each of said first and clamping assemblies, the sliding surfaces adapted and configure to be oblique to the line of action of the bias and allow expansion in the lateral direction to occur upon sufficient of said force being applied yet draw the first component and clamp assembly back towards the status quo condition.

Accordingly in another aspect the present invention may broadly be said to be a slip connector to attach between members of a building structure to allow resisted relative movement of said members, the connector having at least first and second components having a surface to surface frictional interface to allow the slip and at least one fixing assembly to resiliently hold the first and second components together so that surface to surface interface remains, the arrangement characterised that the line(s) of action of the fixing assembly is sufficiently oblique to the interfaced surfaces so as to either or both: i. allow sliding as if up a ramp, and/or ii. to provide a restorative and/or resisting component of force favouring movement as if down a ramp and/or favouring the status quo.

Preferably the fixing assembly is sufficiently oblique to the interfaced surfaces so as to either or both: i. allow sliding, as if up a ramp, of the sliding surfaces and cause a separation of the first and second components in a direction against the line of action, and/or ii. to provide a restorative and/or resisting component of force favouring movement, as if sliding down a ramp, of the sliding surfaces and cause a of the first and second components to move closer together in a direction of the line of action and/or favouring the status quo.

Preferably the first and second components include slip limiting surfaces that engage with each other to prevent movement of the building components in a direction opposite the direction allowed for by said slip.

Preferably the first and second components include slip limiting surfaces that engage with each other to prevent slip from the status quo condition in a direction as if sliding down a ramp.

Preferably said first component is affixed to a first of said building members and said fixing assembly is affixed to a second of said building members said second component able to move relative said building members in a direction along the line of action.

Preferably the members of the structure between which the connector is operative are able to move relative each other in the direction of slip, such slip direction movement not resulting in any connector induced separation between the members of the structure.

Accordingly in another aspect the present invention may broadly be said to be a building structure comprising at least two structural elements that are connected by a connector herein described in any one or more of the above clauses.

Accordingly in another aspect the present invention may broadly be said to be a connection assembly comprising of two or more of the slip connectors as hereinbefore described, wherein in combination the slip connectors allow for at least two of a linear, omni-directional planar, or rotational motion between two associated structural members to be absorbed and restored.

Accordingly in another aspect the present invention may broadly be said to be a connection assembly comprising of two or more of the 1 dimensional connector, 2 dimensional connector and rotational connector as herein described in any one or more of the above clauses, to allow for two or more of a linear, planar and rotational relative displacement between structural members to be absorbed and restored.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

FIGS. 1A-1C show simplified examples of structures in which 1D translational connectors as are herein described may be utilised, FIGS. 2A-2B show views of two alternative embodiments of a 1D translator connector, FIG. 4 shows a plot of theoretical calculated displacement vs lateral force encountered by a 1D translational connector during a single cycle of oscillation, FIG. 5 shows an exploded view of the plates of the double acting 1D translational connector of FIG. 3B, FIG. 6 shows a bolt and washer that may be used in the 1D translational connector, FIG. 7 shows a stack of washers as used in the preferred form of the 1D translational connector, FIG. 11C shows a plan view of a 1D connector plate of a wide format that could be used in the application shown in FIG. 11A, where the connector constructed is asymmetric, FIG. 11D is a plan view of a 1D connector plate to pair with that of the connector plate of FIG. 11C, FIG. 11E is a perspective view of the plate of FIG. 11C, FIG. 11F is a perspective view of the plate of FIG. 11D, FIG. 11G is a plan view of an alternate configuration of the 1D translational connector, FIGS. 13C-13D show a detailed view of part of a symmetric 1D translational connector to show the forces involved in relation to the unloading of the connector as described in the formulas herein provided, FIG. 45A shows an example application of two 1D connectors combined in series to form a structural joint.

DETAILED DESCRIPTION OF THE INVENTION

In this invention, details and variations of which will herein after be described, the components are formed and arranged to provide for positional restoring capacity as well as damped movement of the building or structure, through friction between plates.

The connectors herein described can be used in a number of construction applications. In the preferred form the connector is envisaged to be utilised in building structures and this is the application that will herein be described in more detail. It is also envisaged the connector may be used in other structures such as bridges, towers, building facades and other large or smaller scale structures. The connector is able to be used in many situations, including industrial shelving, or any other situation where compliance between structural members and self-centring is desirable. Further the connectors are suitable with steel, concrete, timber, or hybrid constructions and in column to beam, column to foundation, bracing or shear wall connections.

One Dimensional Connectors

We will firstly describe some basic forms of connectors that allow for 1 dimensional (also herein referred to as 1D) relative movement between components to which they are connected. An example of such a 1D connector 1, may for example be used in situations such as shown in FIGS. 1A-1C. In FIG. 1A the connectors 1 are shown used in a bracing frame situation. In FIG. 1B connectors 1 are shown in a moment resisting frame situation. In FIG. 1C they are used as hold-downs of a shear wall.

Figure 2B:
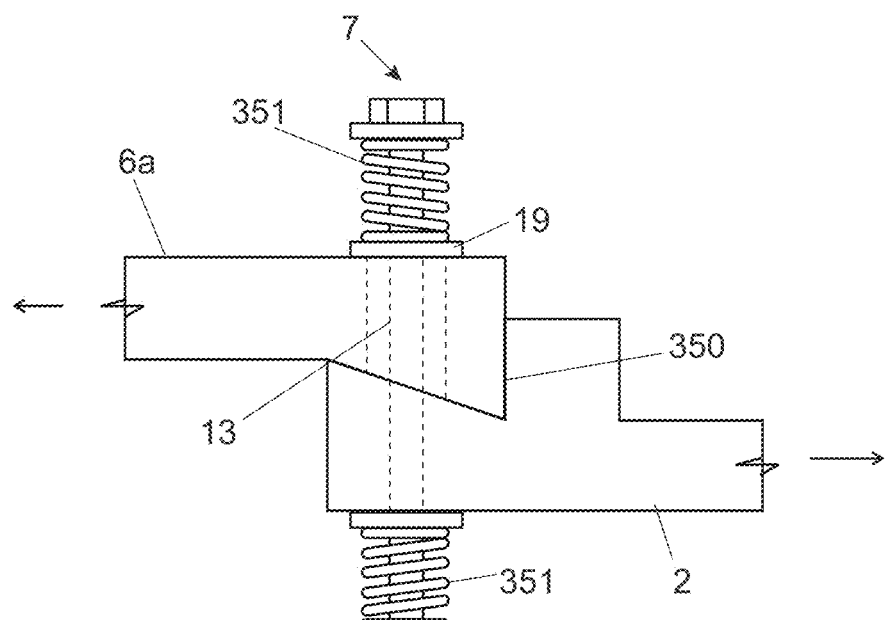

With reference to FIGS. 2A and 2B, a simple form of a 1D connector, is illustrated. In this configuration a first component 2 is held together with a second component 3 by a resilient fixing 7. Each of the first component 2 and second component 3 have complimentary ramped surfaces 18. The ramped surfaces 18 are at an angle oblique to the first component 2 and second component 3, and are able to move relative to each other, (as indicated by the arrows), by the sliding of the complimentary surfaces over each other.

Either one of the components 2,3 comprises a slot 13 which allows it to move perpendicularly relative to the resilient fixing 7. The first component 2 may further comprise a stopping surface 350 to prevent further sliding of the complimentary surfaces over each other past a neutral position. Alternatively, the first component may not comprise a stopping surface 350, but rather the extent of the slot 13 may be such as to act on the shaft of the resilient fixing 7 when the connector is in a neutral position, thus preventing sliding past the neutral position.

Washers 19 may be provided adjacent to the outer surfaces of the first component 2 and second component 3. Where either component is provided with the slot 13, the washer 19 is to be of a size larger than the size of the slot. When the slotted component moves relative to the resilient fixing 7, the washer 19 will slide relative to the surface of that component.

Between the washers 19 and the ends of the resilient fixing means 7, may be provided some form of biasing means for engaging the ramped surfaces of the two components to each other. In FIG. 2A the biasing means are shown as being washers, such as Belleville washers 10. In FIG. 2B the biasing means 351 are shown as being spring members.

The connector 1, on its own (or in addition with like connectors or other methods of creating a connection between the two members), will help ensure that the two members 2 and 3 are sufficiently rigidly, yet resiliently connected together. That is, the connector will preferably provide a high initial stiffness of the connection and effectively provide a rigid connection, until a threshold force between the two components is reached. This threshold force is herein referred to as $F_{slip}$. This is the force required to cause the connector to displace and allow the two members to move relative each other.

This may occur for example during seismic loading of (or other oscillation induced movement between) the two members 2, 3.

Importantly, the connector of the present invention is able to dissipate energy (thereby significantly reduce seismic loading) and by way of a self-induced restorative force, bias the connection towards and preferably back to its original condition. Thus the resilient joint is self-centring once the external loading (e.g. seismic event), has stopped.

With reference to FIG. 3 some preferred forms of the connector of the present invention are illustrated.

The connector in this form may consist of a first component 2 and a second component 3. The first component 2 may be secured to a first member (such as a column 4a of a building structure) and the second component 3 may be connected to a second member (such as a beam 4b of a building structure) as shown in FIG. 1B. A clamping assembly or resilient fixing 7, hold the assembly together. In some variations as herein described, there may not be a second component (operating as illustrated in FIG. 3C).

The connector 1, on its own or in addition with like connectors or other methods of creating a connection between the two members, will help ensure that the two members 2 and 3 are sufficiently rigidly yet resiliently connected together.

The connector will preferably provide a high initial stiffness of the connection and provide a rigid connection until a threshold force between the two components is reached. This threshold force is herein referred to as $F_{slip}$. This is the force required to cause the connector to allow the two members to displace relative each other.

The connector of the present invention is able to dissipate energy (thereby significantly reduce seismic loading) and by way of a self-induced restorative force (provided by the fixing 7), bias the connection towards and preferably back to its original condition.

With reference to FIGS. 3 and 5 it can be seen that the first component 2 and second component 3 of the connector are preferably at least in part over or underlapped by a third component 6. In the preferred form there are two of such third components 6a and 6b, provided on each side of the first and second components (symmetric condition). They preferably act in opposing directions on the first and second components 2,3.

Figure 8:
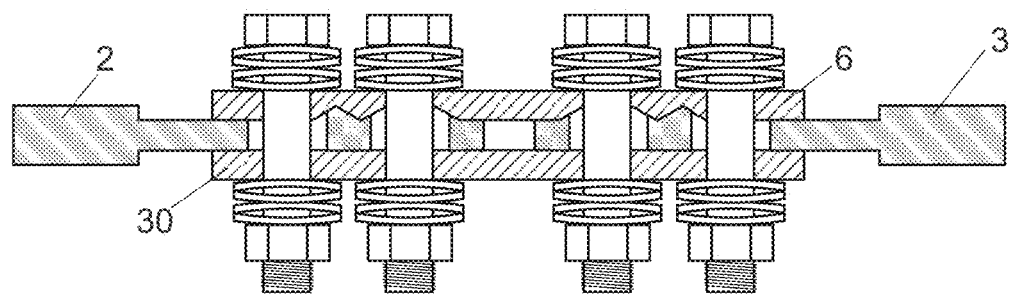
FIG. 8 shows a side view of an asymmetric 1D translational connector.
Figure 9:
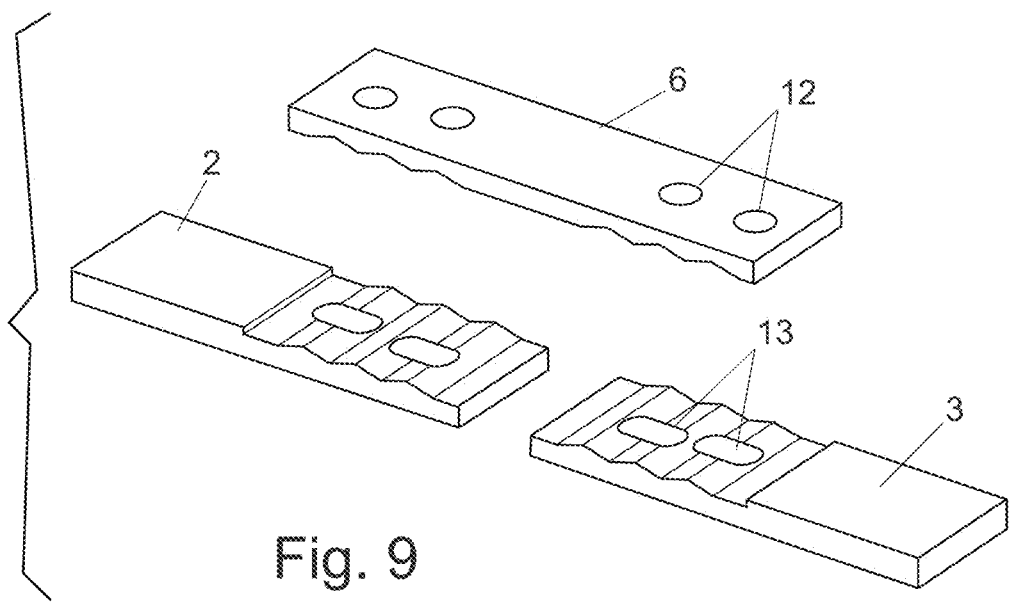
FIG. 9 shows an exploded view of some of the plates of the 1D translational connector of FIG. 8.

However in a variation as shown in FIGS. 8 and 9 only one third component 6 may be utilised (asymmetric condition). It is envisaged that multiple pairs of the third component may be utilised, each component of a pair acting in opposed directions.

The resilient fixing 7 in the preferred forms may be considered to be a resiliently expandable clamp that clamps, captures and/or sandwiches the first and second components 2,3.

In the preferred form, the first and second components are plate like in shape. They are elongate and generally flat, save for detailing that will herein after be described.

Figure 3A:
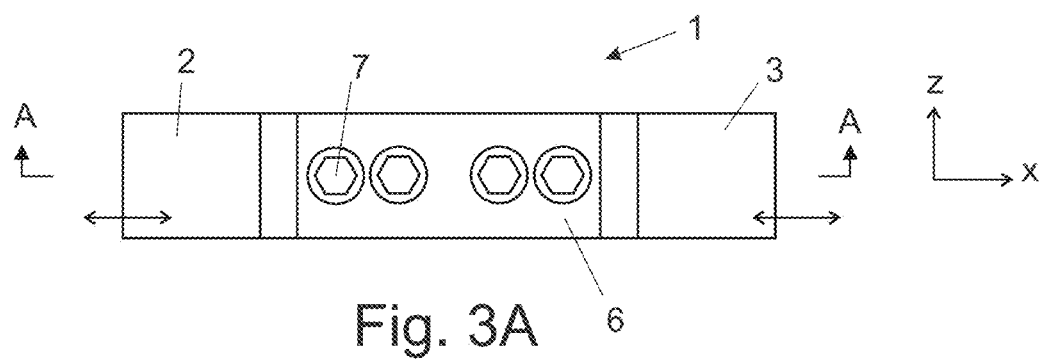
FIG. 3A shows a side view of a double acting 1D connector.
Figure 3B:
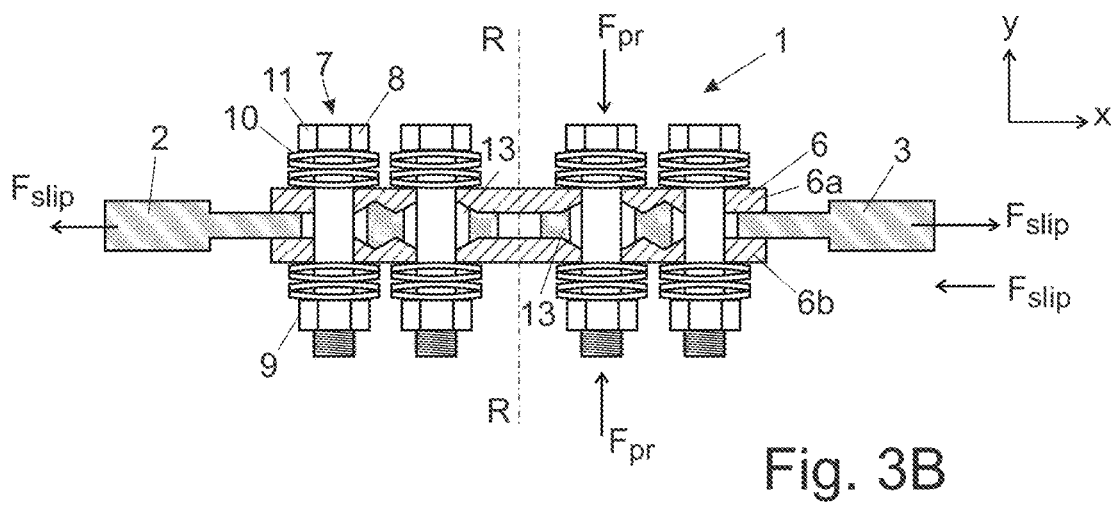
FIG. 3B shows a plan view of the double acting 1D connector of FIG. 3A.
Figure 3C:
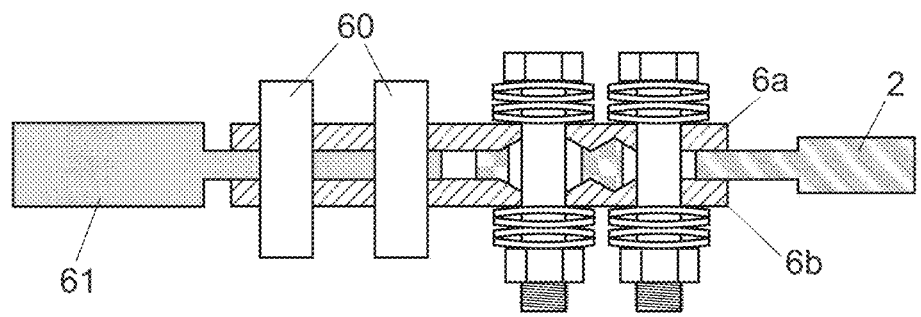
FIG. 3C shows a plan view of a single acting 1D connector.

They are able to move relative to the third component 6, in direction X as seen with reference to FIGS. 3A and 3B. This relative movement is preferably confined to this direction only, other than lateral movement induced by such movement of the third components(s) 6. The resiliently expandable clamp 7, is expandable in a direction lateral to direction X and preferably in direction Z. Lateral expansion is preferably linear but it is envisaged that mechanisms may be used where at least some rotational displacement occurs.

In the preferred form as shown in FIGS. 3A, 3B and 5 as an assembly, the first and second components 2,3 are captured between the two third components 6a and 6b. They are in a contiguous interrelationship and are so held in that relationship by at least one resilient fixing 7.

In the preferred form a plurality of resilient fixings 7 are provided. The resilient fixings preferably comprise of a threaded fastener such as a bolt 8 and nut 9. The bolt 8 extends through the assembly of the first or second component and the third component(s) as can be seen in FIG. 3A. Captured as part of that assembly is preferably at least one biasing means. This may for example be in the form of a Belleville washer or spring 10. Such a washer is captured by for example the head 11 of the bolt in between the head of the bolt and the assembly of the first or second component and the third component(s). In the preferred form the washer acts on the head of the bolt 11 or the nut 9 and against the adjacent third component 6. Preferably there is at least one washer 10 provided adjacent each of the bolt head 11 and/or nut 9 (as illustrated in FIG. 6).

In a preferred form a plurality of such washers 10 are provided and may be provided at each side of the assembly of the components as seen in FIG. 3B and FIG. 7. The washers are provided to allow for the resilient fixing 7 to exert a compression force on the assembly of the components. This has a direct bearing on the frictional resistance to movement of the assembly, and the biasing force. The tightening/loosening of the resilient fixing 7 provides a simple mechanism for 'tuning' of the clamping force to be achieved, in order to satisfy the design criteria for the joint.

An appropriate selection of washers will allow for an appropriate range of expansion to be provided for and compression force to be exerted on the assembly of the components.

In alternative forms, external springs 351 for example may directly engage and bias the two third components 6a,6b towards each other.

The force $F_{pr}$ can be seen acting on the assembly as shown in FIG. 3B. The resilient fixing(s) 7 allows for a lateral expansion of the component assembly. This expansion is parallel to the direction of the resilient force provided by the resilient fixings. The compression force of each resilient fixing is preferably coaxial the axis of the bolt. The compression force is preferably perpendicular the direction of relative movement between the first/second members of the resiliently expandable clamp. The compression force is parallel the direction of expansion/contraction of the resiliently expandable clamp.

In the preferred form there is at least one resilient fixing used at each of the first and second components. In FIG. 3B there are shown two fixings 7 on each of the first component 2 and second component 3, making 4 in total. A symmetrical design of the connector around an axis of symmetry RR as seen in FIG. 3B will assist in preventing shear forces being induced into the bolts when under load.

Expansion of the clamp from its rest position (as seen in FIG. 3B) is induced as a result of relative movement between one or both of the first or second components 2,3 and the clamp (in a direction that is preferably perpendicular to the clamp force $F_{pr}$). Expansion, occurs by virtue of the third component 6 and a respective first and second component 2,3 having a mutually ramped relationship to each other, whereby a ramped motion is induced between the two components. The relative movement between one or both of the first or second components and the clamp, occurs when a sufficiently large force $F_{slip}$ is applied to the first and second members to pull the members apart, or push them towards each other.

The lateral expansion and contraction of the component assembly can be seen in FIGS. 13A and 13B.

In the example shown where there are two third components 6a,6b as seen in FIG. 13A, it is observed that a displacement away from each other between the two third components 6a and 6b occurs upon a movement of the second component 3. The movement of the second component 3 induced by the Slip Force applied thereto, causes the displacement of the third component 6a and 6b away from each other in a direction parallel to the direction of resilient hold (e.g. the clamping force $F_{pr}$) applied by the resilient fixing 7.

In the preferred form at least one, and preferably a plurality, of complimentary shaped ramped surfaces are provided by each of the first and second components, and the regions of the third component with which the first and second components respectively engage.

Preferably each of the first and second components present an array of ramps, the array extending in the X direction. The ramps are sequentially up and down ramps. They extend as an array in the X-X direction. They are each preferably of the same configuration.

Figure 16A:
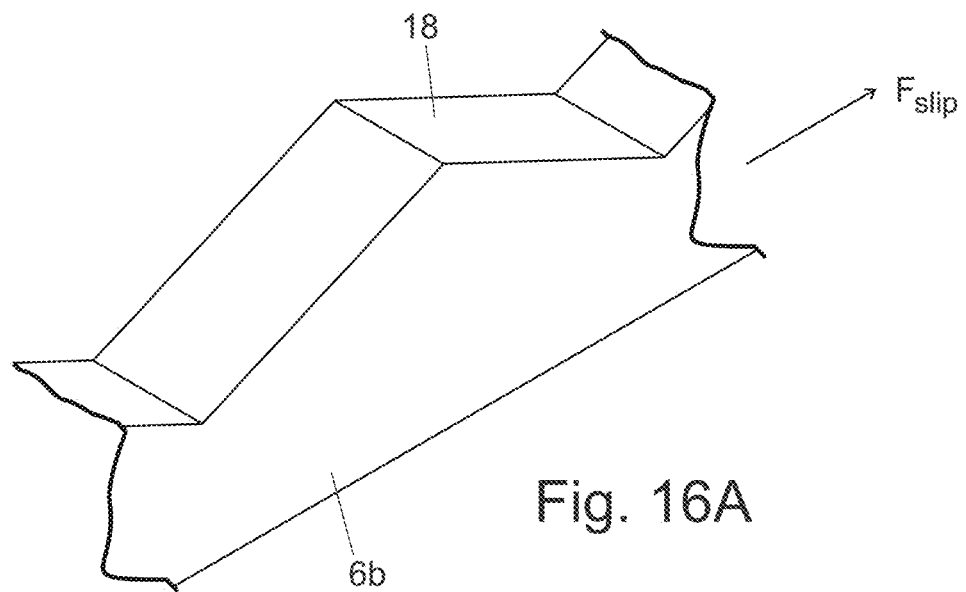
FIG. 16A shows a partial perspective view of the 1D translational connector of FIG. 3A to illustrate the ramped surfaces.

In the preferred form the ramped surfaces 18 are planar as seen in FIGS. 5 and 16A.

Figure 18A:
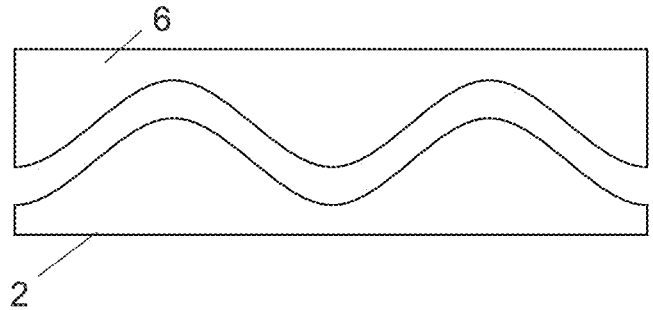
FIGS. 18A-18C shows that with a curved surface interface, the tangent at the point of contact may vary over displacement from the rest position.
Figure 18B:
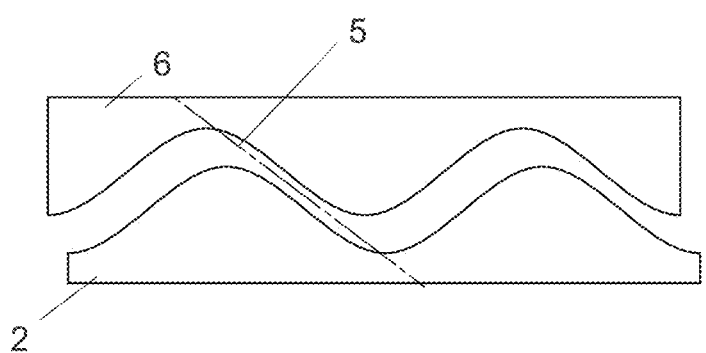
Figure 18C:
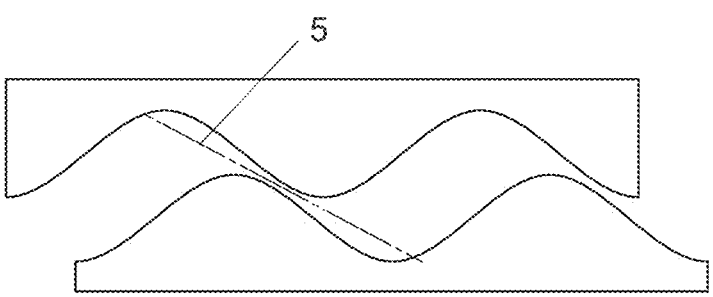
Figure 19:
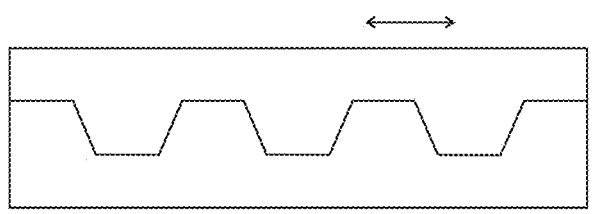
FIG. 19 shows yet another variation of a 1D translational connector.

In an alternative form the ramped surfaces are profiled in a rounded, flat-topped teeth shape, or wavy as seen in FIGS. 17, 15 and 16B, and 18. With reference to FIG. 18, in the case of the wavy shape, it can be seen that the angle of the tangent 5 at the point of contact varies over displacement from the rest position. This has the effect of varying the resistance to movement.

Appropriate design of the shape of the contact surfaces and slide limit stops, needs to hence occur in order to ensure desired performance.

In the preferred form, the profile of the interfacing surfaces of components is preferably in the form of parallel ruled surfaces where the notional parallel lines are oriented in a direction to help maintain face to face surface area contact between the third component and each of the first and second components of the range of relative movement, rather than point contact. Preferably the parallel ruled surfaces of any profiled form has the notional lines of the ruled surface running parallel the X-Y plane.

Figure 16B:
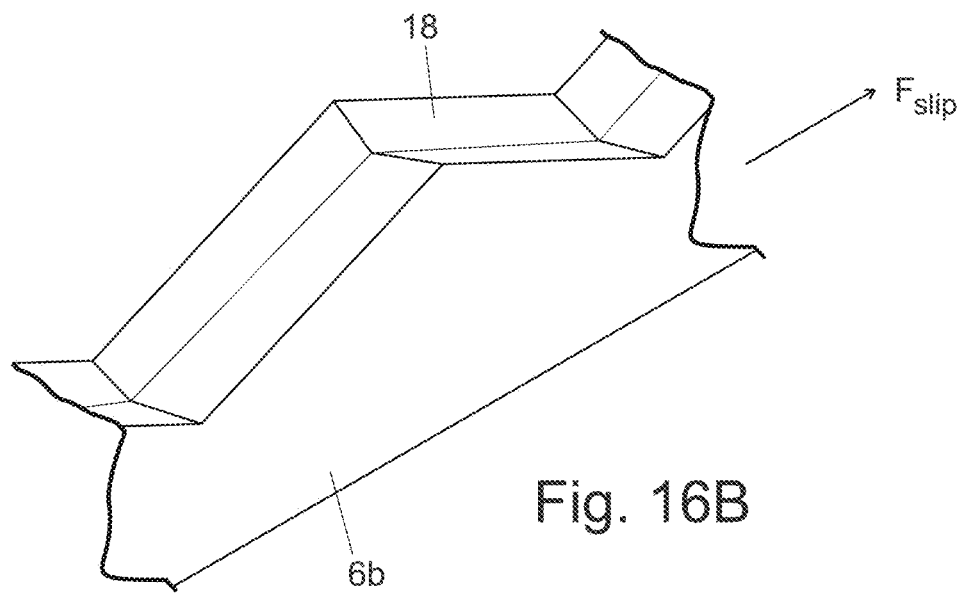
FIG. 16B shows a variation of the ramped surface of FIG. 3A.

In the example shown in FIG. 16B the profiled ramped surface of the third component 6b is in cross-section seen to be sharp toothed. This can help with maintaining longitudinal alignment of components. Alternatively or additionally the snug fit of the fixings (e.g., bolts) in slots 13 in Z-direction helps keep the first and second and third members longitudinally aligned.

In an alternate form, as shown in FIG. 11G, the slots 13 may be provided in the each of the third component 6a and 6b rather than in the first component 2 and second component 3. In this configuration a washer 19 of a greater diameter than the slot 13 may be provided to each of the resilient fixings 7 and adjacent to the third component 6a and 6b, and may slide with the resilient fixings 7 over the adjacent 3rd component. In the case of relative motion between the first component 2 and second component 3, the resilient fixings 7 will move with each of the first component and second component and will slide along the respective slots 13 in the third component 6a and 6b.

As the resilient fixings move with respect to the slots 13 the sliding washers 19 will be urged into the surface of the third component 6a and 6b. In this form the relative motion of the sliding washers 19 against the faces of the third component 6a and 6b under the biasing force of washers 10, provides an additional resistive force to relative motion between the first component 2 and the second component 3. In the configuration where the slots 13 are provided in the third component 6a and 6b, the total resistive force will be double that of an identically configured asymmetric connector.

In this form however, the resistive force provided by the relative motion of the sliding washers 19 against the faces of the third component do not provide a restorative force to bias the connection to its original condition. As such, in this form larger angle A of the ramped surfaces 18 may be used in order to increase the restorative force.

Appropriate material selection for the first, second and third component(s) will ensure that an appropriate frictional behaviour exists between the components. Upon movement, friction between the components of the component assembly will provide a damping of the motion between the first and second members with which the slip connector is engaged. The degree of damping is dependent on the coefficient of friction, lateral distance travelled through the joint expansion, and other factors including the force of the resilient hold that the associated resilient fixings provide on the component assembly.

It is anticipated that the relevant sliding surfaces of the joints may be lubricated and/or provided with a specialised coating in order to control galling. Various lubrication grease products are available which allow the coefficient of friction to stay reasonably high, which is a desirable characteristic in order to provide sufficient damping.

As can be seen the ramped surfaces alternate in orientation and this allows for the connector to absorb motion of the two members (e.g., the building structural members) in two directions. Hence the force $F_{slip}$ may be a positive or negative force (as illustrated in FIG. 4).

In order to allow for the connector, which is preferably of an elongate shape elongate in the direction $F_{slip}$, to remain as an assembly, the resilient fixings 7 preferably extend through apertures 12 of the third component(s) and also through slots 13 of the first and second components. The slots 13 are so sized so as to allow for a relative movement in the elongate direction of the third component(s) relative to one or both of the first and second components. The slots and fixings may be configured to limit that range of movement so as to prevent a ratcheting of the movement of the assembly. As a result pairs of interfacing ramped surfaces 18 will remain as a pair during the event and will not index to an adjacent ramped surface. The slots 13 may provide an end stop function to prevent such ratcheting. Alternatively, the limiting of the sliding motion may be defined by the resilient fixings which may prevent the separation of the first and second components to an extent that would otherwise allow for ratcheting of the ramped surfaces to occur. For example the distance between the bolt head 11 and the nut 9 may be set to constrict the amount of separation between the third component 6a and 6b to limit the range of motion of the first and second components in the X direction. A saw tooth configuration as will herein after be described may also offer such limit stops.

By an appropriate selection of materials with the desired coefficient of friction, a selection of the angle θ of the ramped surfaces, and appropriate selection of the characteristics of the resilient fixing, upon a displacement from the rest position as shown in FIG. 13A, to a displaced condition as shown in FIG. 13B by application of the force $F_{slip}$, a so displaced second component relative to the third component(s) will be biased back towards its rest position.

It will be appreciated that for a given coefficient of friction and clamp force $F_{pr}$, an increase in the angle θ will result in an increase in the force applied to the first or second component by the third component(s) to bias it back towards its rest position. In an oscillatory event that the first and second members may be subjected to, it can be seen with reference to FIG. 4 that damping will occur. As shown in FIG. 4, the joint deformation initiates when the loading of the joint reaches the threshold of slip force. As the joint expansion continues, the friction resistance between the slip surfaces increases as a result of higher clamping force of the bolts. Such strengthening of the joint will stop at a point where Belleville washers are completely locked. After unloading the joint, the joint self-centres to its original position.

First and second components by way of welding and/or mechanical fastening (or other) can be easily incorporated into a building structure. Their elongate direction can be lined up to resolve the input forces in an appropriate manner and provide the functionality of dissipating energy and providing a self-centring capacity during oscillatory motion between the first and second component with which it is associated.

One important feature that makes the present joint configurations simple and easy to implement is that the connector is of a thin profile as seen in FIG. 3, where multiple ramped services 18 are provided. Similarly, it is an advantage of the washer type biasing means 10, such as a Belleville washer, that an appropriate amount of clamping force can be provided in a relatively shallow form.

The connector of the present invention is preferably of an elongate form making it particularly useful in the construction industry. Its narrow profile allows it to be easily positioned in confined spaces. Its thickness (in the Y direction) is determined by the sizing of the resilient fixings and the thicknesses of the first and second and third components. Whilst increasing the angle θ can help in providing a higher degree of damping for any given resilient hold force applied by the resilient fixings such an increase in angle will also increase the thickness of the assembly. It is therefore desirable to minimise the angle θ. For a given application, a minimum angle can be determined with reference to the mathematics herein after set out.

The angle of the ramps are selected so that at the time of unloading during oscillatory motion the reversing of force, caused or amplified by the then loaded Belleville washers, is larger than the resisting frictional force acting between the interfacing sliding surfaces. This provides resilient behaviour that dissipates energy and also provides for a self-centring capacity of the connector to bias the connector back to its rest condition.

Figure 10:
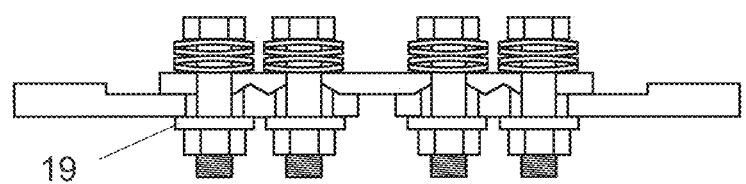
FIG. 10 shows a variation of the asymmetric 1D translational connector.

With reference to FIGS. 8 and 9 it can be seen that a variation of the present invention can be provided for. In this variation only one ramped third component is provided. A flat cap plate 30 for each bolt on the opposite side of the first and second components to the third component may be provided. The flat cap plate 30 itself only providing for a frictional resistance and damping without self-centring functionality. The provision of a second ramped third component increases the self-centring of the connector. It also increases the damping effect. A variation is shown in FIG. 10 where individual washers 19 are provided for each bolt instead of a plate 30.

If additional damping is required at a connection between a first and second member, a plurality of connectors can be provided in parallel. Parallel connectors are for example shown in FIGS. 1A and 1C.

If increased displacement is to be provided for between the first and second members a plurality of connectors can be provided in series. This can increase the elongation capacity of the series linked connectors. The connector of FIG. 3 is a series connector in that each side is able to move. So in respect of the formulas herein after set out, $n_j$ would equal 2 for the connector shown in FIG. 3B.

Figure 3D:
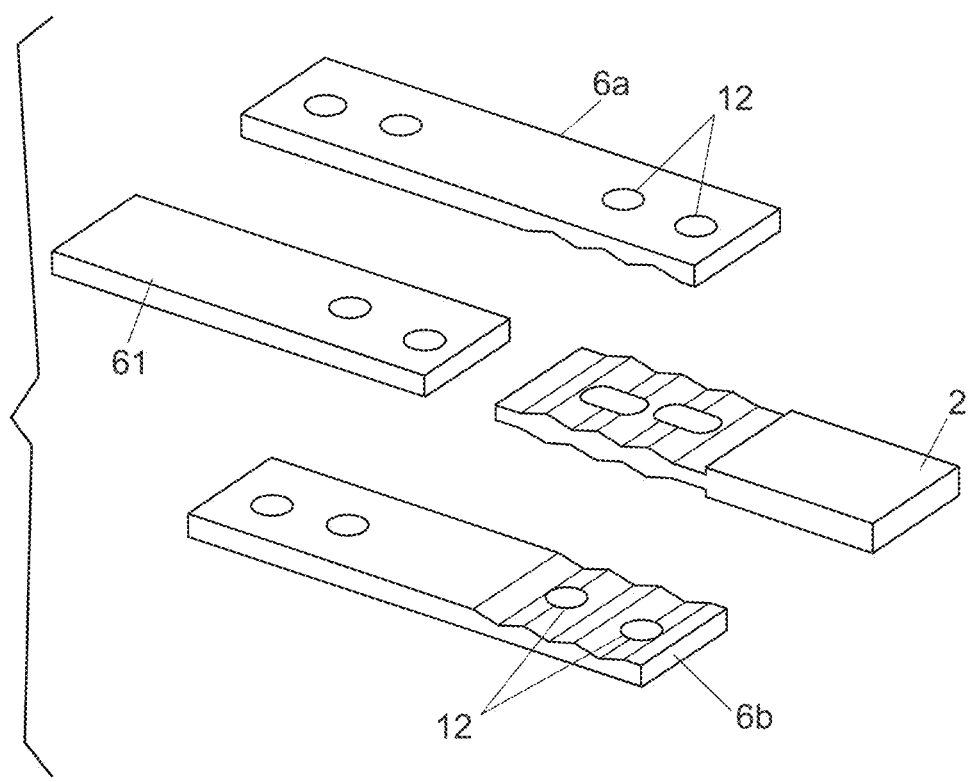
FIG. 3D shows an exploded view of the plates of the single acting 1D translational connector of FIG. 3C.

FIGS. 3C and 3D shows the connector in singular form. Here the components 6a and 6b can move longitudinally and laterally relative to the member 3 but are fixed for movement relative member 61 only in the lateral direction. Bearing pins 60 may be used to allow such movement between the members 6a and 6b and 61.

Figure 11A:
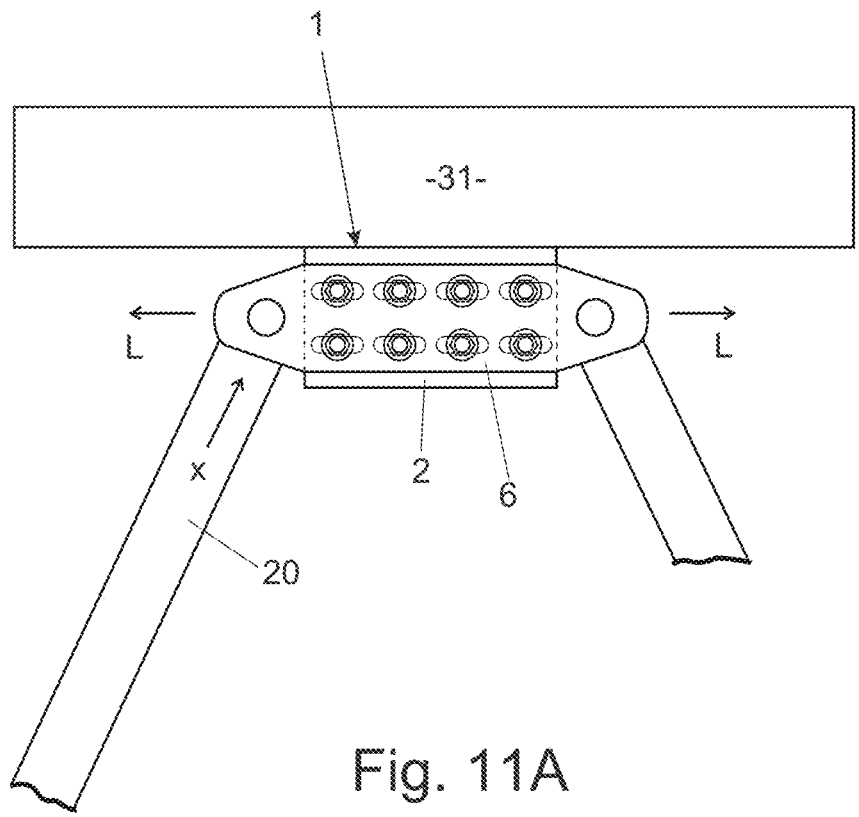
FIG. 11A shows a side view of a variation of a 1D translational connector used in a bracing frame situation.
Figure 11B:
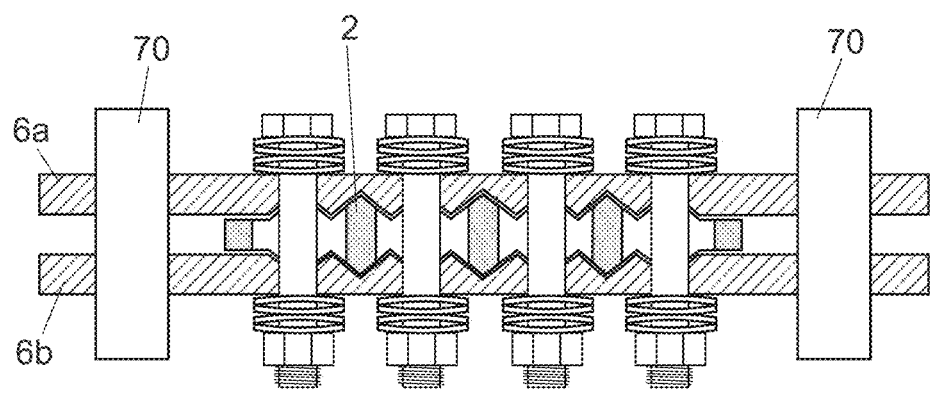
FIG. 11B shows a plan view of the 1D translational connector of FIG. 11A.
Figure 12A:
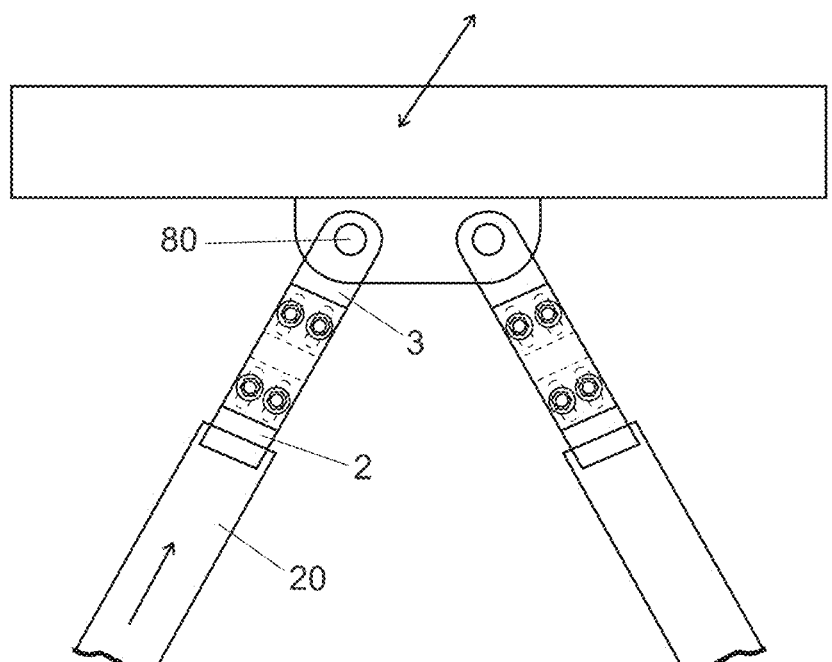
FIG. 12A shows a side view of a variation of a 1D translational connector used in a bracing frame situation.
Figure 12B:
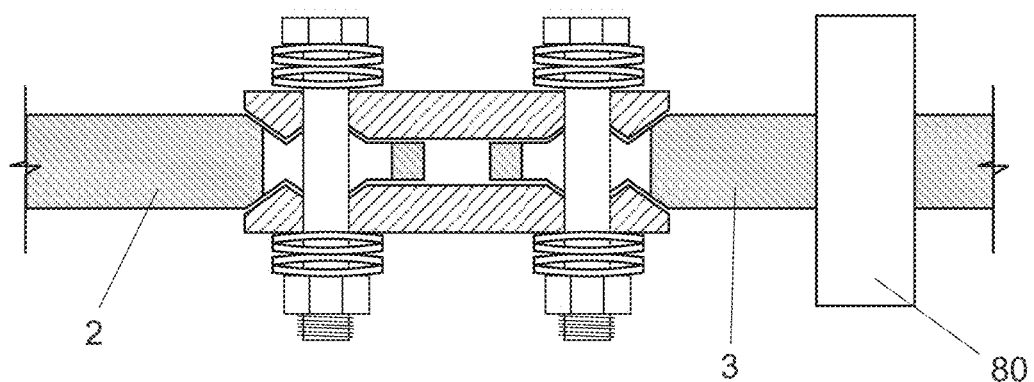
FIG. 12B is a plan view of the 1D translational connector of FIG. 12A, FIGS. 13A-13B show a detailed view of part of a symmetric 1D translational connector to show the forces involved in relation to the loading of the connector, as described in the formulas herein provided.

With reference to FIGS. 11A and 11B it can be seen that an alternative connector of the present invention may be utilised in situations where the input force is not parallel to the elongate direction of the connector. In the example shown in FIG. 11A the elongate direction LL of the connector 1, is at an angle to the input force X that it may experience from a bracing member 20. In this arrangement the third connector 6 is for example secured to a beam 31 of a structure and the first component 2 is secured to a bracing member 20 that extends from the first component at an angle to the direction LL of the connector. Bearing pins 70 may be used to allow the lateral movement of the first components 2. The force that may be applied in direction X by the brace member 20 will hence be at an angle. However the connector of the present invention is able to resolve this force to allow for a displacement of the brace in direction LL at the connector. An alternative to this arrangement is shown in FIGS. 12A and 12B where both direction LL of the elongate connector is parallel to the input force X that may be experienced from a brace member 20.

In the preferred form the bolt is preferably a high strength bolt and the material for at least the first and second components is Bisplate™. Preferably the third component are of mild steel. It has been found that Bisplate™ together with mild steel provides a uniform frictional behaviour.

In the construction of the 1D connector the thickness of the terminal ends of the first component 2 and second component 3 may be such that they are less than, equal to, or greater than the amplitude of the ramp surfaces.

Figure 15A:
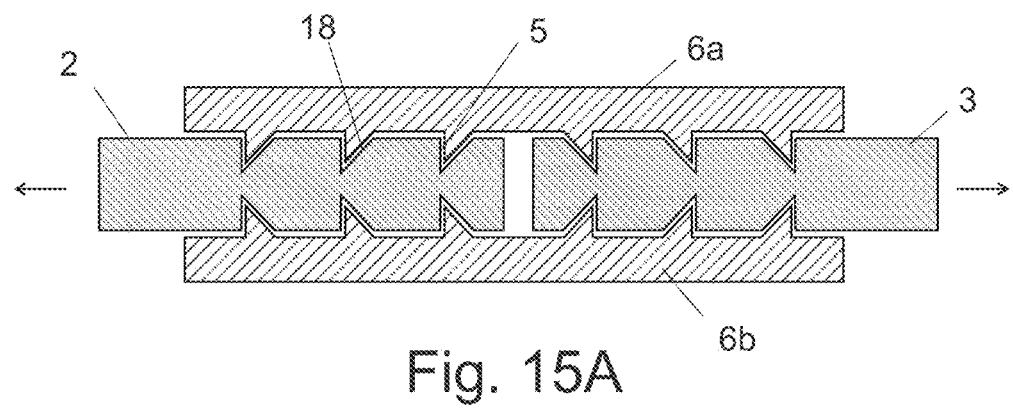
FIGS. 15A-15B show views of two variations of the 1D translator connector where the connector allows relative motion only in either tension or compression.
Figure 15B:
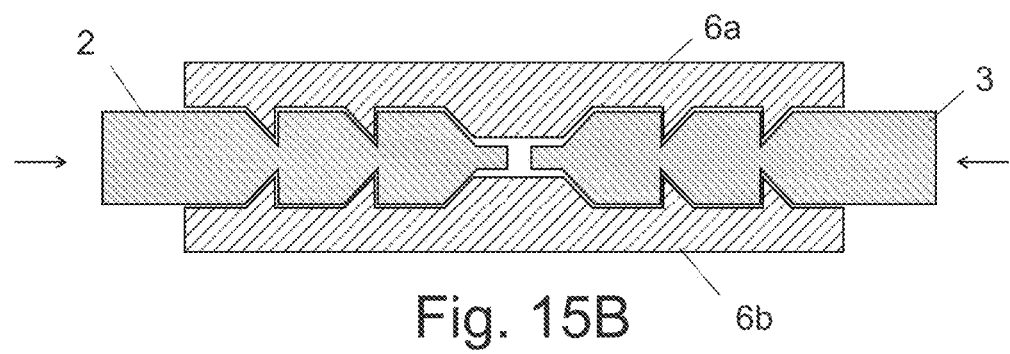
Figure 17:
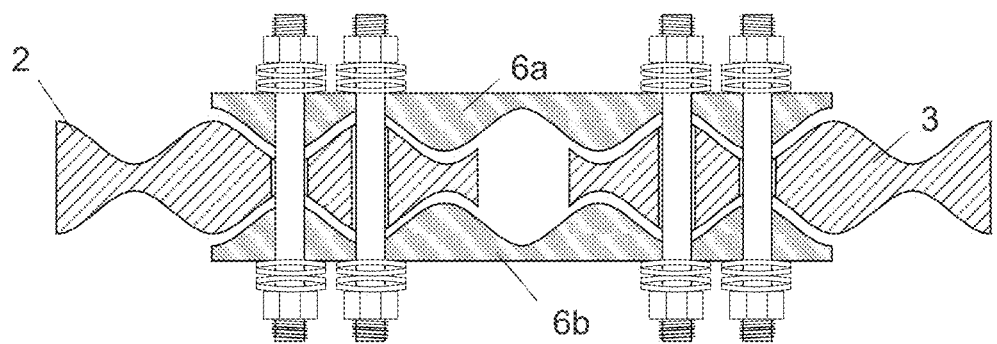
FIG. 17 is a view of a 1D translational connector illustrating that the ramped surfaces need not be prismatic and may instead be curved.

An alternate embodiment of the 1D connector is shown in FIGS. 15A and 15B. According to this embodiment the complimentary mating surfaces of the first and second components 2,3 and third component 6a,6b may have ramped surfaces 18 that in one direction allows a sliding of the surfaces over each other, and additional surfaces 5 that prevent relative sliding of such additional surfaces when the first and second components are urged to move in the opposite direction thereby preventing such opposite direction movement.

This allows for the connector to allow displacement from the status quo of the first and second members which it connects, in one direction only. This may be for expansion or contraction.

In FIG. 15A the ramped surfaces 18 are arranged such that the first and second component may move outwards relative to each other, but may not move inwardly further than the initial resting position. In FIG. 15B the ramped surfaces 18 are arranged such that the first and second component may move towards each other, but may not extend outwardly further than their initial resting position.

An application of the one-directional 1D connector may be in shear walls, where extension between the wall and a lower fixing point may be desired but movement of those two points towards each other may not.

Two Dimensional Connector

Figures 24, 25:
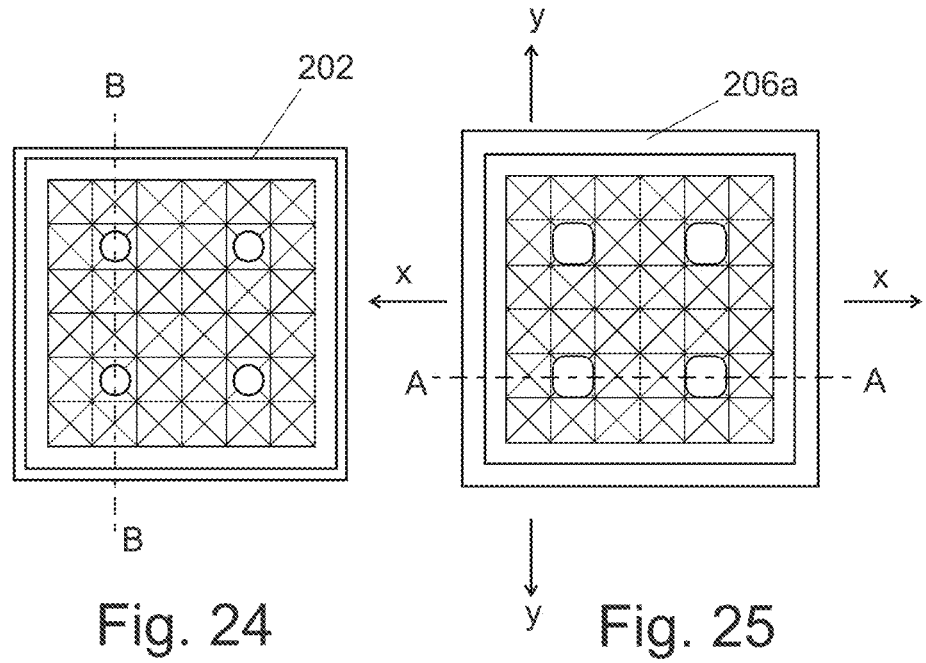
FIGS. 24 and 25 show schematic views of the upper and lower plates of a 2D translational connector.
Figures 26A, 26B:
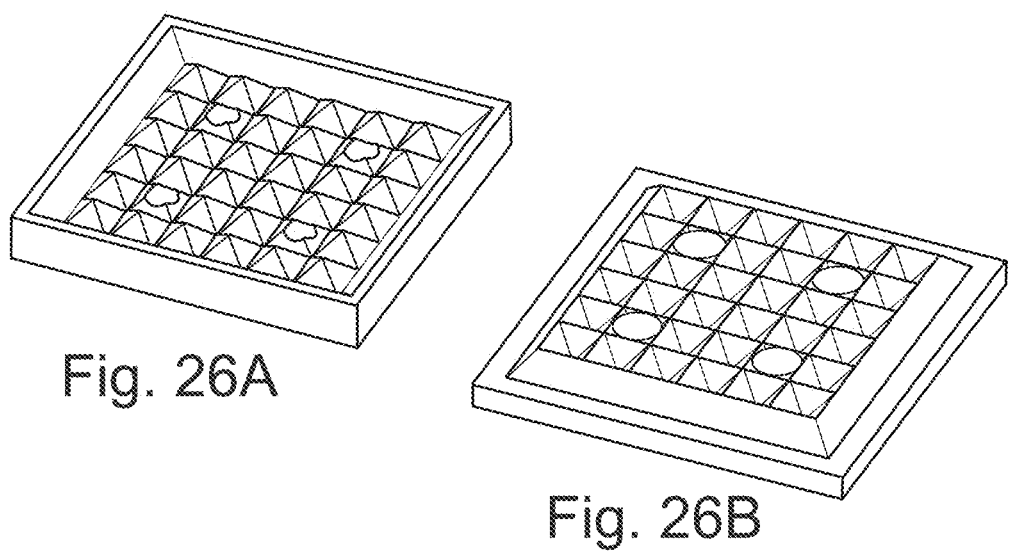
FIGS. 26A-26B show perspective views of the upper and lower plates of a 2D translational connector.

With reference to FIGS. 24-26B, 2D resilient translational slip friction connector components are shown. With reference to FIG. 24 a first component 202 is shown in plan view, and in FIG. 25 a first clamping component 206a is shown. These two components have complimentary mating surfaces that provide ramped surfaces not just in a first direction such as direction XX, but also in direction YY. As a result the assembly of these components can allow for a two dimensional relative translation of structures to be catered for.

Bolts and washers (or springs) are utilised in an analogous manner as hereinbefore been described with reference to the 1D embodiments of the connector, to form the resilient fixings. Preferably the bolts 8 are high tensile with an ultimate yield capacity approximately two or more times the strength of the joint. This safety factor allows the failure of the bolts to be effectively eliminated from the design criteria, as the bolts are loaded almost entirely in tension only, and are very unlikely to be a cause of failure.

The two dimensional connector may be designed to not be constrained to move only in two orthogonal directions but instead be able to displace in a planar manner in any translational direction. In doing so the rotational orientation of the two component will not change. The relative translation movement may hence be omni-direction in a plane.

Figure 14A:
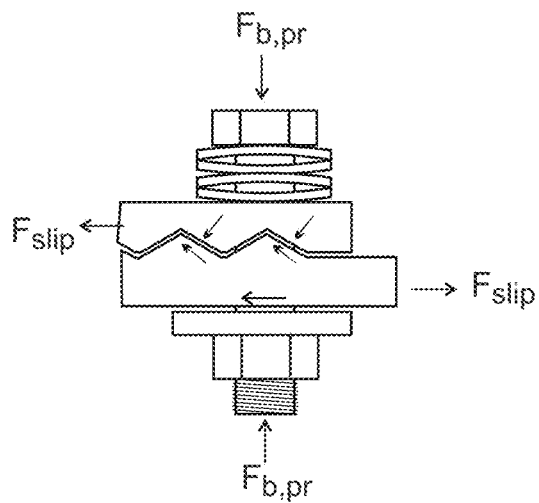
FIGS. 14A-14B show a detailed view of part of an asymmetric 1D translational connector to show the forces involved in relation to the loading of the connector as described in the formulas herein provided.
Figure 14B:
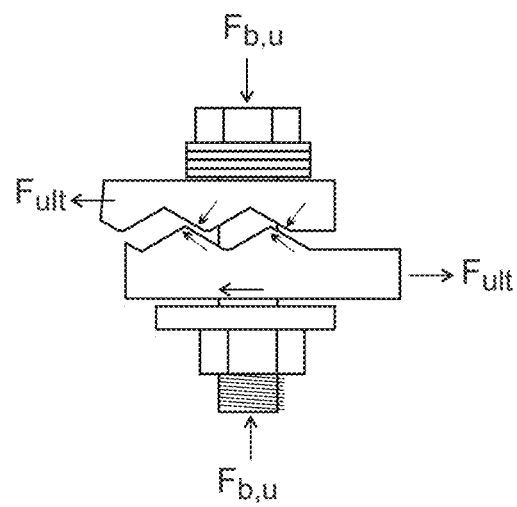
Figures 14C, 14D:
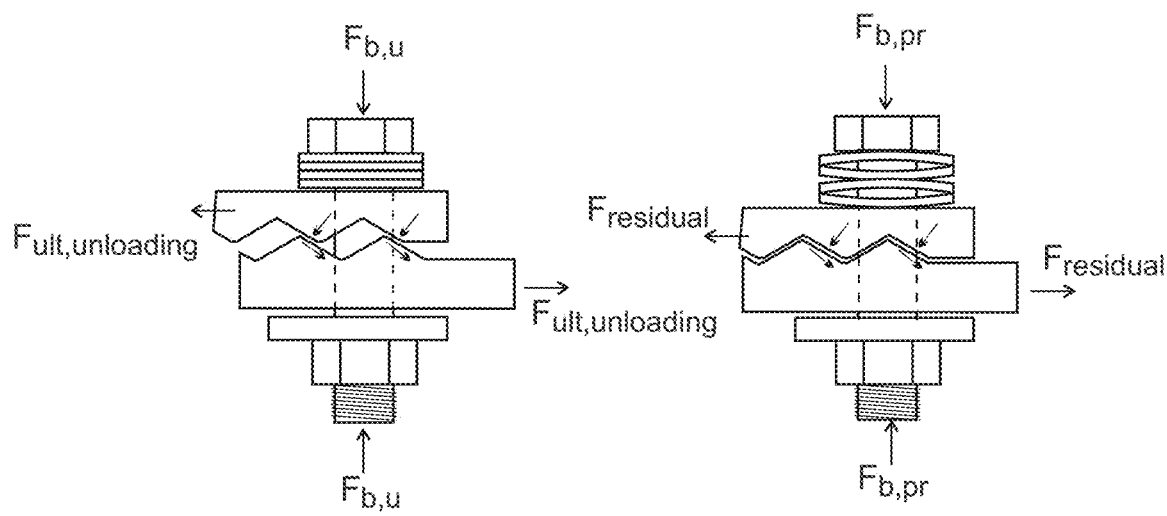
FIGS. 14C-14D show a detailed view of part of an asymmetric 1D translational connector to show the forces involved in relation to the unloading of the connector as described in the formulas herein provided.

Design Procedure for the Translational Connector (1D/2D):

Based on the free body diagrams shown in FIGS. 13 and 14 for different conditions of the connector as symmetric or asymmetric, the design procedure is outlined considering the equilibrium of forces acting on the first and second components as follows:

The slip force, $F_{slip}$, can be determined by:

i. for symmetric condition:

$$F_{slip} = 2n_b F_{b,pr} \left( \frac{\sin\theta + \mu_s \cos\theta}{\cos\theta - \mu_s \sin\theta} \right)$$

ii. for asymmetric condition:

$$F_{slip} = n_b F_{b,pr} \left( \mu_s + \frac{\sin\theta + \mu_s \cos\theta}{\cos\theta - \mu_s \sin\theta} \right)$$

in which
$F_{b,pr}$ is the bolt clamping force as a result of being pre-stressed
$n_b$ is the number of bolts
$\theta$ is the angle of the groove
$\mu_s$ is the coefficient of static friction The residual force, $F_{residual}$, can be determined by:

iii. for symmetric condition:

$$F_{residual} = 2n_b F_{b,pr} \left( \frac{\sin\theta - \mu_k \cos\theta}{con\theta + \mu_k \sin\theta} \right)$$

iv. for asymmetric condition:

$$F_{residual} = n_b F_{b,pr} \left( \mu_k + \frac{\sin\theta - \mu_k \cos\theta}{con\theta + \mu_k \sin\theta} \right)$$

The ultimate capacity in loading, $F_{ult\ loading}$ and unloading $F_{ult\ unloading}$ can be driven by replacing the $\mu_s$, $\mu_k$ and $F_{b,u}$, respectively.

where
$\mu_s$ is the coefficient of static friction
$\mu_k$ is the coefficient of kinetic friction (could be considered as $0.6\mu_s$)
$F_{b,u}$ is the ultimate force on the bolt given by $$F_{b,u} = F_{b,pr} + k_s \Delta_s$$

in which
$k_s$ is the stiffness of the stack of washers or spring
$\Delta_s$ is the maximum deflection of the stack of washers or spring after pre-stressing It should be noted that
i. in a single acting connector, the friction resistance at the plate and the bearing pin interface needs to be added to the bolt clamping force $F_b$.
ii. in an asymmetric condition, bolts need to transfer the joint load through shear in addition to the tension force developed as a result of being pre-stressed.

The Maximum Lateral Deflection can be Expressed by:

$$\delta_{max} = n_j \left( \frac{\Delta_s}{\tan \theta} \right)$$

in which
$n_j$ is the number of joint in serial arrangement (e.g., $n_j$ equals 1 and 2 for a single and double acting connectors, respectively)

For Achieving the Self-Centring Behaviour the Following Considerations are Necessary:
i. $\tan \theta > \mu_s$ (for symmetric case);

$$\frac{\sin \theta}{1 + \cos \theta} > \mu_s$$

ii. (for asymmetric case)

$$L > \frac{\Delta_s}{\sin \theta}$$

(L is the horizontal distance between the top and bottom of the groove)

The angular range of θ can be from 25-30 degrees for symmetric condition and up to 45 degrees for the asymmetric one where coefficient of friction of between 0.36 and 0.39 exists.

As defined in the design procedure, there is a minimum requirement for the ramp angle, and if not satisfied then there is no self-centring capacity. So, it cannot decrease from a certain limit. Also, increasing the angle beyond the minimum requirement, won't be efficient since the plate thickness goes up for a given range of travel. Keeping the plate thickness down, ensures reduced material costs and makes the product more suited for use in confined spaces. It should be noted that the self-centring is only depending on the angle of the ramp and increasing the bolt clamping force will not affect that, though it accelerates the reverse movement of the plates to the rest position after unloading. Hence a minimum angle θ exists that is purely a function of the coefficient of friction. Increasing the spring force has an effect on the damping of the connector and on the speed of return to the rest position. Tools can be used to ensure the appropriate setting of the initial bias force on the plates, i.e. the bolt clamping force as a result of being pre-stressed. This allows the joints to be tuned' according to the required performance for the design.

Comparison of Predicted Values and Tested Data

Figure 47:
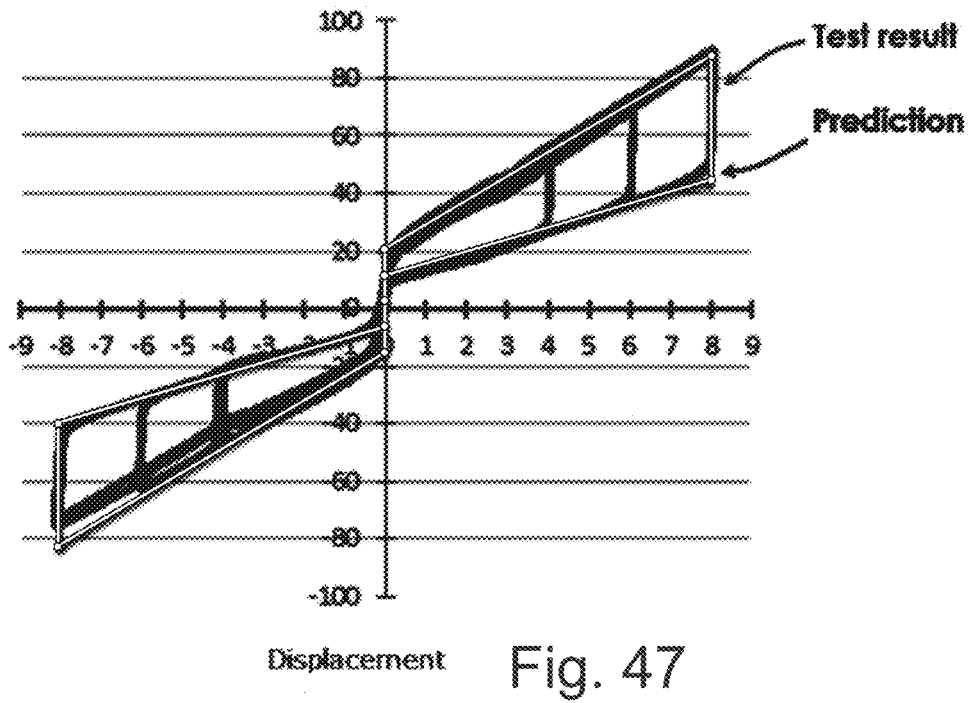
FIG. 47 shows a force-displacement comparison plot of the predicted theoretical performance of a 1D connector and the actual tested performance.

The above-described equations theoretically predict the forces and displacements experienced by a 1D connector during use. FIG. 47 shows a comparative plot of these predicted loading and unloading forces and related displacements for a 1D connector, where test data is shown in bold, and the theoretical calculated value is superimposed on top of it. FIG. 47 shows the hysteresis loop associated with loading and unloading the connector during testing very closely follows predicted values.

Due to the close interrelationship between tested and predicted values, it may be possible to design the physical and material characteristics of the connector to suit a desired output force and displacement profile.

For example, FIGS. 48 to 53, show the predicted effect of changing various design parameters on the force v displacement characteristics of the joint.

Figure 48:
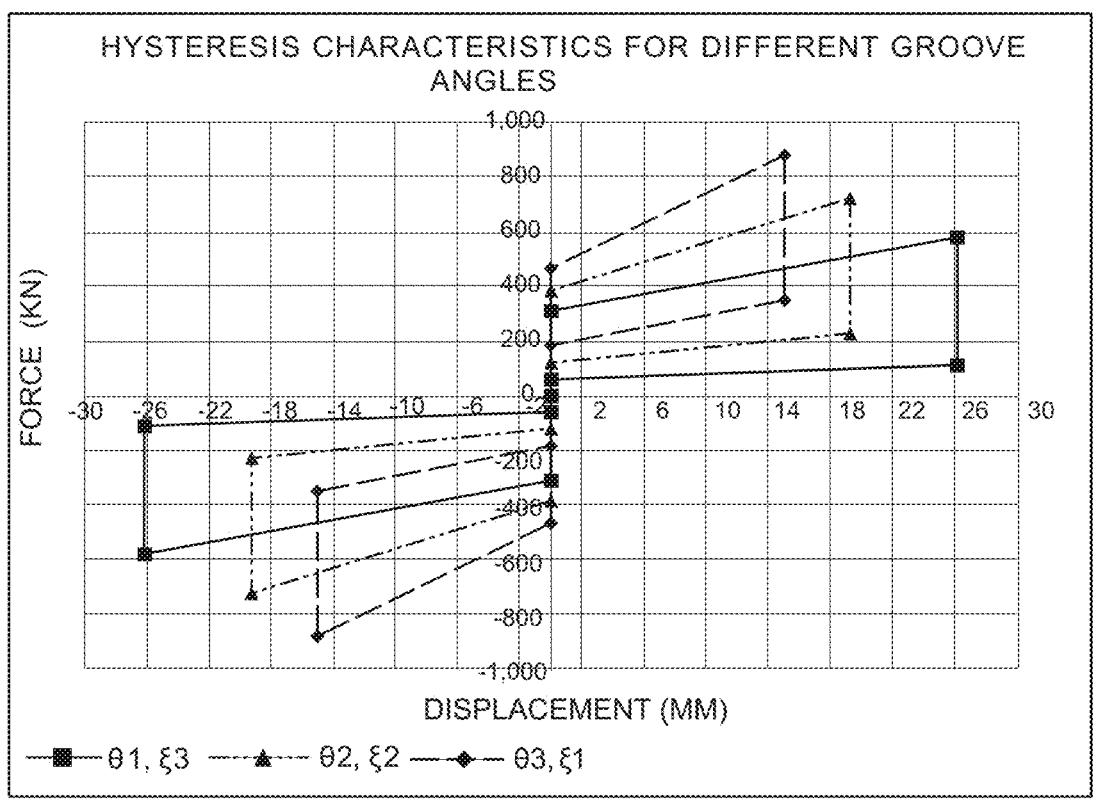
FIG. 48 is a force v displacement plot showing the effect of changing the angle of the ramped surfaces.

FIG. 48 shows the effect of changing the angle of the ramped surfaces.

Figure 49:
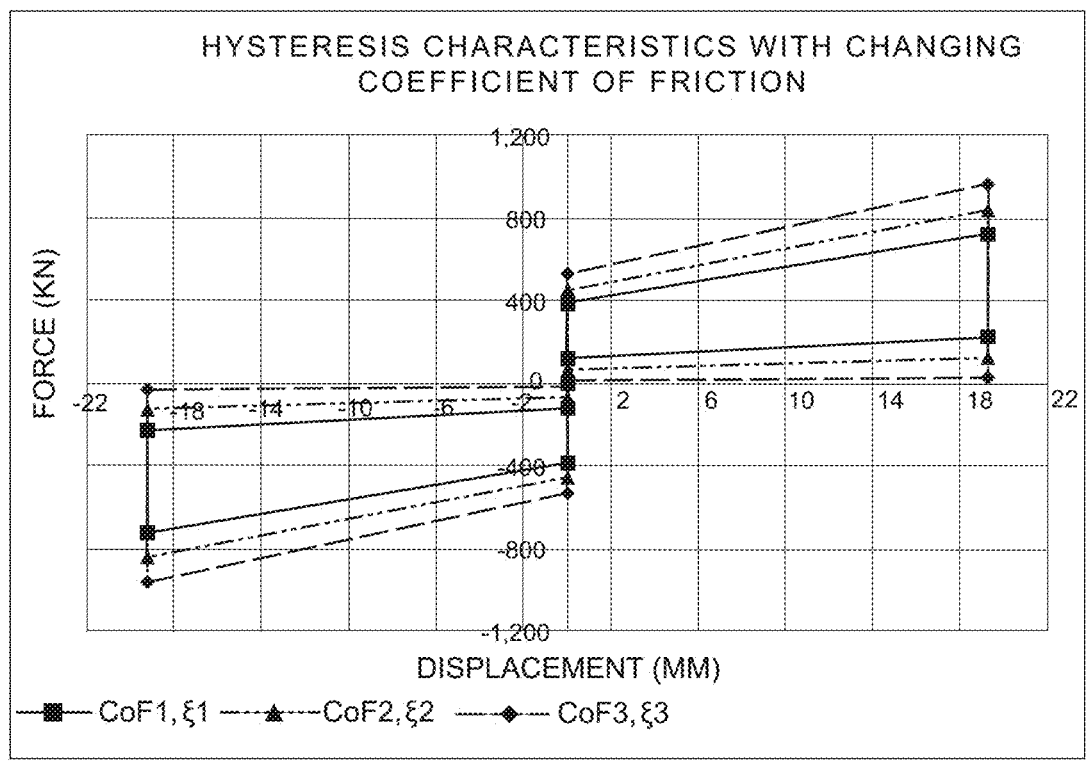
FIG. 49 is a force v displacement plot showing the effect of different coefficients of friction between the ramped surfaces.

FIG. 49 shows the effect of different coefficients of friction between the ramped surfaces.

Figure 50:
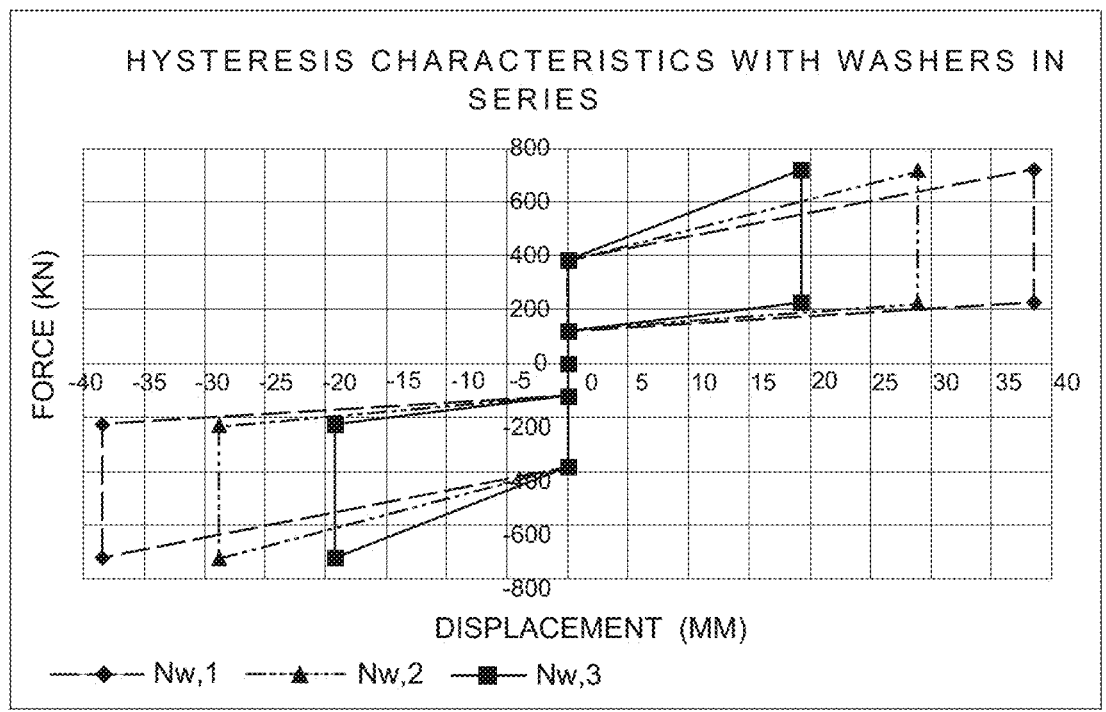
FIG. 50 is a force v displacement plot showing the effect of increasing the number of biasing washers in series.

FIG. 50 shows the effect of increasing the number of biasing washers in series.

Figure 51:
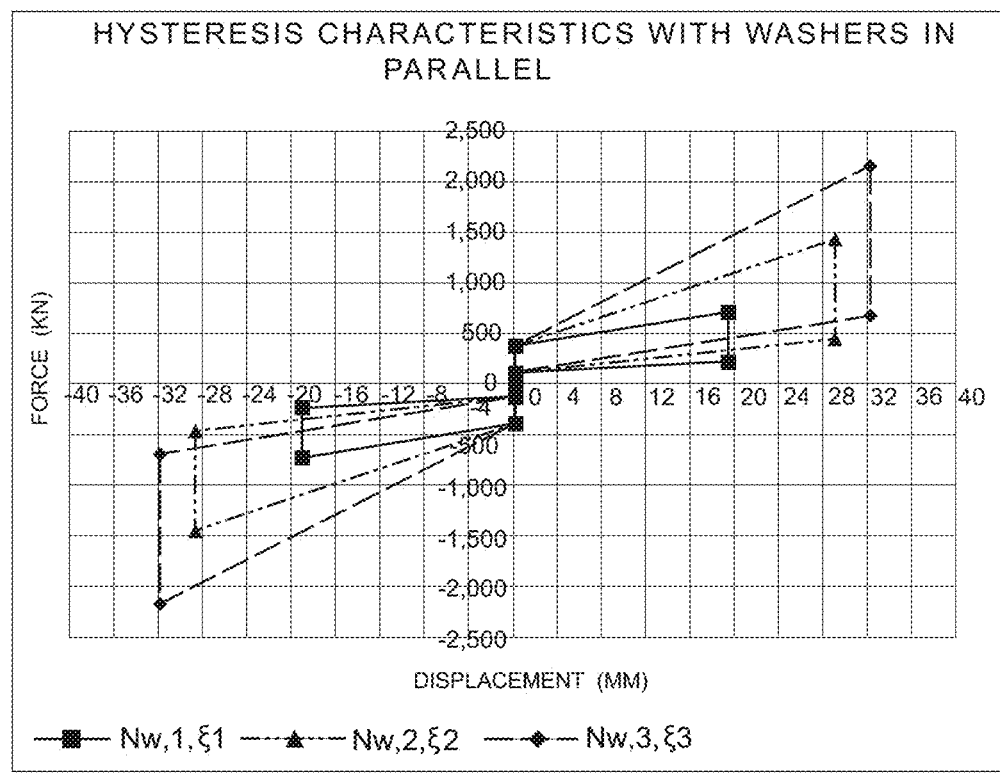
FIG. 51 is a force v displacement plot showing the effect of increasing the number of washers in parallel.

FIG. 51 shows the effect of increasing the number of washers in parallel.

Figure 52:
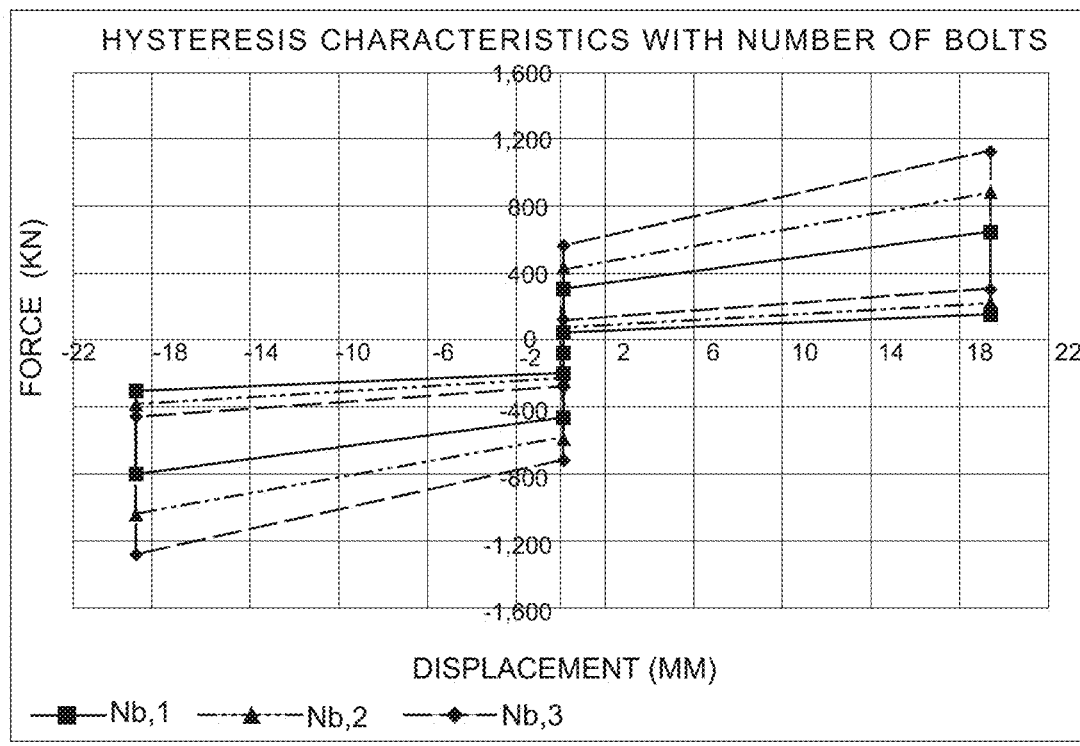
FIG. 52 is a force v displacement plot showing the effect of increasing the number of resilient fixing bolts.

FIG. 52 shows the effect of increasing the number of resilient fixing bolts.

Figure 53:
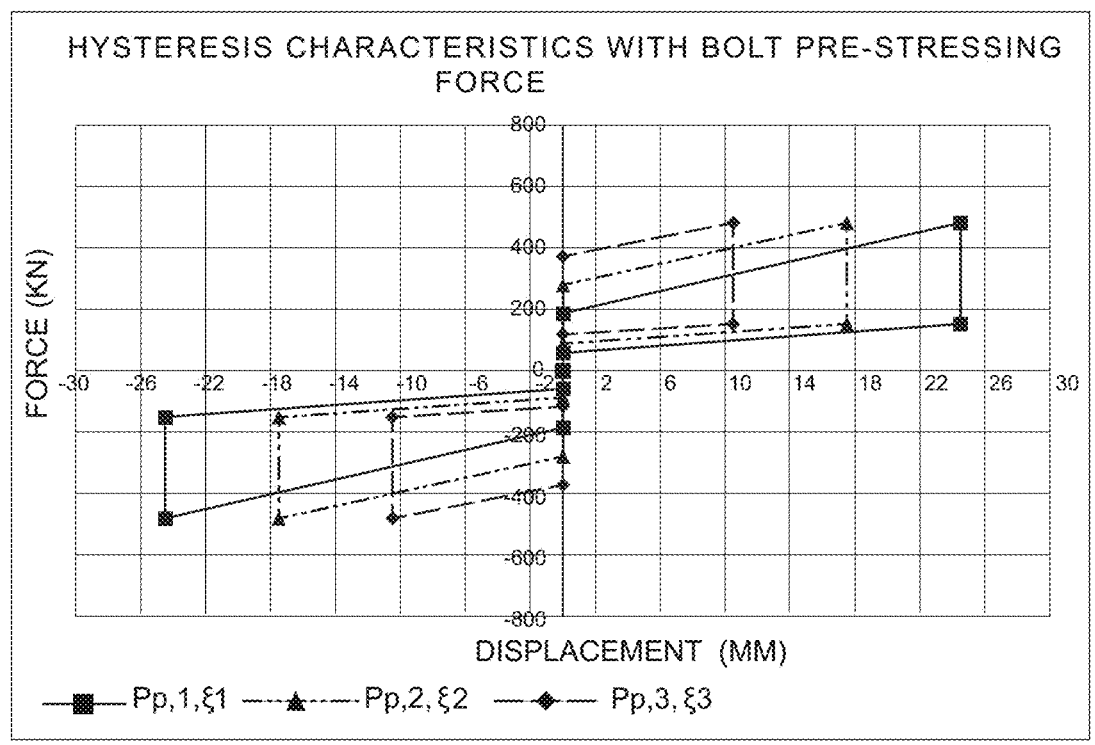
FIG. 53 is a force v displacement plot showing the effect of increasing the bolt pre-stressing force of the resilient fixings.

FIG. 53 shows the effect of increasing the bolt pre-stressing force of the resilient fixings.

Rotational Connector

Figure 20:
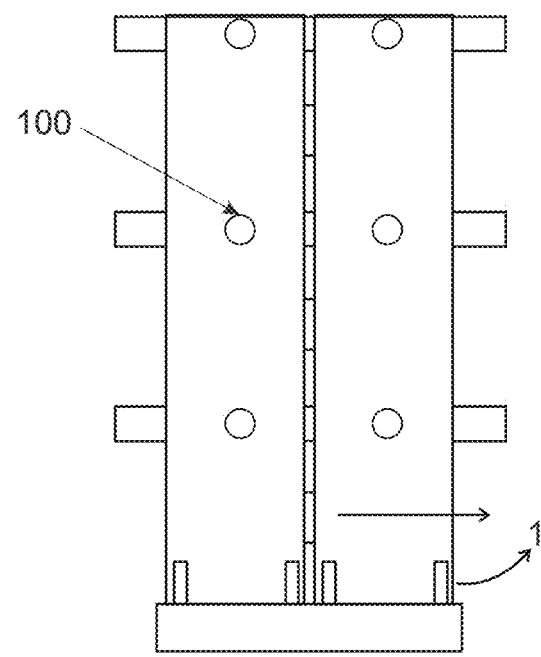
FIG. 20 is a schematic view of a building structure wherein 1D translational connectors are provided as well as rotational connectors each acting as floor to wall connections.

A further variation of the connector described above will now be described. This variation provides rotational resilient slip friction rather than translational slip. The rotational resilient slip friction connector may be utilised between wall-to-floor connections as shown in FIG. 20. In FIG. 20 a plurality of rotational connectors 100 may be utilized in such a construction, between the floors 14 and supporting walls 15.

Figures 21A, 21B:
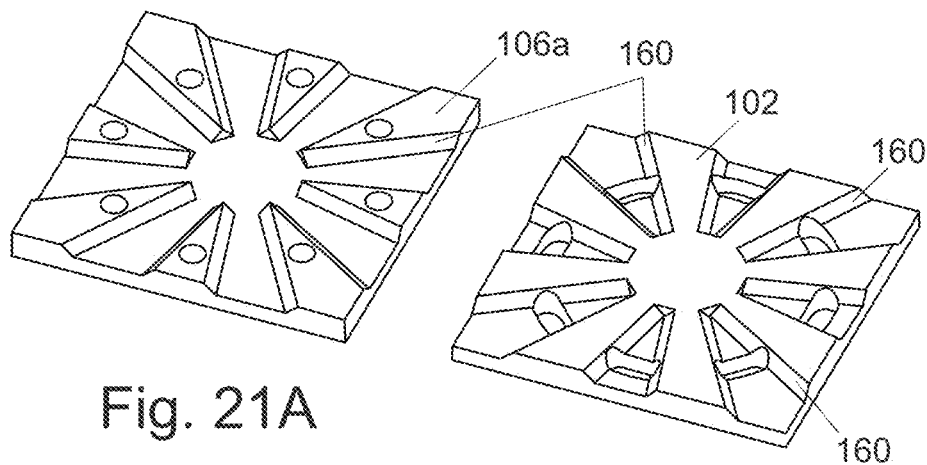
FIGS. 21A-21B show perspective views of the inside faces of the upper and lower plates of a rotational connector.

The structure as shown in FIG. 20 may also include a plurality of 1D connectors 1 as have hereinbefore been described. With reference to FIGS. 21 and 22, component parts of a rotational connector 100 are shown. In FIGS. 21A and 21B there is shown a first of a clamping component 106a and a first component 102. These preferably each have mutually engageable profiled surfaces 160 as can be seen in the figures. The surfaces are defined by substantially radially extending peaks and troughs. Such peaks and troughs have sloping lateral surfaces 160 in between that allow for a riding up and down of such mutually cooperating sloping surfaces 160 of each of the first component and first clamping component 102/106a. The sides of each substantially radially extending segment comprise sloped surfaces which slope inwardly from the edge of a raised segment towards its center.

The surfaces of the stepped segments and troughs being parallel, the sloped surfaces extend radially with a constant height.

The corresponding raised segments and troughs terminate at the location where opposing sloped surfaces meet on either a raised segment or in a trough segment.

Figures 22A, 22B:
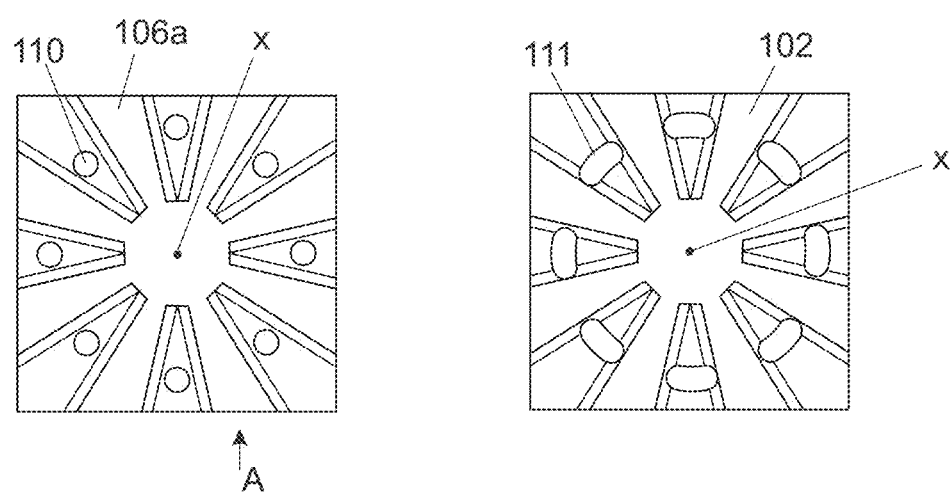
FIGS. 22A-22B show views of the inside faces of the upper and lower plates of a rotational connector.
Figure 22C:
FIG. 22C shows an edge of the plate of FIG. 22A seen in direction A.
Figure 22H:
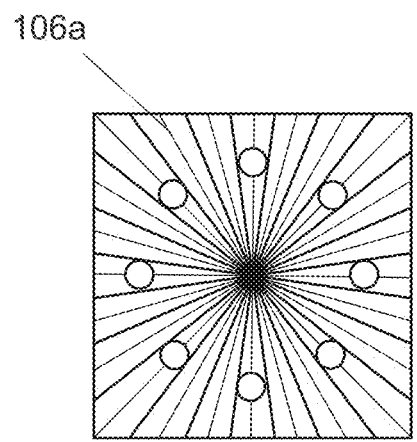
FIGS. 22D-22E show perspective views of an assembled rotational connector in a displaced and non-displaced condition.
FIGS. 22F-22G show perspective and partial cut away views of the plates of FIG. 22E, FIGS. 22H-22K show views of the internal faces of the upper and lower plates of another embodiment of the rotational connector.
Figure 22I:
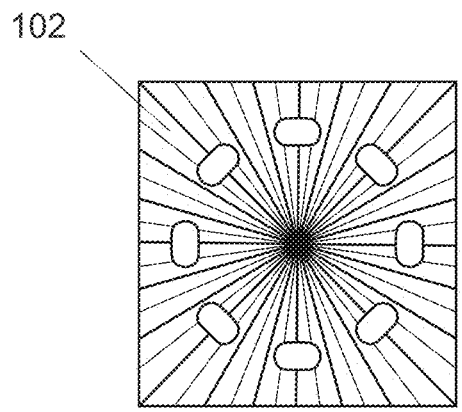
Figure 22J:
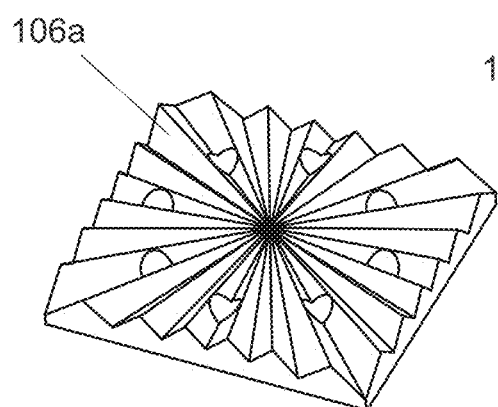
Figure 22K:
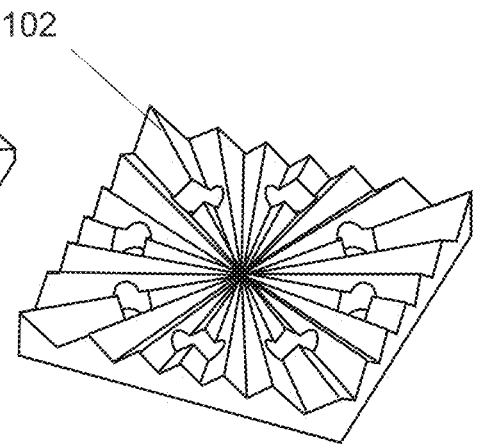

To help ensure even distribution of load between engaging sloping surfaces during an event causing displacement, each sloping surface is of a constant height H along its radial length (as shown in FIG. 22C).

The first component 102 and the first clamping component 106a are preferably held to remain coaxial about their respective axes coincidental to axis X. This may to some extent be achieved by virtue of the surface profiling that is shown but in addition fasteners that protrude through the first component 102 and the first clamping component 106a, like those as have previously been described can help maintain that relationship and guide relative movement.

The fasteners (but without washers) are shown in FIGS. 22D and 22E. In the preferred form the first clamping component 106a has a plurality of apertures 110 through which a bolt shaft 610 can extend. The first component 102 preferably has a plurality of slots 111 through each of which the shaft of a bolt can extend. The slots are on a pitch circle diameter away from the axis X coincident to that where the holes 110 are provided. In the preferred form, a plurality of holes and slots are provided, equispaced about the axis X. The slots allow for relative rotation between the first component and the first clamping component. FIGS. 22D and 22E show the components of FIGS. 21 and 22 assembled into a rotational connector with a set of bolts 8. These bolts pass through both the apertures 110 in the first clamping component 106a, and the slots 111 in the first component 102. When the clamping components 106a, 102 are rotationally displaced with respected to each other (as in FIG. 22D), the bolts are retained in the apertures 110 and able to move within limits in the slots 111.

Figure 23:
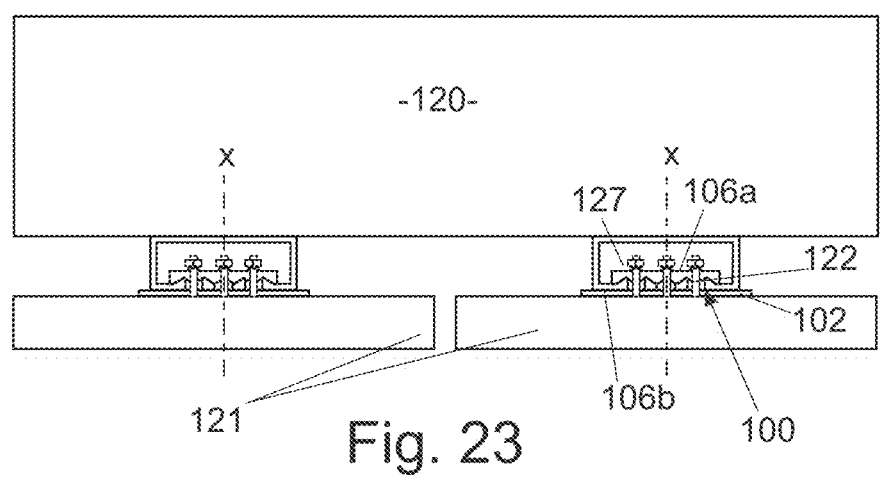
FIG. 23 shows a floor-shear wall connection using a rotational connector, in a situation where shear wall uplift has already been controlled.

In use, acting between for example a floor 120 and shear walls 121 as seen in plan view in FIG. 23, the rotational connector 100 can be seen secured to one of the floor and sheer wall 120/121 by the use of bolts 122. The bolts extend through the first component 102 and second component 106a. They may project from a second clamping component 106b or therethrough, and be provided on the opposite side to the first component 102. Like the 1D connector as hereinbefore described, biasing means such as washers 127 may be provided between the nut threaded to each of the bolts 122 and the first clamping component 106a.

The second clamping component 106b as seen in FIG. 23, offers a planar sliding surface. The first component 102 is able to rotate about axis X over the second component 106b without relative lateral movement therebetween. With profiled surfaces on the opposite side of the first component 102 cooperating with corresponding profiled surfaces of the first clamping component 106a, and the provision of the washers 127 biasing the first component towards the second clamping component 106b, via the first clamping component 106A, it will be appreciated that a resilient slip friction connection is able to be established by the rotational connector 100 that provides a self-centring effect.

A symmetrical version of such a rotational connector may be provided where the second clamping component includes an appropriate profiled surface together with the first component 102 to provide resilient slip friction with self-centring capacity.

Furthermore in the configuration shown in FIG. 23, rotational movement between the upper and lower structures 120 and 121 may cause the relative rotation of the rotational connector components and damping of the rotational movement without causing any secondary consequential motion. Particularly, the assembly in this application does not cause any changes in the distance between the structures 120 and 121 in direction X, regardless of the displaced position of the rotational connector's plates 106 and 102.

FIGS. 22H-22K illustrate alternative ramped surface profile shapes for the first component 102 and first clamping component 106a.

Design Procedure for the Rotational Connector:

The slip moment, $M_{slip}$, can be determined by:

$$M_{slip} = d_j F_{slip}$$

The ultimate moment, $M_{ult}$, can be determined by:

$$M_{ult} = d_j F_{ult}$$

in which $d_j$ is the distance between the bolts (located at the middle of the groove radial length) and the centre of rotation. $F_{slip}$ and $F_{ult}$ are as specified in Translational connector.

The maximum rotation can be expressed by:

$$\theta_{r,max} = n_j \frac{\Delta_s}{d_j \tan\theta}$$

The design considerations for achieving the self-centring behaviour, described for Translational connector, also apply for the Rotational one.

The Connectors in Use

Figure 27:
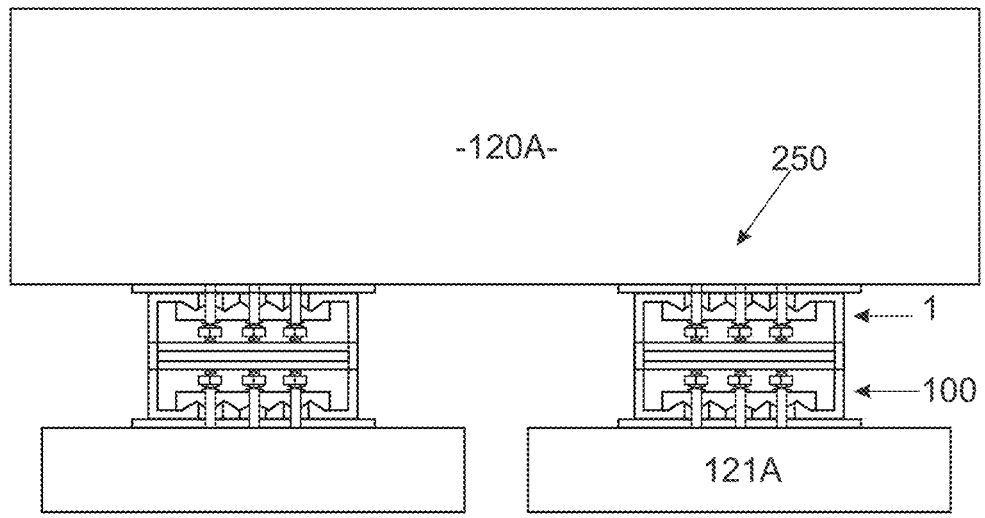
FIG. 27 is a schematic view of a floor-shear wall connection using sets of combined rotational and 1D or 2D translational connectors to control both rotation and uplift of the shear wall.
Figure 28:
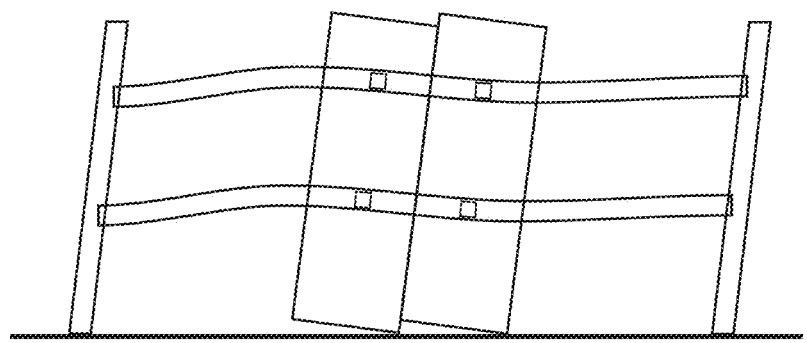
FIG. 28 shows a wall schematic using a prior art solution whereby neither rotation nor uplift are controlled, resulting in undesirable beam bending.

One application for the 1D resilient slip friction connector may be in a situation as shown in FIG. 27 where a combination of both a rotational resilient slip friction connector 100 and a 1D resilient slip friction connector 1 are provided intermediate of a floor structure 120A and sheer wall 121A. In such an arrangement the assembly of the rotational and 1D translational resilient slip friction connectors allow for control of both rotation and uplift of a sheer wall 121A. With reference to FIG. 28 (which is a prior art figure showing a rigid connection between a shear wall and a floor structure such as a structural floor beam), building movement during an earthquake can induce both lift and a bending moment in the structural beams.

Figure 29:
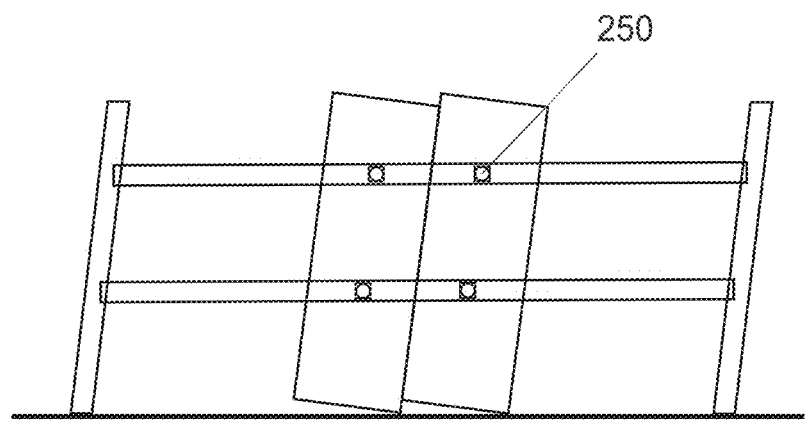
FIG. 29 shows a wall schematic using combined rotational connectors and 2D connectors whereby rotation and uplift are both controlled.

In FIG. 29, illustrating where assemblies 250 of a combination of a rotational connector and a 2D translational connector are provided, it can be seen that the structure deforms in a pure racking motion. Both uplift and rotation are at least partially absorbed by the assembly.

Figure 30:
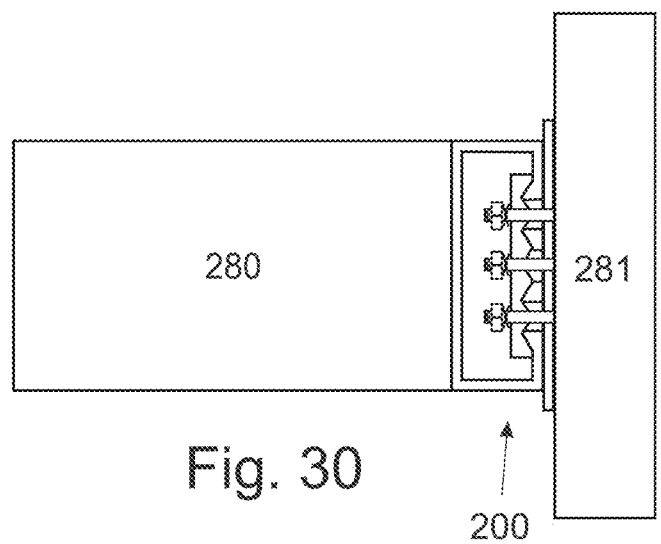
FIG. 30 shows a side view of part of a structure using a single 2D translational connector.
Figure 31:
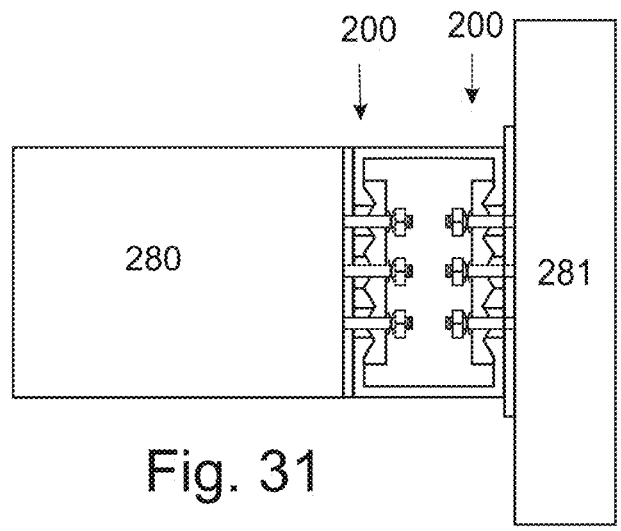
FIG. 31 shows a side view of part of a structure using two 2D translational connectors.

With reference to FIG. 30 there is shown a side view of two structural components 280 and 281 connected via a 2D connector 200. FIG. 31 shows a side view similar to that of FIG. 30 where dual 2D connectors 200 are provided. A slip direction displacement of the structural components 280 and 281 will not cause a secondary displacement separating the structural components 280 and 281. This is advantageous as any such secondary displacement may cause adverse effects.

Figure 32A:
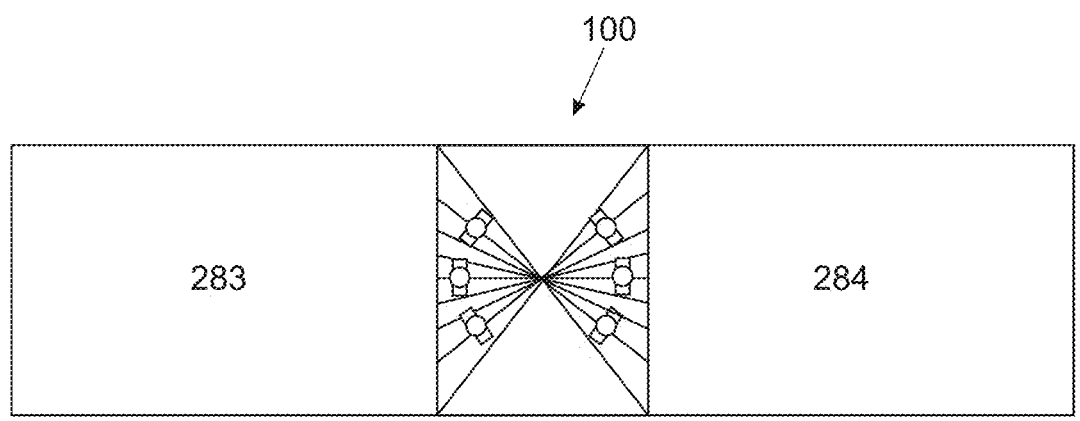
FIG. 32A shows a schematic of a joint between two elements using two rotational connectors in order to allow rotation about a vertical axis.
Figure 32B:
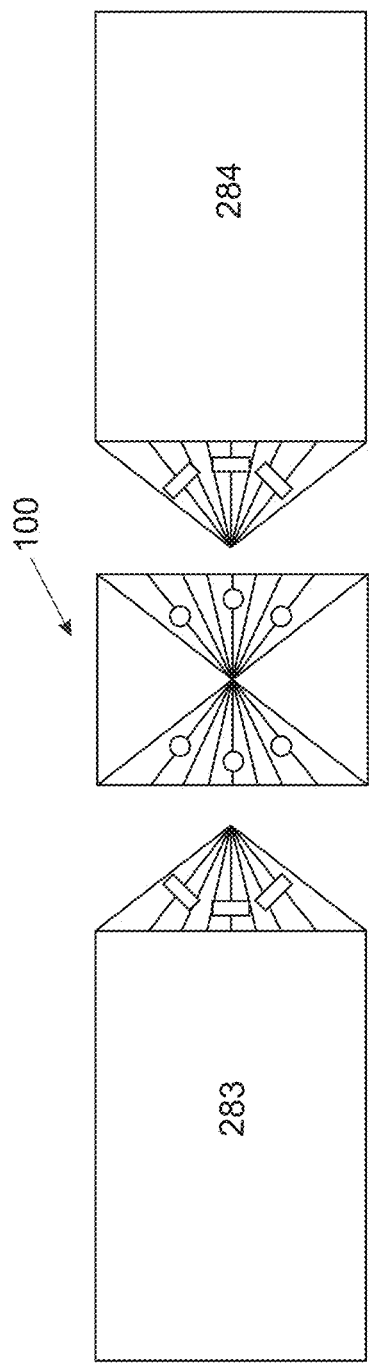
FIG. 32B shows an expanded view of FIG. 32A.
Figure 32C:
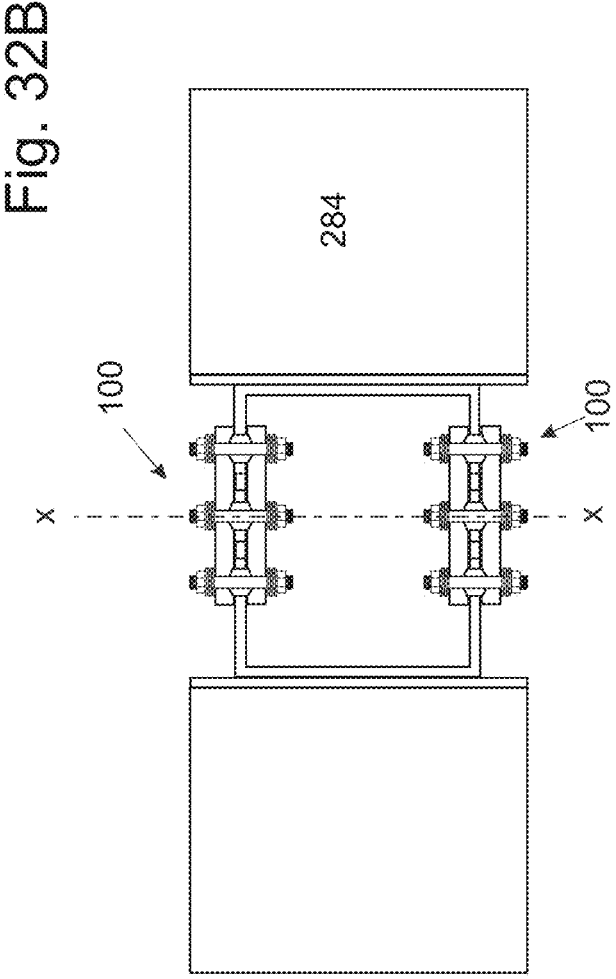
FIG. 32C shows a side view of parts of FIG. 32A.

A further arrangement of rotational connectors is shown in FIG. 32 where two structural members 283 and 284 are connected by an assembly incorporating two symmetric rotational connectors 100, to allow for the two structural components 283 and 284 to rotate about an axis XX relative each other.

Figure 33:
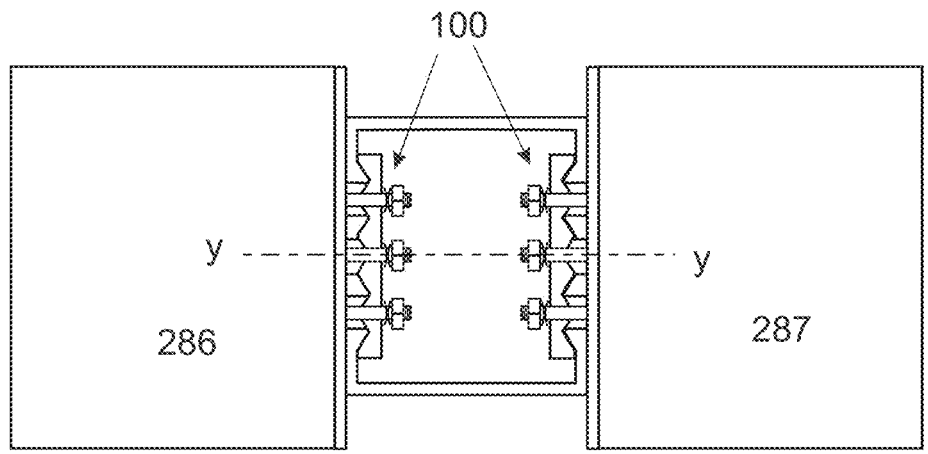
FIG. 33 shows a schematic of a joint between two elements using two rotational connectors in order to allow rotation about a horizontal axis.
Figure 34:
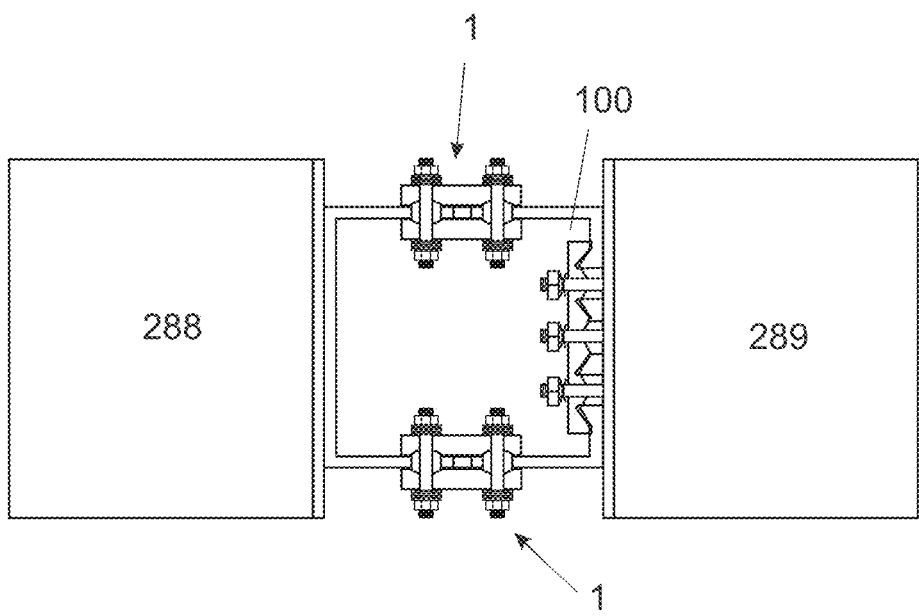
FIG. 34 shows a schematic of a joint between two elements using one vertical rotational connector and two horizontal 1D translational connectors, in order to allow relative rotation about a horizontal axis and relative translation in the horizontal direction.

With reference to FIG. 33 it can be seen that at least one but preferably two (as shown) rotational connectors 100 can connect structural members 286 and 287 together to rotate about the axis YY. A further variation of an assembly of connectors herein defined is shown in FIG. 34 where a rotational connector 100 is shown and two 1D connectors 1 are provided intermediate of structural members 288 and 289.

Figure 35:
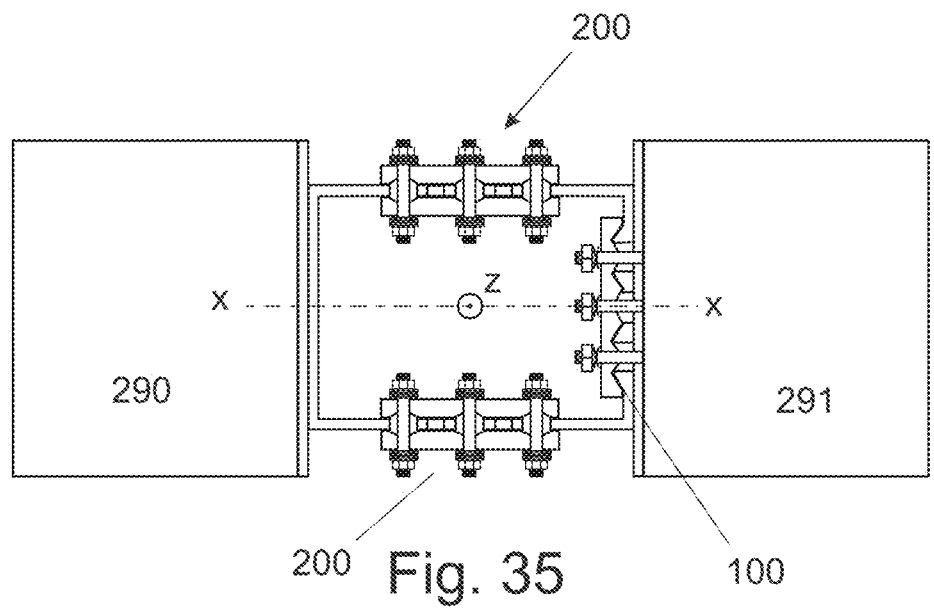
FIG. 35 shows a schematic of a joint between two elements using one vertical rotational connector and two horizontal 2D translational connectors, in order to allow relative rotation about a horizontal axis and relative translation in the horizontal and into the page directions.

FIG. 35 shows yet a further arrangement where the assembly of top and bottom 2D translational connectors 200 and a side rotational connector 100 allows for rotation between the component 290 and 291 about the X axis and displacement relative to each other along the X axis, as well as the axis Z extending perpendicular to the X axis.

Figure 36:
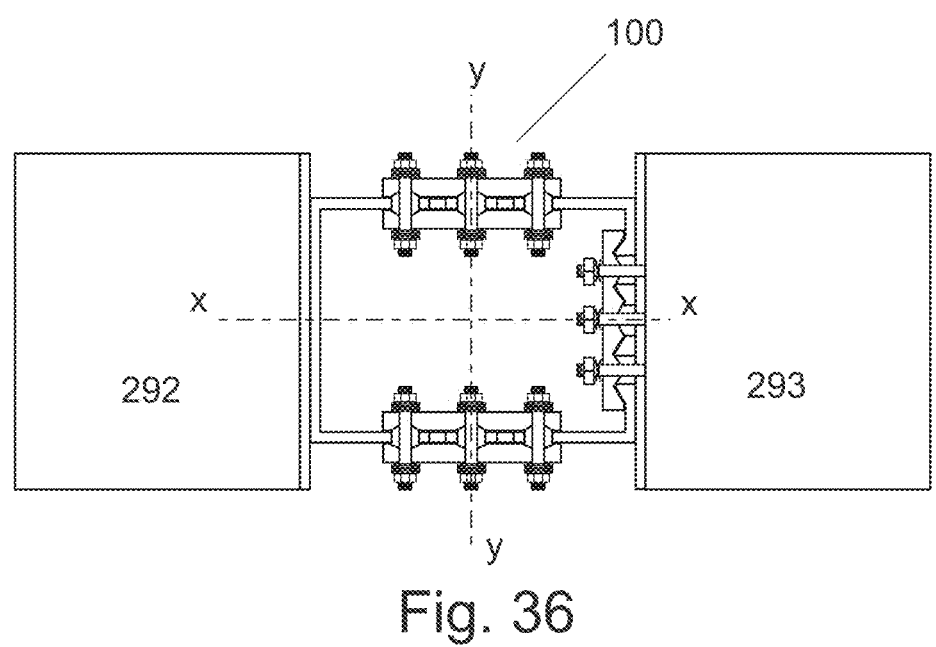
FIG. 36 shows a schematic of a joint between two elements using three rotational connectors, allowing rotation about both the horizontal axis and the vertical axis.

Yet a further arrangement is shown in FIG. 36 wherein there is provided three rotational connectors 100 allowing a rotation both about the vertical axis YY and horizontal axis XX of the two structure components 292 and 293.

Figure 37:
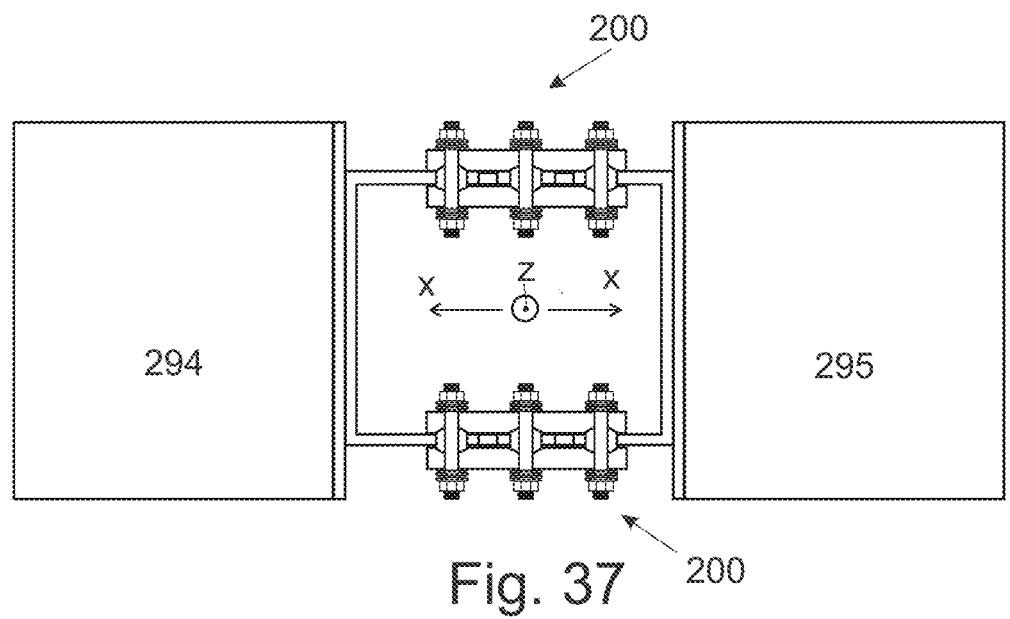
FIG. 37 shows a schematic of a joint between two elements using two 2D translational connectors, which allows relative motion in the horizontal and into the page directions.

With reference to FIG. 37 a further arrangement is shown between structural components 294 and 295 wherein the assembly of connectors comprises two 2D connectors 200 to allow for relative motion between the structural components 294 and 295 in the direction XX as well as in a direction along the axis Z perpendicular to the axis XX.

Figure 38:
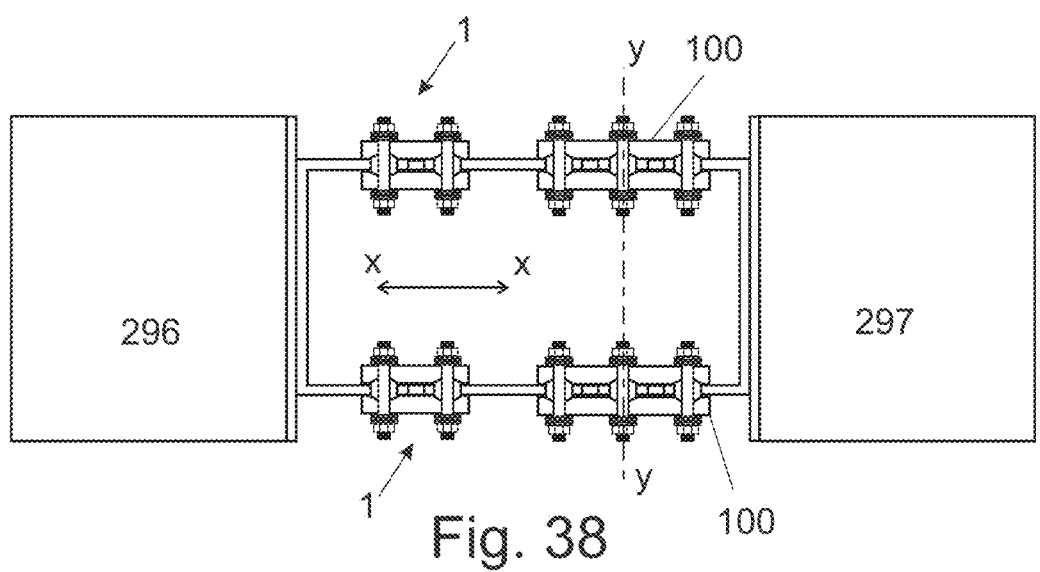
FIG. 38 shows a schematic of a joint between two elements using two 1D translational connectors and two rotational connectors, in order to allow relative motion in the horizontal direction and rotation about a vertical axis.

A further arrangement is shown in FIG. 38 between structural components 296 and 297 wherein 1D connectors 1 are provided together with rotational connectors 100 to allow for a restricted translational movement in direction XX and rotational movement around axis YY between the two structural components 296 and 297.

Figure 39:
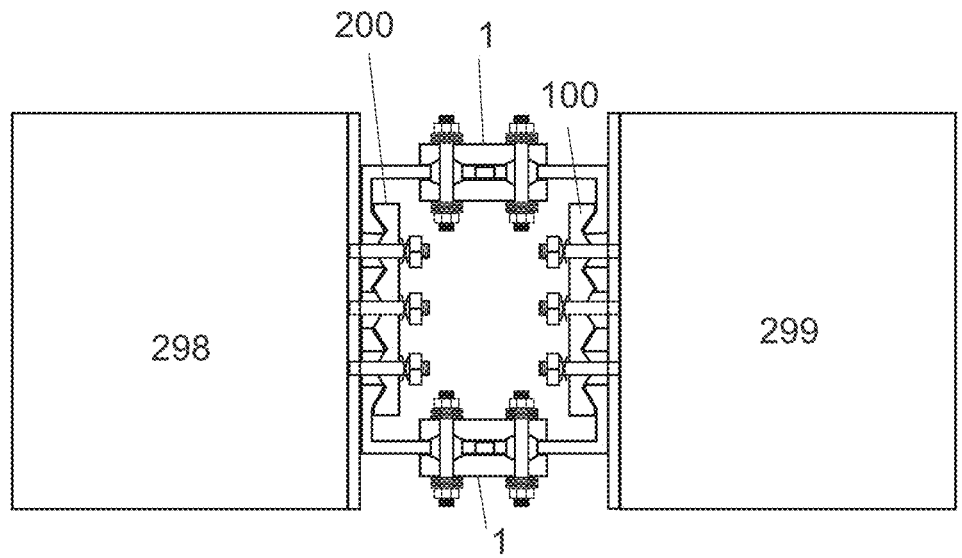
FIG. 39 shows a schematic of a joint between two elements using a vertical 2D translational connector, a vertical rotational connector and two horizontal 1D translational connectors, which allows relative motion in three directions and rotation about a horizontal axis.

With reference to FIG. 39 yet a further arrangement is shown wherein the assembly of connectors comprises of a 2D connector, a rotational connector 100 and top and bottom 1D connectors 1.

Figure 40:
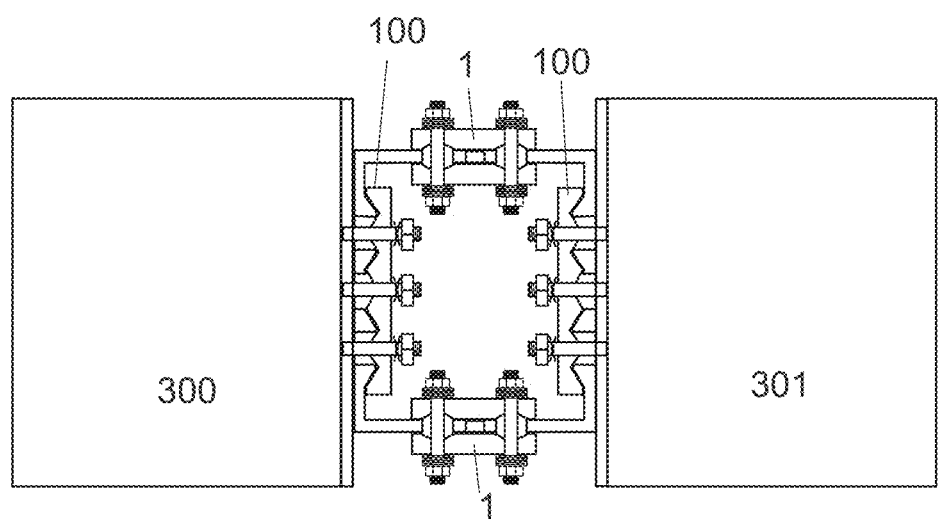
FIG. 40 shows a schematic of a joint between two elements using two vertical rotational connectors and two 1D translational connectors in order to allow rotation about a horizontal axis and relative motion in a horizontal direction.

With reference to FIG. 40 a further arrangement is shown where a plurality of connectors create an assembly comprising of rotational connectors 100 and two 1D connectors top and bottom.

Figure 41:
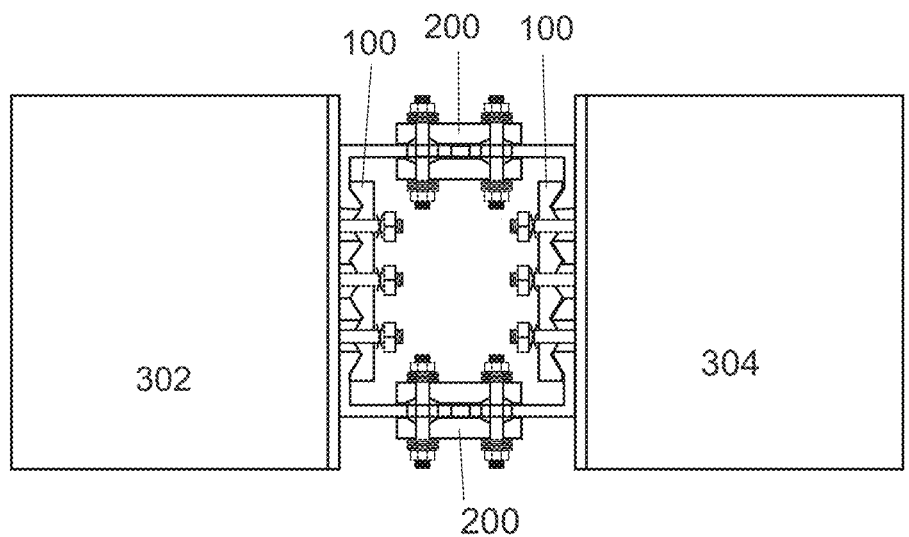
FIG. 41 shows a schematic of a joint between two elements using two vertical rotational connectors and two horizontal 2D translational connectors in order to allow rotation about a horizontal axis and relative motion in both horizontal and into the page directions.
Figure 42:
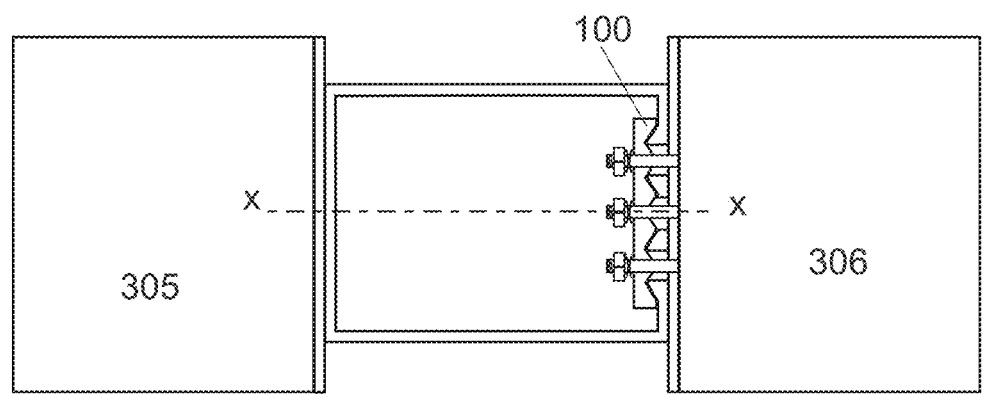
FIG. 42 shows a schematic view of a joint between two elements using one vertical rotational connector in order to allow only rotation about a horizontal axis.
Figure 43:
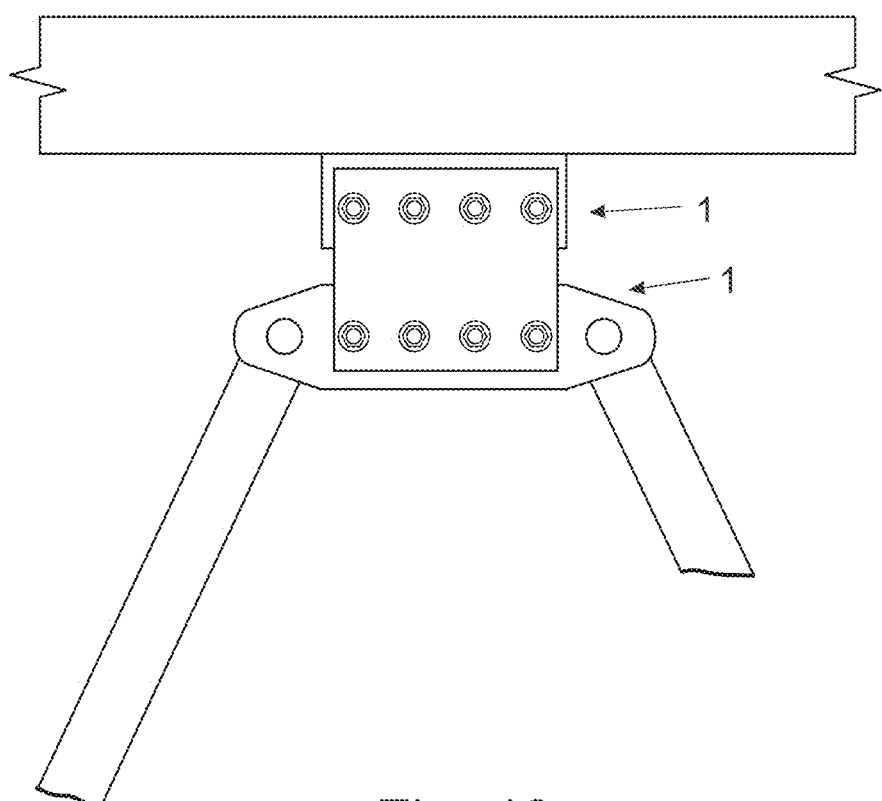
FIG. 43 shows an assembly using two 1D connectors.

With reference to FIG. 41 yet a further arrangement is shown between two structural elements 302 and 304 wherein the assembly of connectors comprises of rotational connectors 100 and 2D connectors 200 top and bottom. Yet a further arrangement is shown in FIG. 42 wherein just one connector is utilised that being a rotational connector 100 to allow for rotation about axis XX of structural components 305 and 306.

Figure 44A:
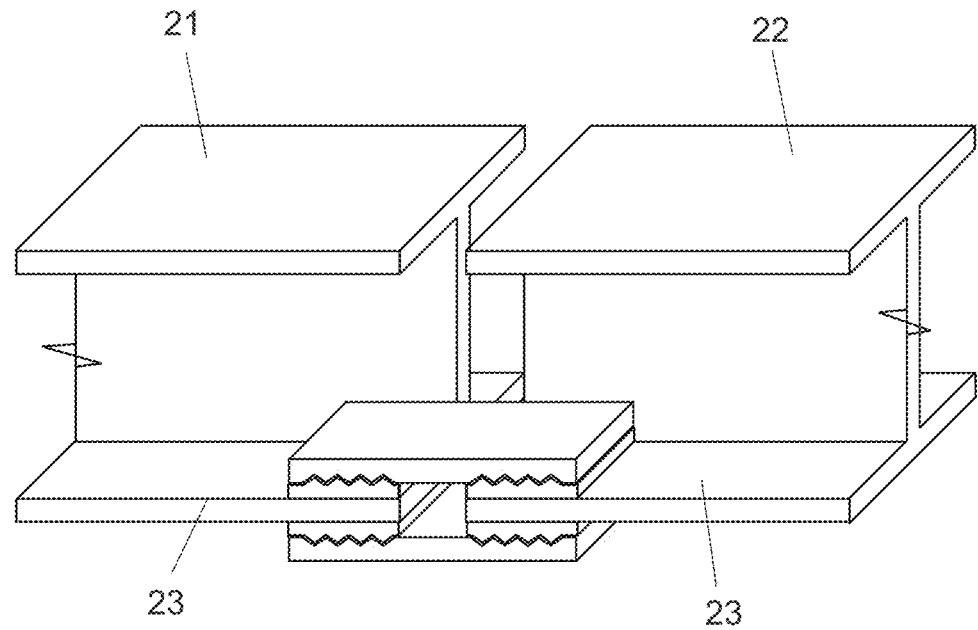
FIGS. 44A-44C show views of two structural sections connected in a number of different ways by 1D translational connectors.
Figure 44B:
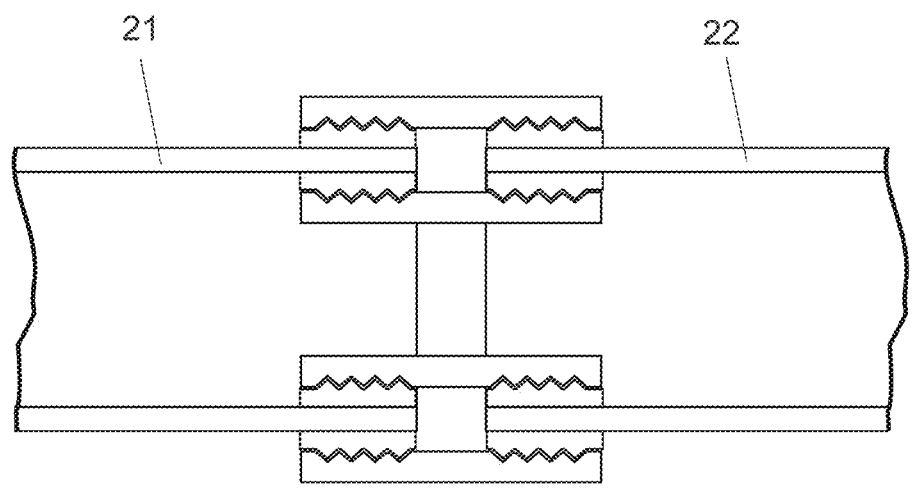
Figure 44C:
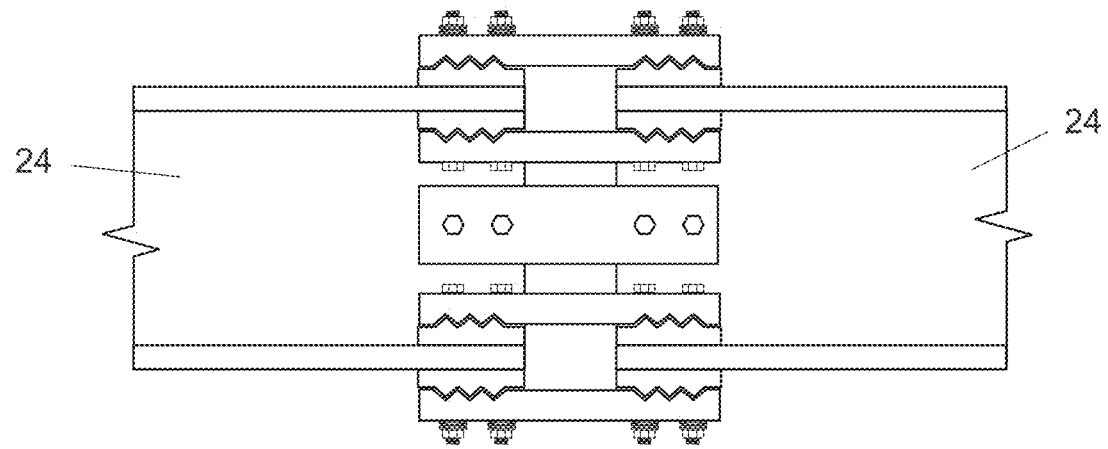

With reference to FIG. 44A-44C another set of arrangements is shown between two structural members 21, 22 where one or more 1D connectors are arranged between the two structural members, to control movement parallel to the members. This arrangement may include the use of a single 1D connector or a plurality of connectors. The connectors may be located between a flange or flanges 23 of the structural members, between the webs 24 of the structural members, or in some combination of these arrangements.

Figure 44D:
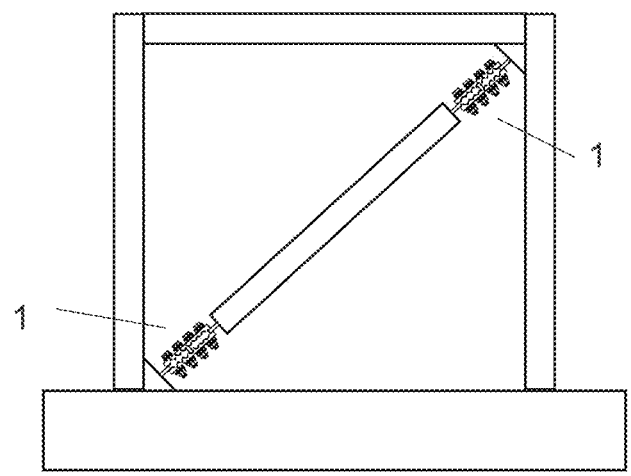
FIG. 44D shows an additional application of the 1D connector in a bracing connection.

A further application of the 1D connector is shown in FIG. 44D where a single connector 1, or a set of connectors 1 may be used in a bracing connection.

Different configurations of the 1D connectors, two dimensional connectors and rotational connectors may be used in practice to achieve desired structural characteristics. One such configurations is shown in FIG. 45A where a first 1D connector 310 and a second 1D connector 311 are joined in parallel. Each of the first components 312 and 313, and second components 314 and 315 are connected at their terminal ends. As a result of this coupling, any relative motion between the first and second components of either of the 1D connectors 310 and 311 will result in the same relative motion in the other connector.

In the configuration shown in FIG. 45A the first 1D connector 310 may slide a distance $L_1$ along its ramped surfaces. After sliding the distance $L_1$ the first connector 310 may slide a distance $L_2$ along the flat surfaces between the ramps. The second 1D connector 311 may first slide a distance $\Delta_1$ before the ramped surfaces of the first and second components contact the corresponding ramped surfaces of the third component. Once the corresponding ramped surfaces contact, the second 1D connector 311 may slide a distance 42 along its ramped surfaces.

In the example of FIG. 45A the ramped sliding distance $L_1$ of the first connector 310 corresponds to the first sliding distance 41 of the second connector 311. In this configuration the opposite sides of the combined joint provided by the first and second 1D connectors may displace a first distance $L_1$ or $\Delta_1$ where the sliding resistance is predominantly governed by the ramped surfaces of the first connector 310, and a second distance $L_2$ or where the sliding resistance is predominantly governed by the ramped surfaces of the second connector 311.

Figure 45B:
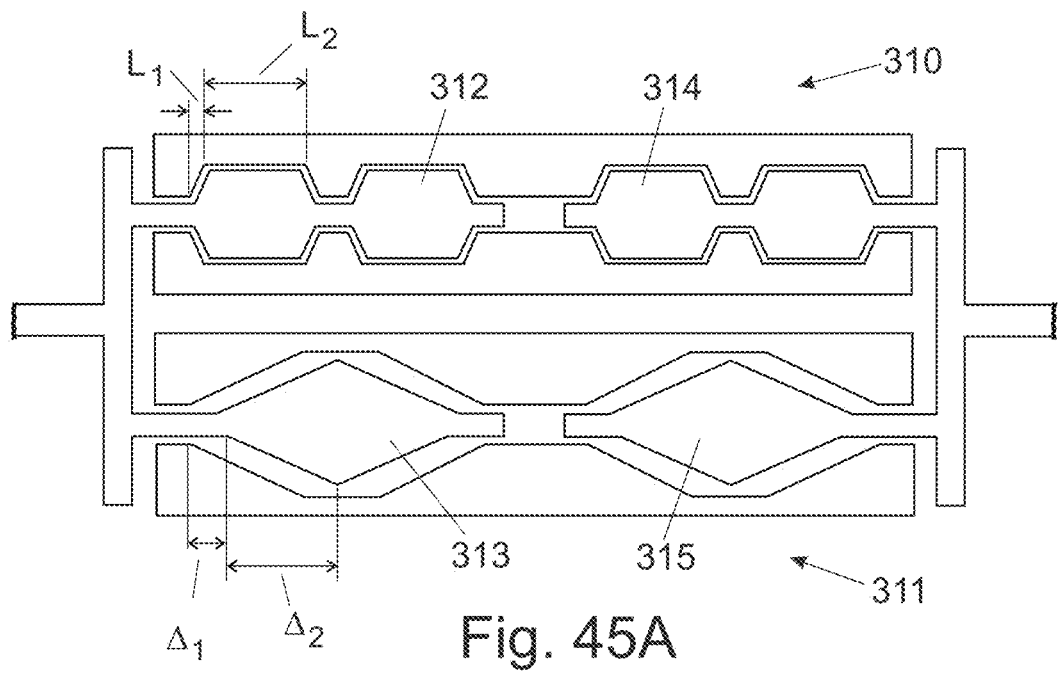
FIG. 45B shows an example of a force-displacement characteristic of the combined joint of FIG. 45A.
Figure 45B:
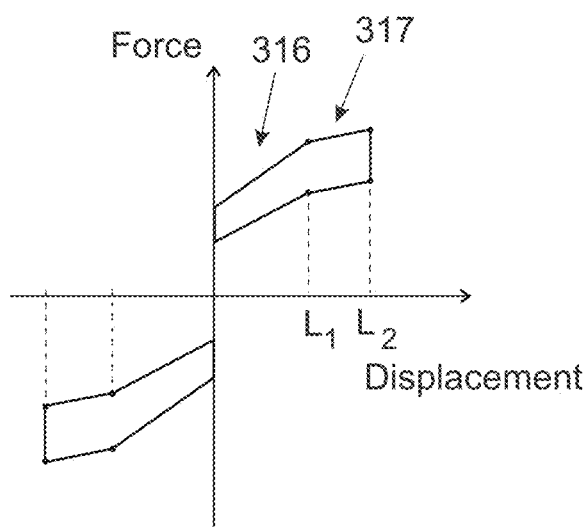
Figure 45C:
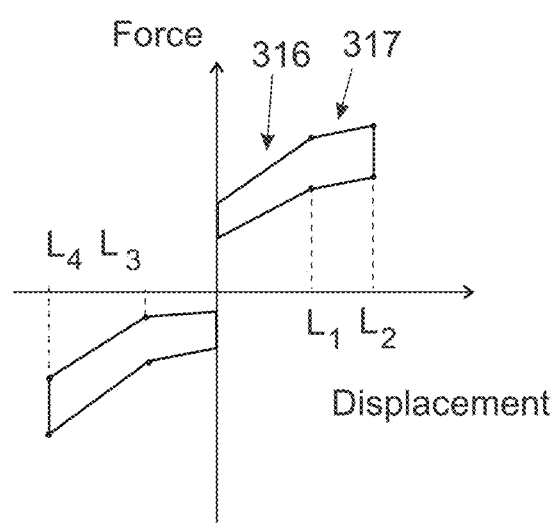
FIG. 45C shows an example of a force-displacement characteristic for a variant of the combined joint shown in FIG. 45A.

As seen in FIG. 45A the respective ramped surfaces of the first connector 310 and second connector 311 may be inclined at different angles. By providing each set of ramped surfaces at different angles the combined joint may have varying sliding resistance characteristics. In the example of FIG. 45A where the ramped surfaces of the first connector 310 are inclined at a steeper angle than the ramped surfaces of the second connector 311. This design could provide a joint with a force-displacement characteristic as shown in FIG. 45B where over the distance $L_1$ the joint has a first stiffness 316, and over a second distance $L_2$ the joint has a second stiffness 317 where the second stiffness is less in the first stiffness.

While the example above provides a joint with a higher initial stiffness and lower secondary stiffness, by varying angles of the ramps surfaces of each of the first connector and second connector different joint characteristics may be provided where the secondary stiffness is less than, equal to, or greater than the initial stiffness.

Additionally, while the distances $L_1$ and $\Delta_1$ are equal in the example above they may be of different magnitudes such that the ramped surfaces of the second connector 311 are engaged before, during, or after the ramped surfaces of the first connector 310 are engaged. Where the ramped surfaces of the second connector are engaged while the ramped surfaces of the first connector are engaged, this may serve to provide a stepped stiffness characteristic over the portion of the displacement where the ramped surfaces of both connectors are engaged.

While in the foregoing examples two 1D connectors have been shown connected in parallel other configurations with more than two 1D connectors in parallel are possible. By varying the engagement points and angles of the ramped faces of each connector complex force-displacement characteristics may be obtained.

Figure 46A:
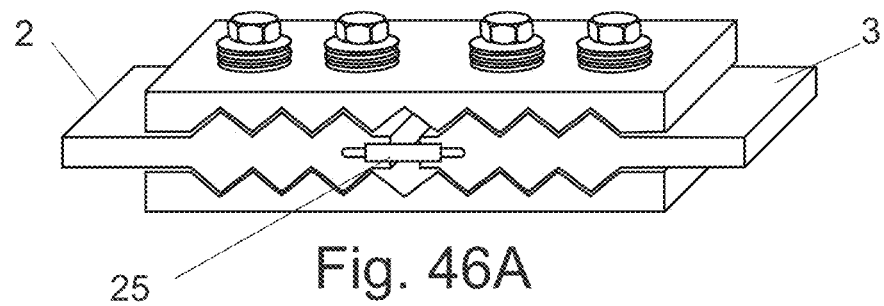
FIG. 46A shows a 1D connector having a displacement sensor to measure the displacement between the first and second components.

In addition to the use of 1D connectors in parallel, combined joints may also be formed using two-dimensional or rotational connectors. In the case where two-dimensional connectors are used in parallel, as is shown in FIG. 46A for 1D connectors, the size and angle of the ramped surfaces may be varied for each connector. In the case where rotational connectors are used in parallel to create a combined joint each rotational connector may have differing angles of the sloped surfaces of the radial segments, different numbers of segments, or different heights of the segments.

In any of the described combined joints using multiple connectors and parallel, different clamping forces may also be used on the different connectors in order to vary the sliding resistance of each connector.

In any of the 1D connectors, two-dimensional connectors, rotational connectors or variants, all combinations which have been described, specific lubricants may be added between sliding surfaces to increase durability of the surfaces and reduce the risk of scratching, galling or rusting. Lubricants may be selected to provide predictable and preferably minimal effect on the coefficient of friction at the sliding surfaces. By using a grease lubricant where the impact on the coefficient of friction between the sliding surfaces is known or may be accurately predicted, the relationships between force and displacement may still be calculated using the formulas described above. Such known greases or lubricants may not require maintenance over time and may maintain a constant coefficient of friction.

Sensor Integration

The connectors may be instrumented by sensors such as displacement sensors or strain sensors. Data gathered by the sensors may be used for determining the status of the connector or for determining the forces to which the connector has been subjected. This sensed data may then be used in the structural health monitoring of buildings and other structures both during and after earthquakes.

According to the equations and relationships between force and displacement in the connector which have already been described, sensing the displacement of components of the connector may allow the associated force to be calculated.

Figure 46B:
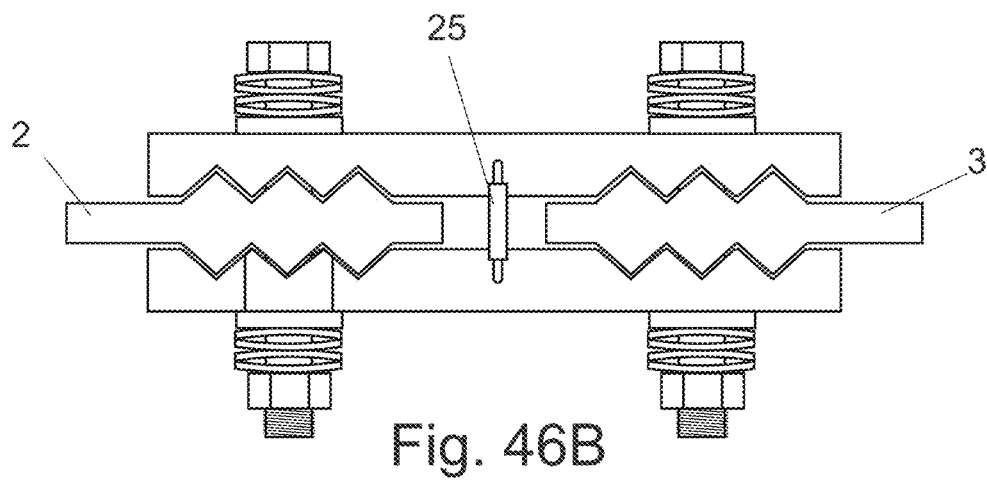
FIG. 46B shows a 1D connector having a displacement sensor to measure the displacement between the plates of the third component.

Displacement sensors 25 for sensing joint displacements may be located as shown in FIG. 46A in order to sense the relative displacement between the first component 2 and second component 3. Alternatively, displacement sensors 25 may be arranged as shown in FIG. 46B and may sense the expansion between the plates of the third component 6a and 6b. Where the displacement between the plates of the third component is sensed, the known angle of the ramps may be used to calculate the relative displacement between the first and second component in order to calculate the loading forces the connector has experienced.

While shown in FIG. 46 in relation to 1D connectors, sensors 25 may also be incorporated into the two-dimensional connectors or rotational connectors. Where displacement sensors 25 are used in two-dimensional connectors two displacement sensors 25 may be placed orthogonal and aligned with the sliding axes of the connector. The root mean square of the two sensor values may then be used in determining the total force experienced by the two-dimensional connector.

Displacement sensors for use in the connectors may be selected from potentiometers, linear variable differential transformer (LVDT) or differential variable reluctance transducer (DVRT) sensors, portal gauges or other commonly used means for sensing displacement.

Figure 46C:
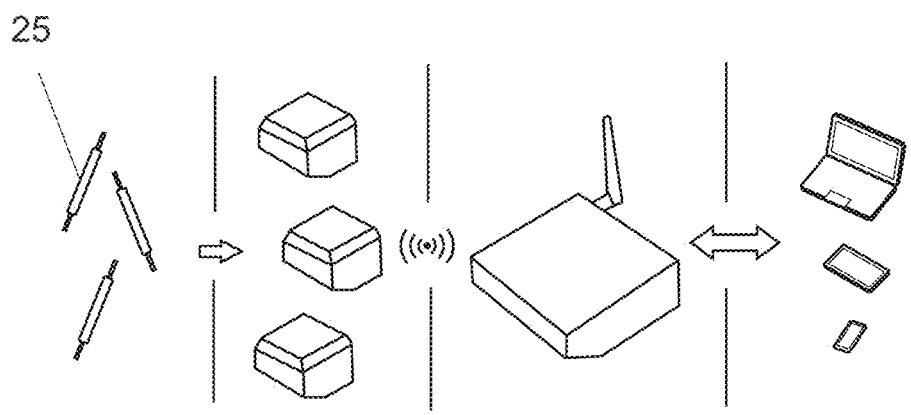
FIG. 46C shows an example sensing and data communication and storage network for displacement sensor data.

Sensors integrated into the connectors may be powered by line or be self-powered using piezoelectric or elastic generators. Information sensed at the sensors may be stored at the sensors or may be transmitted either by wired or wireless means to a data collection system. An example data collection system is shown in FIG. 46C. The sensors 25 may transmit sensed data to nodes which then communicate with a gateway or other server. Sensed information may be stored and/or processed at the gateway. Data from a single connector may be combined with data from other connectors to provide aggregate information about portions or the entirety of structures. Information from the gateway or other server may then be accessed by users.

Advantages

The use of the connector of the present invention in structures can help provide for life-safety, but also aim to minimise damage so that buildings may be rapidly re-occupied for post-event serviceability. The use of the connectors will help: Dissipate energy (reducing significantly the seismic loads); Self-centring capacity (restoring the structure to its initial position after earthquakes with minimal or no residual drift); Provide a high initial stiffness (limiting the drift of structure under serviceability seismic loads); Damage avoidance (such as joint failure, therefore allow a building to be reusable after earthquake); Provide a cost-effective solution (compared to other damping systems with self-centering capacity); Easy design, fabrication and installation on site.

The connectors of the present invention in structures can allow the damping of a range of different directional and rotational motions, such as are caused by an earthquake. Importantly the connectors allow for damping these directional and rotational motions without causing any secondary consequential motion. As shown in FIGS. 27, 30 as examples the configurations of the connectors allow damping of input motion without causing any secondary motion between the connected structures.

The use of the connectors provides a solution which naturally self-centres. This means that after damping input forces the connectors are biased to return to their original configuration.

The connectors of the present invention provide a significantly greater capacity compared to conventional friction joints for the same clamping forces. This may allow the use of smaller bolts or a lower number of bolts to achieve the same capacity, resulting in material savings.

The invention claimed is:

1. A connection configured to join an end of a first structural member to an end of a second structural member, the connection having an original connected position with a threshold slip force magnitude, and when a magnitude of an external force acting on the first and second structural members exceeds the threshold slip force magnitude, the connection enables the ends of the first and second structural members to displace from the original connected position to an axially displaced position, and when the magnitude of the external force is less than the threshold slip force magnitude, the connection returns to the original connected position, the connection comprising:

a first component at the end of the first structural member, the first component having a first surface and a second surface, the first surface having at least one first surface ramp, the second surface having at least one second surface ramp, each of the at least one first surface ramp and the at least one second surface ramp extending transverse to a longitudinal axis of the first structural member;

a second component at the end of the second structural member, the second component being separate from the first component, the second component having a third surface and a fourth surface, the third surface having at least one third surface ramp, the fourth surface having at least one fourth surface ramp, each of the at least one third surface ramp and the at least one fourth surface ramp extending transverse to a longitudinal axis of the second structural member, the longitudinal axis of the second structural member being generally parallel with the longitudinal axis of the first structural member;

a third component having a first end and a second end, the first end of the third component having at least one fifth surface ramp complimentary to the at least one first surface ramp, the second end of the third component having at least one sixth surface ramp complimentary to the at least one third surface ramp;

a fourth component having a first and a second end, the first end of the fourth component having at least one seventh surface ramp complimentary to the at least one second surface ramp, the second end of the fourth component having at least one eighth surface ramp complimentary to the at least one fourth surface ramp;

wherein a portion of the first end of the third component and a portion of the first end of the fourth component overlap a portion of the first component, sandwiching the first component therebetween, and the at least one first surface ramp is complimentary engaged with the at least one fifth surface ramp, and the at least one second surface ramp is complimentary engaged with the at least one seventh surface ramp;

wherein a portion of the second end of the third component and a portion of the second end of the fourth component overlap a portion of the second component, sandwiching the second component therebetween, and the at least one third surface ramp is complimentary engaged with the at least one sixth surface ramp, and the at least one fourth surface ramp is complimentary engaged with the at least one eighth surface ramp;

at least one first resiliently expandable clamp having at least one first biasing member applying a first compression force to the portions of the the first end of the third fourth component overlapping with the first component, the first compression force being in a direction generally perpendicular to the first longitudinal axis; and at least one second resiliently expandable clamp having at least one second biasing member applying a second compression force to the portions of the second end of the third and fourth component overlapping with the second component, the second compression force being in a direction generally perpendicular to the second longitudinal axis;

wherein, the original connected position is defined by the at least one first surface ramp complimentary engaged with the at least one fifth surface ramp, and the at least one second surface ramp complimentary engaged with the at least one seventh surface ramp, and the at least one third surface ramp complimentary engaged with the at least one sixth surface ramp, and the at least one fourth surface ramp complimentary engaged with the at least one eighth surface ramp; and wherein the first and second compression forces with the connection in the original connected position defines the threshold slip force magnitude;

whereby, when the magnitude of the external force acting on the first and second structural members exceeds the threshold slip force magnitude, the ends of the first and second structural members are capable of displacing from the origin connected position to the axially displaced position in a direction generally parallel with the first and second longitudinal axis, and whereby the third and fourth connection members are capable of displacing from the original connected position to an expanded position in a direction generally perpendicular to the first and second longitudinal axis as the at least one first surface ramp displaces relative to the at least one fifth surface ramp in a direction generally parallel with the first longitudinal axis, the at least one second surface ramp displaces relative to the at least one seventh surface ramp in a direction generally parallel with the first longitudinal axis, the at least one third surface ramp displaces relative to the at least one fifth surface ramp in a direction generally parallel with the second longitudinal axis, and the at least one fourth surface ramp displaces relative to the at least one eighth surface ramp in a direction generally parallel with the second longitudinal axis; and whereby, when the magnitude of the external force acting on the first and second structural members is less than the threshold slip force magnitude, the connection returns to the original connected position.

2. The connection of claim 1, wherein the threshold slip force magnitude relates to a magnitude of the first compression force and a magnitude of the second compression force.

3. The connection of claim 2, wherein the threshold slip force magnitude relates to a coefficient of static friction between the at least one first surface ramp complimentary engaged with the at least one fifth surface ramp, and a coefficient of static friction between the at least one second surface ramp complimentary engaged with the at least one seventh surface ramp, and a coefficient of static friction between the at least one third surface ramp complimentary engaged with the at least one sixth surface ramp, and a coefficient of static friction between the at least one fourth surface ramp complimentary engaged with the at least one eighth surface ramp.

4. The connection of claim 3, wherein the coefficient of static friction is between 0.36 and 0.39 between the the at least one first surface ramp complimentary engaged with the at least one fifth surface ramp, and between the at least one second surface ramp complimentary engaged with the at least one seventh surface ramp, and between the at least one third surface ramp complimentary engaged with the at least one sixth surface ramp, and between the at least one fourth surface ramp complimentary engaged with the at least one eighth surface ramp.

5. The connection of claim 4, wherein the at least one first surface ramp is at an acute angle between 25 and 45 relative to the first surface, and wherein the at least one second surface ramp is at an acute angle between 25 and 45 relative to the second surface, and wherein the at least one third surface ramp is at an acute angle between 25 and 45 relative to the third surface, and wherein the at least one fourth surface ramp is at an acute angle between 25 and 45 relative to the fourth surface, and wherein the at least one fifth surface ramp is at an acute angle between 25 and 45 relative to the fifth surface, and wherein the at least one sixth surface ramp is at an acute angle between 25 and 45 relative to the sixth surface, and wherein the at least one seventh surface ramp is at an acute angle between 25 and 45 relative to the seventh surface, and wherein the at least one eighth surface ramp is at an acute angle between 25 and 45 relative to the eighth surface.

6. The connection of claim 1, wherein, if $\theta$ is an angle of the at least one first surface ramp relative to the first surface, and if $\theta$ is an angle of the at least one second surface ramp relative to the second surface, and if $\theta$ is an angle of the at least one third surface ramp relative to the third surface $\theta$, and if $\theta$ is an angle of the at least one fourth surface ramp relative to the fourth surface, and if $\theta$ is an angle of the at least one fifth surface ramp relative to the fifth surface, and if $\theta$ is an angle of the at least one sixth surface ramp relative to the sixth surface, and if $\theta$ is an angle of the at least one seventh surface ramp relative to the seventh surface, and if $\theta$ is an angle of the at least one eighth surface ramp relative to the eighth surface, and if $\mu_s$ is the coefficient of static friction, then $\tan \theta > \mu_s$.

7. The connection of claim 1, wherein each of the at least one first surface ramp, the at least one second surface ramp, the at least one third surface ramp, the at least one fourth surface ramp, the at least one fifth surface ramp, the at least one sixth surface ramp, the at least one seventh surface ramp and the at least one eighth surface ramp, is planar in profile.

8. The connection of claim 1, wherein each of the at least one first surface ramp, the at least one second surface ramp, the at least one third surface ramp, the at least one fourth surface ramp, the at least one fifth surface ramp, the at least one sixth surface ramp, the at least one seventh surface ramp and the at least one eighth surface ramp, is rounded in profile.

9. The connection of claim 1, wherein the at least one first surface ramp includes a plurality of first surface ramps spaced transverse to the longitudinal axis of the first structural member, and wherein the at least one second surface ramp includes a plurality of second surface ramps spaced transverse to the longitudinal axis of the first structural member, and wherein the at least one third surface ramp includes a plurality of third surface ramps spaced transverse to the longitudinal axis of the first structural member, and wherein the at least one fourth surface ramp includes a plurality of fourth surface ramps spaced transverse to the longitudinal axis of the first structural member.

10. The connection of claim 9, wherein the at least one fifth surface ramp includes a plurality of fifth surface ramps spaced transverse to the longitudinal axis of the first structural member, and wherein each of the plurality of fifth surface ramps is complimentary engaged with a corresponding one of the plurality of first surface ramps, and wherein the at least one sixth surface ramp includes a plurality of sixth surface ramps spaced transverse to the longitudinal axis of the first structural member, and wherein each of the plurality of sixth surface ramps is complimentary engaged with a corresponding one of the plurality of third surface ramps, and wherein the at least one seventh surface ramp includes a plurality of seventh surface ramps spaced transverse to the longitudinal axis of the second structural member, and wherein each of the plurality of seventh surface ramps is complimentary engaged with a corresponding one of the plurality of second surface ramps, and wherein the at least one eighth surface ramp includes a plurality of eighth surface ramps spaced transverse to the longitudinal axis of the second structural member, and wherein each of the plurality of eighth surface ramps is complimentary engaged with a corresponding one of the plurality of fourth surface ramps.

11. The connection of claim 1, wherein the at least one first resiliently expandable clamp includes a first threaded fastener extending through the first component and the portions of the first end of the third component and fourth component overlapping with the first component, and wherein the at least one first biasing member is interposed between a head of the first threaded fastener and the first end of the third component, and wherein the at least one second resiliently expandable clamp includes a second threaded fastener extending through the second component and the portions of the second end of the third component and fourth component overlapping with the second component, and wherein the at least one second biasing member is interposed between a head of the second threaded fastener and the second of the third component.

12. The connection of claim 11, wherein the at least one first resiliently expandable clamp further includes a first threaded nut received on a threaded end of the first threaded fastener and wherein the at least one first biasing means includes a third biasing means interposed between the first threaded nut and the first end of the fourth component, and wherein the at least one second resiliently expandable clamp further includes a second threaded nut received on a threaded end of the second threaded fastener and wherein the at least one second biasing means includes a fourth biasing means interposed between the second threaded nut and the second end of the fourth component.

13. The connection of claim 11, wherein the at least one first biasing member and the at least one second biasing member are selected from a group consisting of: a Bellville washer and a spring.

14. The connection of claim 12, wherein the at least one first biasing member, the at least one second biasing member, the at least one third biasing member and the at least one fourth biasing member are selected from a group consisting of: a Bellville washer and a spring.

* * * * *